(12) United States Patent
Muratani et al.

(10) Patent No.: US 8,369,021 B2
(45) Date of Patent: Feb. 5, 2013

(54) ZOOM LENS SYSTEM, OPTICAL APPARATUS EQUIPPED THEREWITH, AND METHOD FOR ZOOMING ZOOM LENS SYSTEM

(75) Inventors: Mami Muratani, Tokyo (JP); Haruo Sato, Kawaguchi (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/058,630

(22) PCT Filed: Aug. 5, 2009

(86) PCT No.: PCT/JP2009/064210
§ 371 (c)(1),
(2), (4) Date: Feb. 11, 2011

(87) PCT Pub. No.: WO2010/018838
PCT Pub. Date: Feb. 18, 2010

(65) Prior Publication Data
US 2011/0134537 A1 Jun. 9, 2011

(30) Foreign Application Priority Data

Aug. 13, 2008 (JP) ................. 2008-208348
Aug. 13, 2008 (JP) ................. 2008-208349
Aug. 13, 2008 (JP) ................. 2008-208350

(51) Int. Cl.
*G02B 15/14* (2006.01)
(52) U.S. Cl. ........................ 359/680; 359/691
(58) Field of Classification Search .......... 359/680–682, 359/691
See application file for complete search history.

(56) References Cited

U.S. PATENT DOCUMENTS

| | | | |
|---|---|---|---|
| 5,182,673 A | 1/1993 | Kikuchi et al. | |
| 5,793,536 A | 8/1998 | Sato | |
| 6,275,342 B1 | 8/2001 | Sakamoto et al. | |
| 6,304,389 B1 | 10/2001 | Shibayama | |
| 6,498,688 B2 | 12/2002 | Shibayama | |
| 7,215,483 B2 | 5/2007 | Sekita | |
| 7,277,232 B2 | 10/2007 | Sato | |
| 7,630,146 B2 * | 12/2009 | Katakura | 359/691 |
| 2002/0167736 A1 | 11/2002 | Shibayama | |
| 2006/0007559 A1 | 1/2006 | Sato | |

(Continued)

FOREIGN PATENT DOCUMENTS

CN 1282881 A 2/2001
JP 58-049908 3/1983
(Continued)

OTHER PUBLICATIONS

Office Action issued Oct. 30, 2012, in Chinese Patent Application No. 200980140097.3.

*Primary Examiner* — Scott J Sugarman
(74) *Attorney, Agent, or Firm* — Miles and Stockbridge P.C.

(57) ABSTRACT

A zoom lens system ZL installed in an electronic still camera 1 and the like comprising, in order from an object side: a first lens group G1 having negative refractive power; and a second lens group G2 having positive refractive power; the second lens group including at least two cemented lenses each of which includes a positive lens disposed to the object side and a negative lens disposed to an image side, a distance between the first lens group and the second lens group varying upon zooming from a wide-angle end state to a telephoto end state, thereby providing a zoom lens system having excellent optical performance, an optical apparatus equipped with the zoom lens system, and a method for manufacturing the zoom lens system.

31 Claims, 24 Drawing Sheets

U.S. PATENT DOCUMENTS

2006/0109564 A1* 5/2006 Sawamoto .................... 359/691
2006/0114574 A1   6/2006 Sekita
2007/0229977 A1* 10/2007 Sawamoto .................... 359/692

FOREIGN PATENT DOCUMENTS

| | | |
|---|---|---|
| JP | 4-218013 A | 8/1992 |
| JP | 8-334694 A | 12/1996 |
| JP | 10-213744 | 8/1998 |
| JP | 10-213744 A | 8/1998 |
| JP | 2001-42218 A | 2/2001 |
| JP | 2002-267930 | 9/2002 |
| JP | 2003-107350 | 4/2003 |
| JP | 2006-053437 | 2/2006 |
| JP | 2006-084829 | 3/2006 |

* cited by examiner

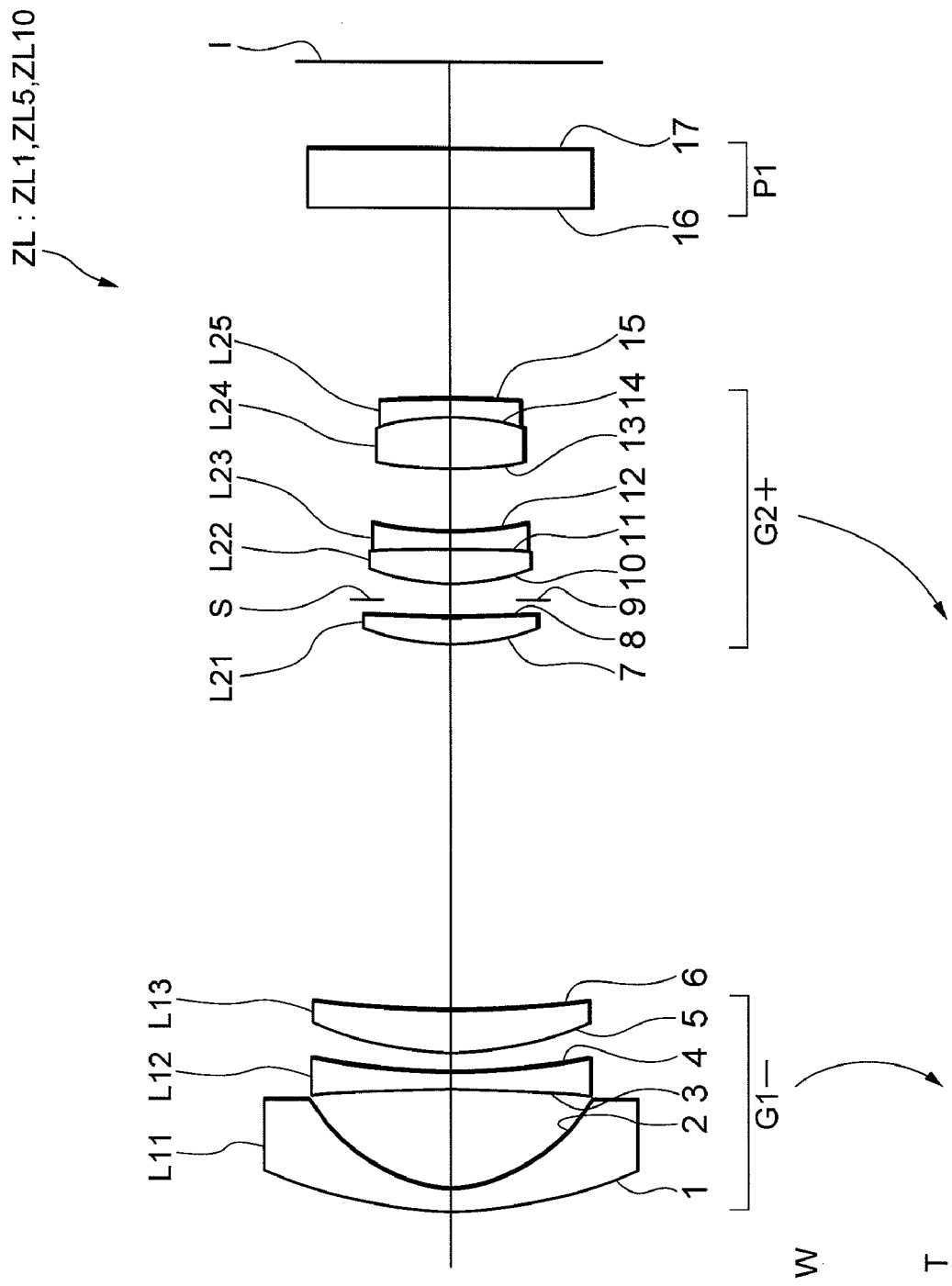

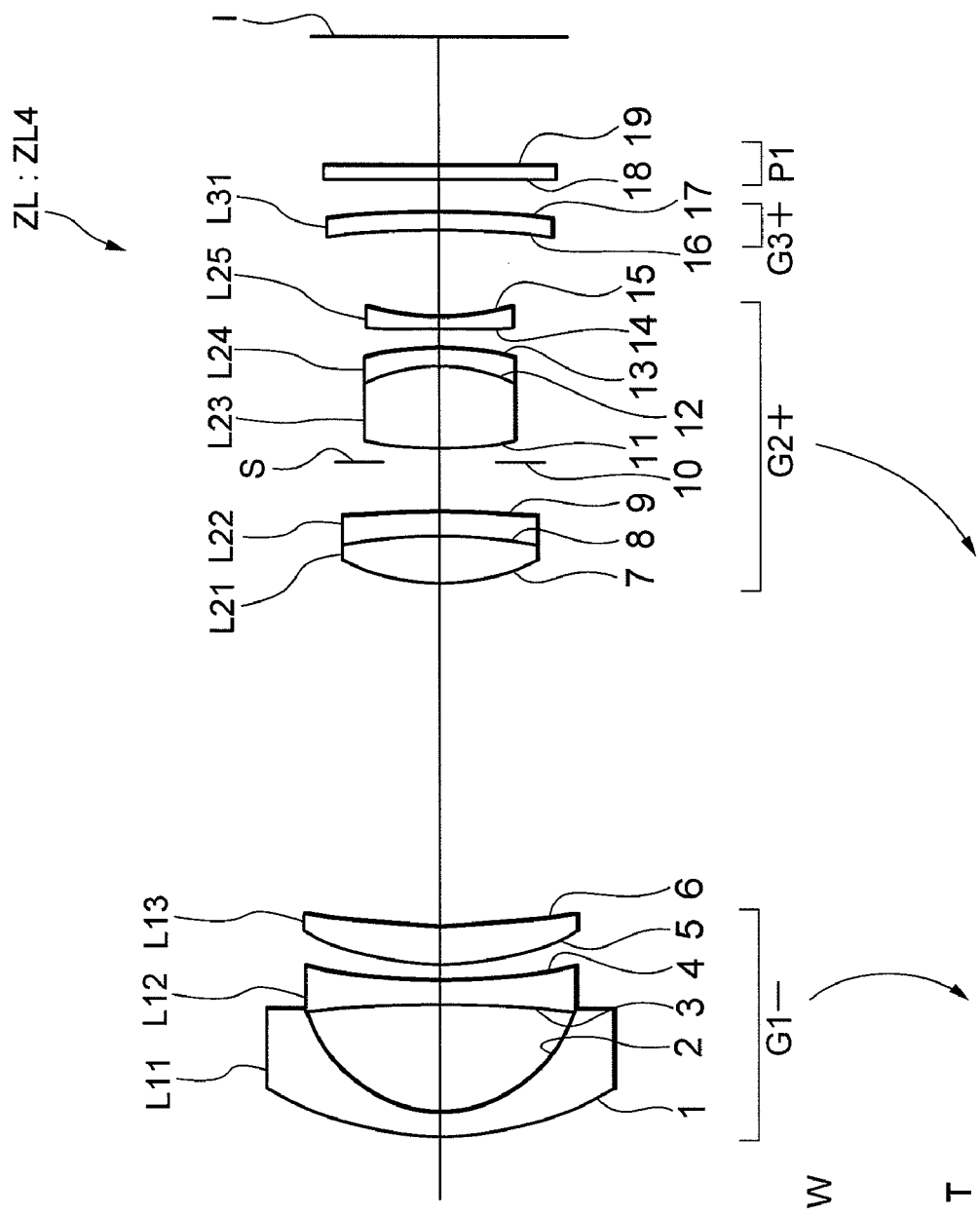

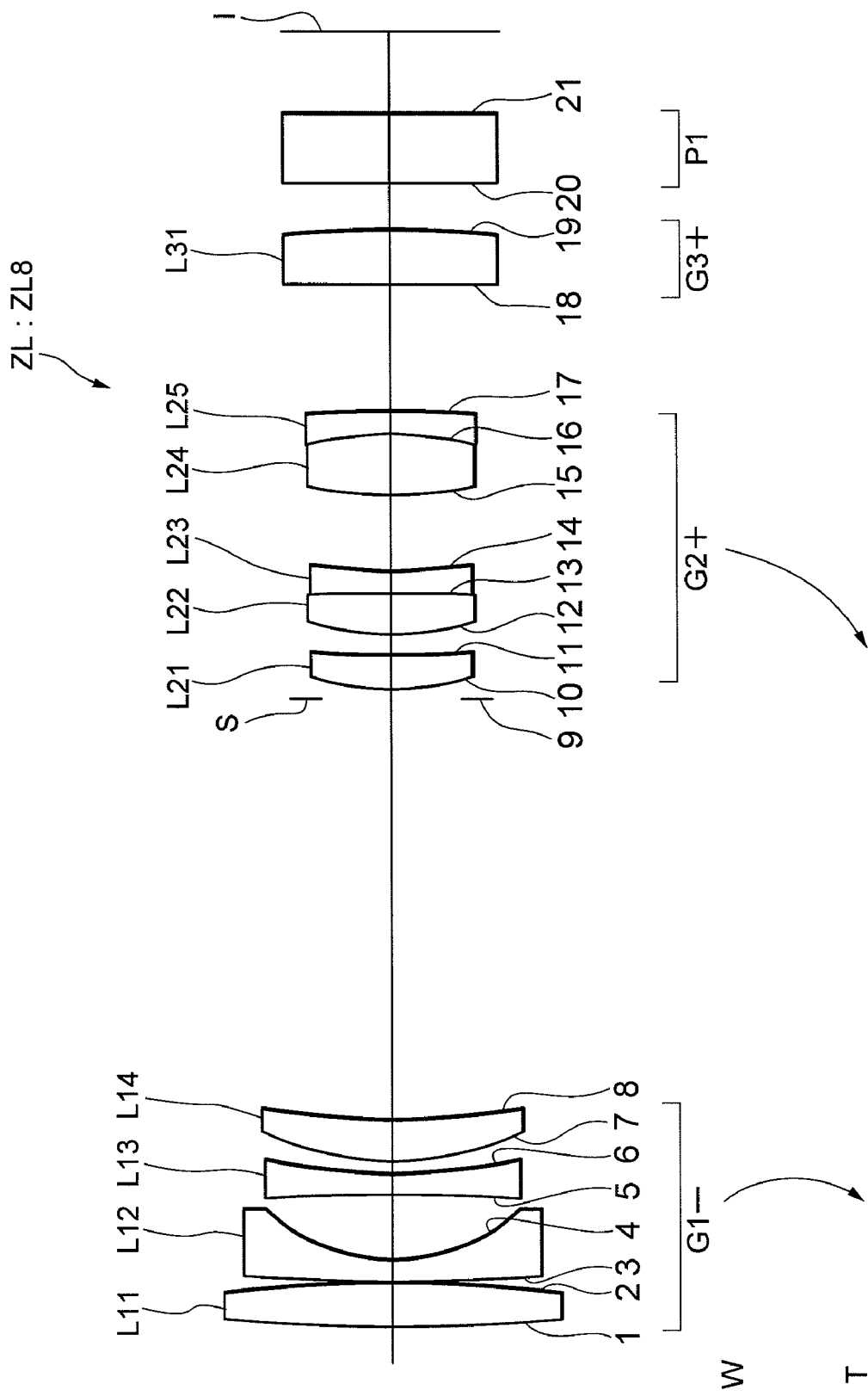

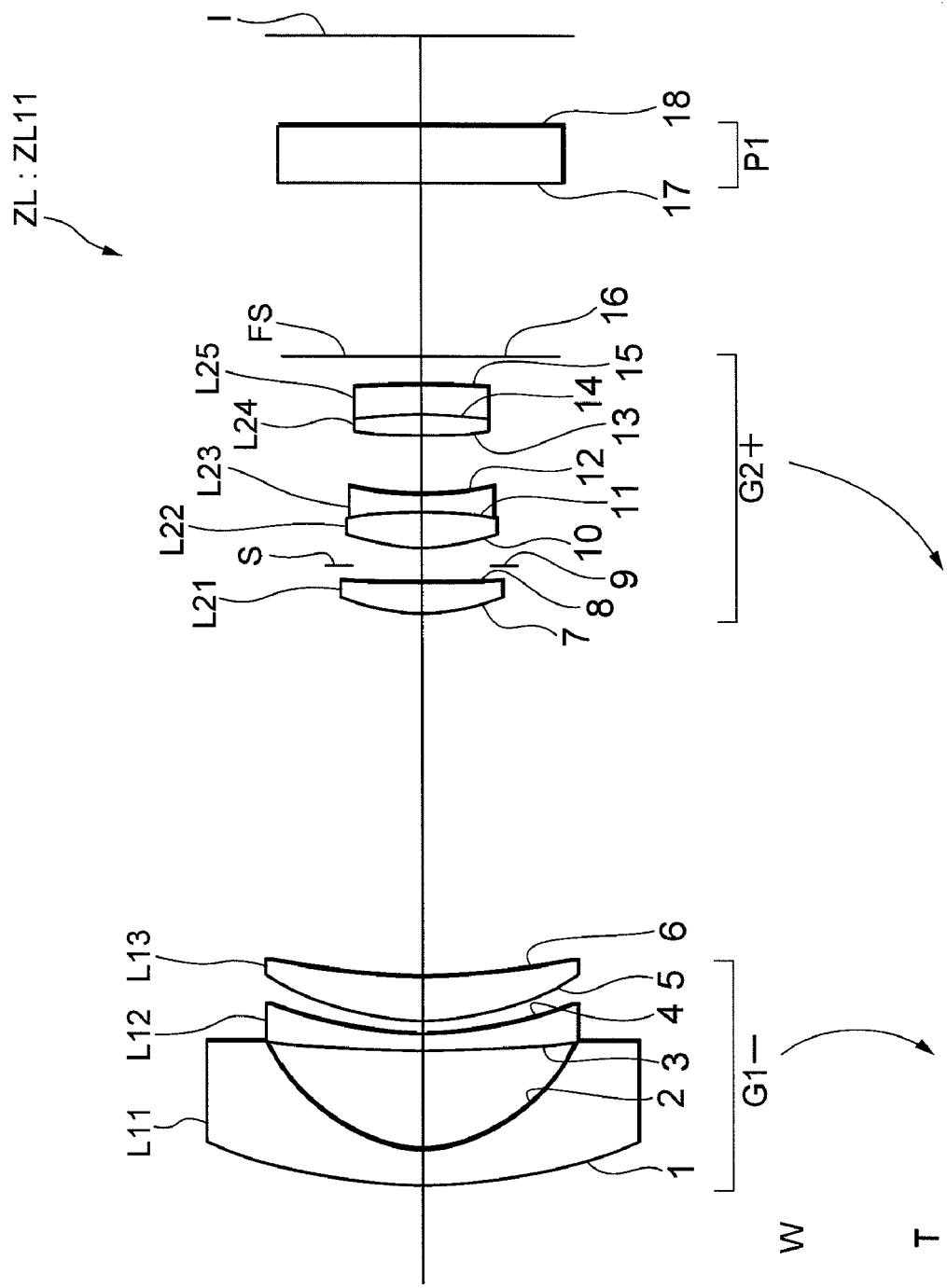

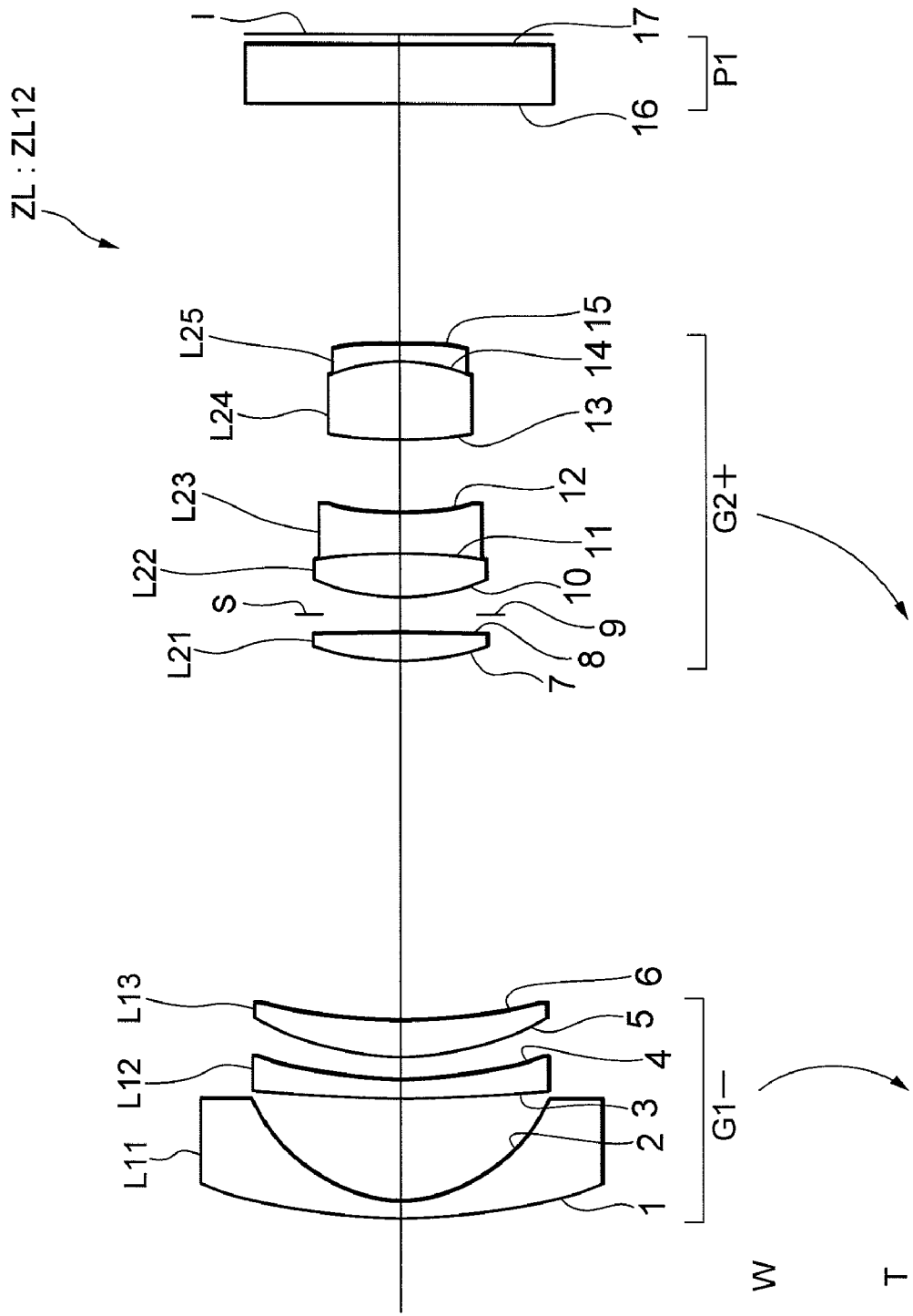

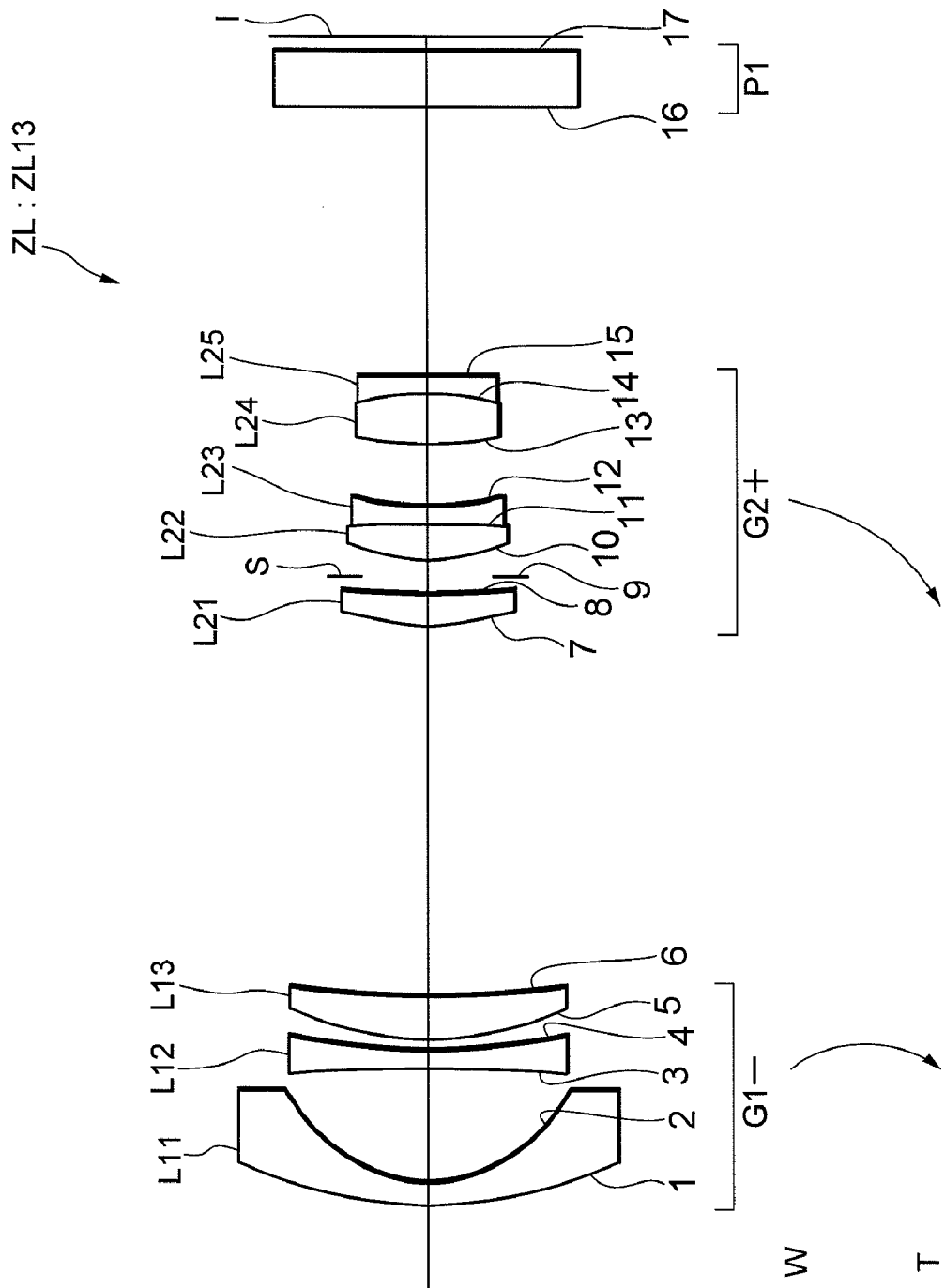

ZOOM LENS SYSTEM, OPTICAL APPARATUS EQUIPPED THEREWITH, AND METHOD FOR ZOOMING ZOOM LENS SYSTEM

TECHNICAL FIELD

The present invention relates to a zoom lens system, an optical apparatus equipped therewith, and a method for zooming the zoom lens system.

BACKGROUND ART

There has been proposed a negative-leading type zoom lens system suitable for a solid-state imaging device, for example, in Japanese Patent application Laid-Open No. 10-213744.

However, in the conventional negative-leading type zoom lens system, downsizing and excellent correction of aberrations couldn't have been realized at the same time.

DISCLOSURE OF THE INVENTION

The present invention is made in view of the above-described problem, and has an object to provide a downsized zoom lens system capable of realizing excellent optical performance.

According to a first aspect of the present invention, there is provided a zoom lens system comprising, in order from an object side: a first lens group having negative refractive power; and a second lens group having positive refractive power; the second lens group including at least two cemented lenses each of which includes a positive lens disposed to the object side and a negative lens disposed to an image side, a distance between the first lens group and the second lens group varying upon zooming from a wide-angle end state to a telephoto end state, and the following conditional expression (1) being satisfied:

$$0.020 < dt/f2 < 0.130 \tag{1}$$

where dt denotes a distance along an optical axis between the first lens group and the second lens group in the telephoto end state, and f2 denotes a focal length of the second lens group.

According to a second aspect of the present invention, there is provided an optical apparatus equipped with the zoom lens system according to the first aspect.

According to a third aspect of the present invention, there is provided a zoom lens system comprising, in order from an object side: a first lens group having negative refractive power; and a second lens group having positive refractive power; the first lens group consisting of one or two negative lens components, and one or two positive lens components, the second lens group including at least two cemented lenses and being composed of positive lens components, a distance between the first lens group and the second lens group varying upon zooming from a wide-angle end state to a telephoto end state, and the following conditional expression (6) being satisfied:

$$0.02 < Y/\Sigma f < 0.26 \tag{6}$$

where Y denotes the maximum image height on the image plane, and $\Sigma f$ denotes a combined focal length of an optical system from the most object side lens surface of the cemented lens disposed to the object side among the at least two cemented lenses in the second lens group G2 to the most image side lens surface of the cemented lens disposed to the image side among the at least two cemented lenses in the second lens group G2.

According to a fourth aspect of the present invention, there is provided an optical apparatus equipped with the zoom lens system according to the third aspect.

According to a fifth aspect of the present invention, there is provided a zoom lens system comprising, in order from an object side: a first lens group having negative refractive power; and a second lens group having positive refractive power; the second lens group including at least two cemented lenses each of which is constructed by a positive lens disposed to the object side and a negative lens disposed to the image side, a distance between the first lens group and the second lens group varying upon zooming from a wide-angle end state to a telephoto end state, and the following conditional expression (9) being satisfied:

$$0.16 < ndn - ndp < 0.40 \tag{9}$$

where ndp denotes an average value of refractive indices of positive lenses in the cemented lenses included in the second lens group, and ndn denotes an average value of refractive indices of negative lenses in the cemented lenses included in the second lens group.

According to a sixth aspect of the present invention, there is provided a method for manufacturing a zoom lens system including, in order from an object side, a first lens group and a second lens group, the method comprising steps of: disposing the first lens group having negative refractive power as a whole, and the second lens group having positive refractive power as a whole including at least two cemented lenses each of which includes a positive lens to the object side and a negative lens to an image side; and disposing the first lens group and the second lens group with varying a distance between the first lens group and the second lens group upon zooming from a wide-angle end state to a telephoto end state, and with satisfying the following conditional expression (1):

$$0.020 < dt/f2 < 0.130 \tag{1}$$

where dt denotes a distance along an optical axis between the first lens group and the second lens group in the telephoto end state, and f2 denotes a focal length of the second lens group.

According to a seventh aspect of the present invention, there is provided a method for manufacturing a zoom lens system including, in order from an object side, a first lens group and a second lens group, the method comprising steps of: disposing the first lens group having negative refractive power as a whole consisting of one or two negative lens components and one or two positive lens components, and the second lens group having positive refractive power as a whole including at least two cemented lenses composed of positive lens components; and disposing the first lens group and the second lens group with varying a distance between the first lens group and the second lens group upon zooming from a wide-angle end state to a telephoto end state, and with satisfying the following conditional expression (6):

$$0.02 < Y/\Sigma f < 0.26 \tag{6}$$

where $\Sigma f$ denotes a combined focal length of an optical system from the most object side lens surface of the cemented lens disposed to the object side among the at least two cemented lenses in the second lens group to the most image side lens surface of the cemented lens disposed to the image side among the at least two cemented lenses in the second lens group, and Y denotes the maximum image height on the image plane.

With constructing the zoom lens system, an optical apparatus equipped therewith, and a method for zooming the zoom lens according to the present invention in this manner, it becomes possible to obtain excellent optical performance and compactness.

BRIEF DESCRIPTION OF THE DRAWINGS

FIG. 1 is a sectional view showing a zoom lens system according to Example 1 of a first embodiment, Example 5 of a second embodiment and Example 10 of a third embodiment.

FIGS. 2A, 2B and 2C are graphs showing various aberrations of the zoom lens system according to Example 1 of the first embodiment, Example 5 of the second embodiment and Example 10 of the third embodiment upon focusing on infinity, in which FIG. 2A shows various aberrations in a wide-angle end state, FIG. 2B shows various aberrations in an intermediate focal length state, and FIG. 2C shows various aberrations in a telephoto end state.

FIGS. 4A, 4B and 4C are graphs showing various aberrations of the zoom lens system according to Example 2 of the first embodiment upon focusing on infinity, in which FIG. 4A shows various aberrations in the wide-angle end state, FIG. 4B shows various aberrations in the intermediate focal length state, and FIG. 4C shows various aberrations in the telephoto end state.

FIGS. 6A, 6B and 6C are graphs showing various aberrations of the zoom lens system according to Example 3 of the first embodiment, and Example 7 of the second upon focusing on infinity, in which FIG. 6A shows various aberrations in the wide-angle end state, FIG. 6B shows various aberrations in the intermediate focal length state, and FIG. 6C shows various aberrations in the telephoto end state.

FIG. 7 is a sectional view showing a zoom lens system according to Example 4 of the first embodiment.

FIGS. 8A, 8B and 8C are graphs showing various aberrations of the zoom lens system according to Example 4 of the first embodiment upon focusing on infinity, in which FIG. 8A shows various aberrations in the wide-angle end state, FIG. 8B shows various aberrations in the intermediate focal length state, and FIG. 8C shows various aberrations in the telephoto end state.

FIGS. 10A, 10B and 10O are graphs showing various aberrations of the zoom lens system according to Example 6 of the second embodiment upon focusing on infinity, in which FIG. 10A shows various aberrations in the wide-angle end state, FIG. 10B shows various aberrations in the intermediate focal length state, and FIG. 10O shows various aberrations in the telephoto end state.

FIG. 11 is a sectional view showing a zoom lens system according to Example 8 of the second embodiment.

FIGS. 12A, 12B and 12C are graphs showing various aberrations of the zoom lens system according to Example 8 of the second embodiment upon focusing on infinity, in which FIG. 12A shows various aberrations in the wide-angle end state, FIG. 12B shows various aberrations in the intermediate focal length state, and FIG. 12C shows various aberrations in the telephoto end state.

FIGS. 14A, 14B and 14C are graphs showing various aberrations of the zoom lens system according to Example 9 of the second embodiment upon focusing on infinity, in which FIG. 14A shows various aberrations in the wide-angle end state, FIG. 14B shows various aberrations in the intermediate focal length state, and FIG. 14C shows various aberrations in the telephoto end state.

FIG. 15 is a sectional view showing a zoom lens system according to Example 11 of the third embodiment.

FIGS. 16A, 16B and 16C are graphs showing various aberrations of the zoom lens system according to Example 11 of the third embodiment upon focusing on infinity, in which FIG. 16A shows various aberrations in the wide-angle end state, FIG. 16B shows various aberrations in the intermediate focal length state, and FIG. 16C shows various aberrations in the telephoto end state.

FIG. 17 is a sectional view showing a zoom lens system according to Example 12 of the third embodiment.

FIGS. 18A, 18B and 18C are graphs showing various aberrations of the zoom lens system according to Example 12 of the third embodiment upon focusing on infinity, in which FIG. 18A shows various aberrations in the wide-angle end state, FIG. 18B shows various aberrations in the intermediate focal length state, and FIG. 18C shows various aberrations in the telephoto end state.

FIG. 19 is a sectional view showing a zoom lens system according to Example 13 of the third embodiment.

FIGS. 20A, 20B and 20C are graphs showing various aberrations of the zoom lens system according to Example 13 of the third embodiment upon focusing on infinity, in which FIG. 20A shows various aberrations in the wide-angle end state, FIG. 20B shows various aberrations in the intermediate focal length state, and FIG. 20C shows various aberrations in the telephoto end state.

FIGS. 21A and 21B are diagrams showing an electronic still camera equipped with a zoom lens system according to the present invention, in which FIG. 21A is a front view, and FIG. 21B is a rear view.

EMBODIMENT FOR CARRYING OUT THE INVENTION

First Embodiment

Figure 2A:
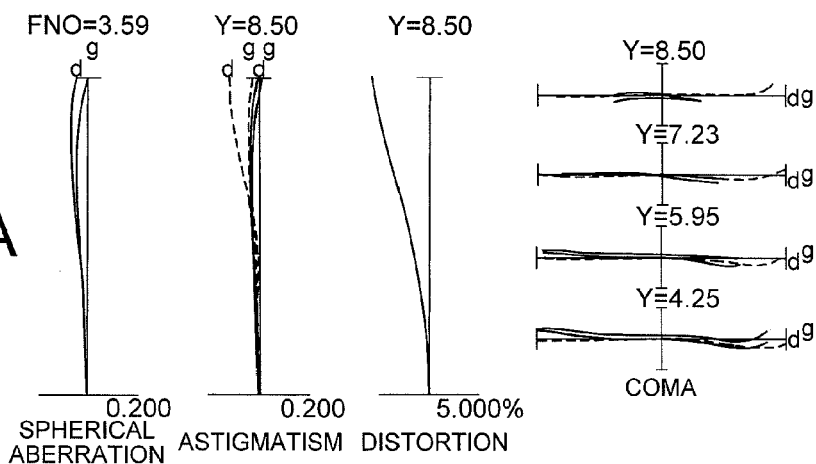

The first embodiment according to the present invention is explained below with reference to accompanying drawings. Incidentally, in the specification, unless otherwise stated a wide-angle end state or a telephoto end state shows a state upon focusing on infinity. As shown in FIG. 1, a zoom lens system ZL is composed of, in order from an object side, a first lens group G1 having negative refractive power and a second lens group G2 having positive refractive power. Upon varying a state of lens positions from a wide-angle end state to a telephoto end state, a distance between the first lens group G1 and the second lens group G2 varies.

The second lens group G2 includes at least two cemented lenses each of which is constructed by, in order from the object side, a positive lens cemented with a negative lens. Regarding light flux come out from the first lens group G1 having negative refractive power, with disposing a positive lens to the object side of the second lens group G2, spherical aberration is corrected, so that the lens system can be kept fast. However, since coma is excessively generated, in order to correct coma, a negative lens generally has to be disposed to the image side of the positive lens. In the present embodiment, with composing the object side cemented lens in a positive-negative configuration, it becomes possible to correct coma and chromatic aberration in a well-balanced manner.

Moreover, in a conventional zoom lens system ZL having the above-described configuration, since negative power having strong curvature has been necessary in the lens group having positive refractive power, when a lens group having negative refractive power is disposed independently, the radius of curvature tends to become too small, so that high order aberrations are generated, so that it has been undesirable. Moreover, a method for simply dividing a lens group having negative refractive power into a plurality of lenses has been difficult to dispose an exit pupil to the object side.

In the present embodiment, with composing the cemented lens having positive refractive power disposed to the image side of the second lens group G2 by the positive-negative configuration, it becomes possible to sufficiently secure the exit pupil.

As described above, in the zoom lens system ZL according to the present embodiment, with simply changing lens configuration of the second lens group G2 having positive refractive power, it becomes possible to make the exit pupil further away with keeping the total lens length short without deteriorating various aberrations.

In the zoom lens system ZL, the following conditional expression (1) is preferably satisfied:

$$0.020 < dt/f2 < 0.130 \quad (1)$$

where dt denotes a distance along an optical axis between the first lens group G1 and the second lens group G2 in the telephoto end state, and f2 denotes a focal length of the second lens group G2.

Conditional expression (1) defines a so-called lens group distance dt that is a distance along the optical axis between the first lens group G1 and the second lens group G2 in the telephoto end state with respect to the focal length f2 of the second lens group G2. When the ratio dt/f2 is equal to or exceeds the upper limit of conditional expression (1), burden of each lens in the second lens group G2 becomes large, so that it becomes difficult to correct spherical aberration and coma. Moreover, the radius of curvature of each lens becomes excessively small, so that variation in coma upon zooming becomes large. Accordingly, off-axis aberrations become difficult to be corrected, so that it is undesirable. In order to secure the effect of the present embodiment, it is preferable to set the upper limit of conditional expression (1) to 0.125. In order to further secure the effect of the present embodiment, it is most preferable to set the upper limit of conditional expression (1) to 0.120. On the other hand, when the ratio dt/f2 is equal to or falls below the lower limit of conditional expression (1), the focal length of the second lens group G2 becomes too large, and the moving amount of the second lens group G2 becomes large, so that it becomes difficult secure the distance between the first lens group G1 and the second lens group G2 in the telephoto end state. Moreover, the focal length of the second lens group G2 becomes excessively large, so that it becomes impossible to downsize the zoom lens system ZL. Otherwise, burden on the first lens group G1 becomes relatively large, so that it becomes difficult to sufficiently correct lower coma and distortion. Accordingly, it is undesirable. In order to secure the effect of the present embodiment, it is preferable to set the lower limit of conditional expression (1) to 0.027. In order to further secure the effect of the present embodiment, it is most preferable to set the lower limit of conditional expression (1) to 0.030.

The following conditional expression (2) is preferably satisfied:

$$0.200 < X2/ft < 0.730 \quad (2)$$

where ft denotes a focal length of the zoom lens system ZL in the telephoto end state, and X2 denotes a moving amount of the second lens group G2 toward the object side along the optical axis upon zooming from the wide-angle end state to the telephoto end state Conditional expression (2) defines the moving amount X2 of the second lens group G2 toward the object side along the optical axis upon zooming from the wide-angle end state to the telephoto end state with respect to a focal length of the zoom lens system in the telephoto end state. When the ratio X2/ft is equal to or exceeds the upper limit of conditional expression (2), the moving amount of the second lens group G2 becomes large, and as a result, the zoom lens system ZL becomes large, so that it is undesirable. Moreover, variation in coma upon zooming becomes large, so that it becomes difficult to keeping good balance in aberrations. Accordingly, it is undesirable. In order to secure the effect of the present embodiment, it is preferable to set the upper limit of conditional expression (2) to 0.715. In order to further secure the effect of the present embodiment, it is most preferable to set the upper limit of conditional expression (2) to 0.700. On the other hand, when the ratio X2/ft is equal to or falls below the lower limit of conditional expression (2), the moving amount of the second lens group G2 becomes too small, so that a sufficient zoom ratio cannot be obtained. Moreover, refractive power of the second lens group G2 becomes excessively large, so that it becomes difficult to sufficiently correct spherical aberration and coma. Accordingly, it is undesirable. In order to secure the effect of the present embodiment, it is preferable to set the lower limit of conditional expression (2) to 0.300. In order to further secure the effect of the present embodiment, it is most preferable to set the lower limit of conditional expression (2) to 0.400.

Moreover, the following conditional expression (3) is preferably satisfied:

$$0.010 < dt/ft < 0.090 \quad (3)$$

where ft denotes a focal length of the zoom lens system ZL in the telephoto end state, dt denotes a so-called lens group distance that is the distance along the optical axis in the telephoto end state between the first lens group G1 and the second lens group G2.

Conditional expression (3) defines the lens group distance dt along the optical axis between the first lens group G1 and the second lens group G2 in the telephoto end state with respect to the focal length ft in the telephoto end state. When the ratio dt/ft is equal to or exceeds the upper limit of conditional expression (3), the lens group distance dt along the optical axis between the first lens group G1 and the second lens group G2 in the telephoto end state becomes large, the total lens length of the zoom lens system ZL and the diameter of the first lens group G1 become large, so that it is undesirable. Moreover, when the first lens group and the second lens group separated, light amount in the periphery of the image becomes small. In order to avoid this, when a large amount of off-axis light flux is taken in, coma becomes worse. Moreover, it becomes difficult to correct spherical aberration, so that it is undesirable. In order to secure the effect of the present embodiment, it is preferable to set the upper limit of conditional expression (3) to 0.080. In order to further secure the effect of the present embodiment, it is most preferable to set the upper limit of conditional expression (3) to 0.070. On the other hand, when the ratio dt/ft is equal to or falls below the lower limit of conditional expression (3), the lens group distance dt along the optical axis between the first lens group G1 and the second lens group G2 in the telephoto end state becomes too small, so that it becomes difficult to secure the distance between the first lens group G1 and the second lens group G2. Moreover, it becomes difficult to sufficiently correct coma, so that it is undesirable. In order to secure the effect of the present embodiment, it is preferable to set the lower limit of conditional expression (3) to 0.015. In order to further secure the effect of the present embodiment, it is most preferable to set the lower limit of conditional expression (3) to 0.020.

Moreover, the following conditional expression (4) is preferably satisfied:

$$0.530 < f2/ft < 0.750 \quad (4)$$

where f2 denotes a focal length of the second lens group G2, and ft denotes a focal length of the zoom lens system ZL in the telephoto end state.

Conditional expression (4) defines the focal length f2 of the second lens group G2 with respect to the focal length ft in the telephoto end state. When the ratio f2/ft is equal to or exceeds the upper limit of conditional expression (4), the focal length f2 of the second lens group G2 becomes large, so that the moving amount of the second lens group G2 becomes large. As a result, the zoom lens system ZL becomes large, so that it is undesirable. Moreover, burden on the first lens group G1 relatively becomes large, so that it becomes difficult to correct coma. Accordingly, it is undesirable. In order to secure the effect of the present embodiment, it is preferable to set the upper limit of conditional expression (4) to 0.735. In order to further secure the effect of the present embodiment, it is most preferable to set the upper limit of conditional expression (4) to 0.725. On the other hand, when the ratio f2/ft is equal to or falls below the lower limit of conditional expression (4), the focal length of the second lens group G2 becomes too small, so that the radius of curvature of each lens in the second lens group G2 becomes small. Accordingly, it becomes difficult to correct spherical aberration and coma. In order to secure the effect of the present embodiment, it is preferable to set the lower limit of conditional expression (4) to 0.550. In order to further secure the effect of the present embodiment, it is most preferable to set the lower limit of conditional expression (4) to 0.570.

In the cemented lenses in the second lens group G2, at least two are preferably disposed consecutively. With this configuration, it becomes possible to realize downsizing of the zoom lens system ZL with excellently correcting aberrations.

Moreover, since the second lens group G2 can be composed of small number of lens components, manufacturing error can be suppressed.

The image side lens surface of the negative lens disposed to the most image side of the cemented lens disposed to the object side among the cemented lenses disposed in the second lens group G2 is preferably a concave surface facing the image side. With this configuration, it becomes possible to locate the exit pupil toward the object side with excellently correcting coma.

In a zoom lens system ZL, the following conditional expression (5) is preferably satisfied:

$$1.77 < nd \quad (5)$$

where nd denotes a refractive index at d-line of the negative lens disposed to the most image side of the cemented lens disposed to the object side among the cemented lenses in the second lens group G2.

Conditional expression (5) defines a refractive index at d-line ($\lambda$=587.6 nm) of the negative lens in the second lens group G2. When the value nd is equal to or falls below the lower limit of conditional expression (5), the radius of curvature becomes too small, so that high order aberrations become large. Moreover, it becomes difficult to correct Petzval sum, and curvature of field becomes worse in the wide-angle end state, so that it is undesirable. With satisfying conditional expression (5), the radius of curvature can be small and high order aberrations can be suppressed. In order to secure the effect of the present embodiment, it is preferable to set the lower limit of conditional expression (5) to 1.80. Moreover, it is most preferable to set the lower limit of conditional expression (5) to 1.90, so that Petzval sum increases and the effect of the present embodiment can further be secured.

The second lens group G2 preferably includes two cemented lenses disposed consecutively and the most image side lens surface of the cemented lenses disposed consecutively is preferably a convex surface facing the image side. With this configuration, it becomes possible to locate the exit pupil toward the object side with excellently correcting coma. Incidentally, when the most image side lens surface is an aspherical surface, the convex surface is to be considered as a reference sphere.

Moreover, in the most object side of the second lens group G2, a positive single lens having a convex surface facing the image side may be disposed. However, when the lens like this cannot be disposed because of limitation of the number of lenses, or the like, an aspherical surface is preferably formed on the most image side lens surface of the cemented lens disposed to the image side among the cemented lenses in the second lens group G2, so that it becomes possible to excellently correct spherical aberration and upper coma.

The second lens group G2 preferably includes at least two double convex positive lenses.

Alternatively, the positive lens composing the cemented lens disposed to the object side in the second lens group G2 is preferably a double convex positive lens. With this configuration, it becomes possible to excellently correct spherical aberration. Moreover, since positive power becomes strong, Petzval sum becomes large, so that it becomes possible to excellently correct curvature of field. Accordingly, it is desirable.

Cemented lenses included in the second lens group G2 are preferably all positive lens components. Although including negative lenses in the cemented lenses, each combined focal length is positive, so that, in each lens component, spherical aberration and coma can be excellently corrected and the amount of remained aberration after cemented can also be suppressed.

The second lens group G2 preferably includes three lens components. With this configuration, for all the number of lenses is small, it becomes possible to correct spherical aberration and coma and to realize downsizing of the zoom lens system ZL.

In particular, the second lens group G2 is preferably composed of, in order from the object side, a positive single lens, a cemented lens including a positive lens and a negative lens, and a cemented lens including a positive lens and a negative lens. With this configuration, it becomes possible to excellently correct balance of spherical aberration, chromatic aberration, and Petzval sum.

In a zoom lens system ZL, the first lens group G1 preferably includes, in order from the object side, one or two negative single lenses and a positive single lens. With this configuration, it becomes possible to downsize the first lens group G1 and to vary off-axis rays toward the optical axis, so that excellent aberration correction can be obtained with suppressing generation of high order aberrations.

In a zoom lens system ZL, at least a portion of the second lens group G2 is moved in a direction including a component perpendicular to the optical axis. With this configuration, it becomes possible to obtain excellent optical performance with fewer decentering coma upon vibration reduction.

In a zoom lens system ZL, at least one of the cemented lenses in the second lens group G2 is moved in a direction including a component perpendicular to the optical axis. With this configuration, it becomes possible to obtain excellent optical performance with fewer decentering coma upon vibration reduction.

Figure 23:
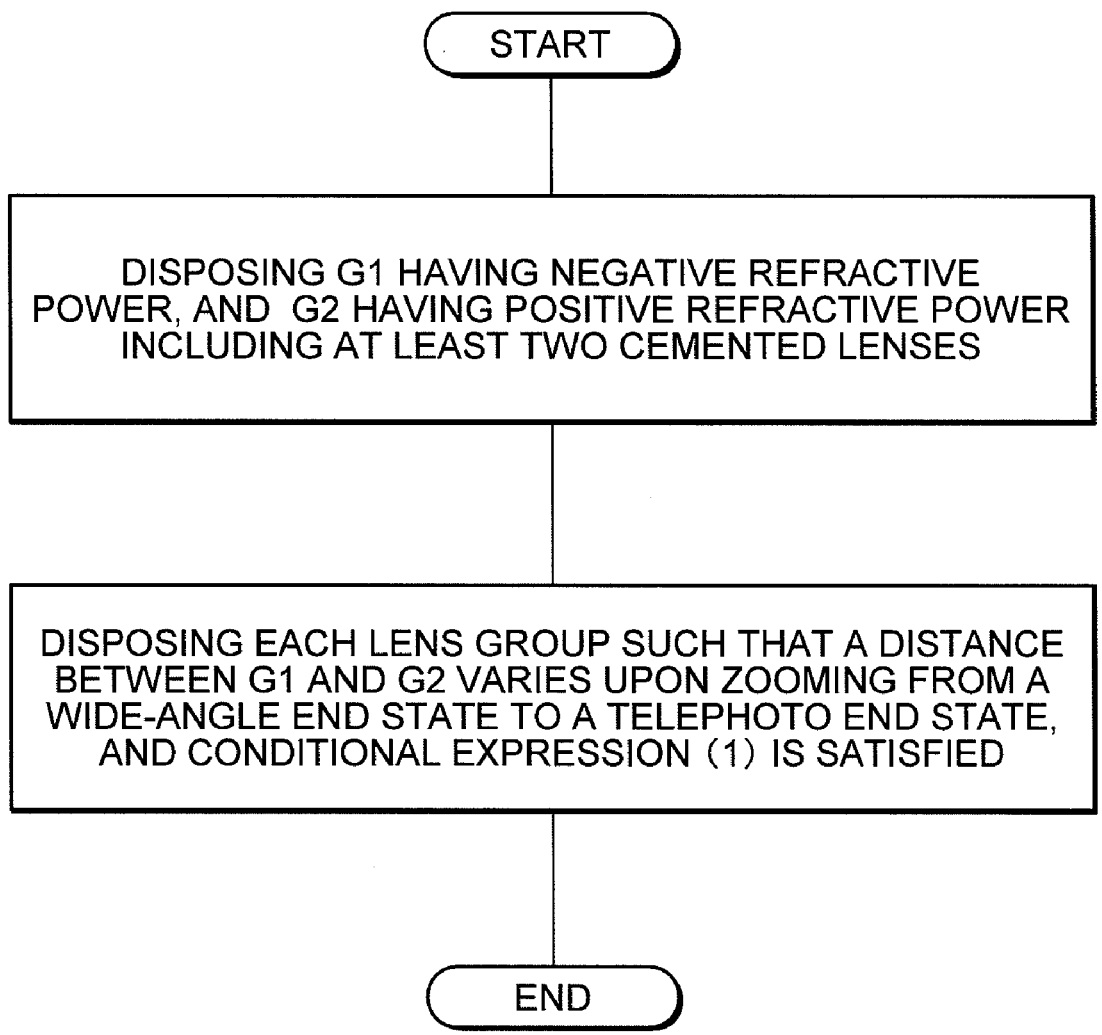
FIG. 23 is a flowchart schematically explaining a method for manufacturing the zoom lens system according to the first embodiment.

An outline of a method for manufacturing a zoom lens system including, in order from an object side, a first lens group G1 and a second lens group G2 is explained with reference to FIG. 23.

At first, the first lens group G1 having negative refractive power, and the second lens group G2 having positive refractive power including at least two cemented lenses each of which is composed of a positive lens to the object side and a negative lens to the image side are disposed into a lens barrel having a cylindrical shape.

Then, each lens group is disposed such that a distance between the first lens group G1 and the second lens group G2 varies upon zooming from a wide-angle end state to a telephoto end state, and the following conditional expression (1) is satisfied:

$$0.020 < dt/f2 < 0.130 \quad (1)$$

where dt denotes a distance along the optical axis between the first lens group G1 and the second lens group G2 in the telephoto end state, and f2 denotes a focal length of the second lens group G2.

Each example according to the first embodiment of the present invention is explained below with reference to accompanying drawings. FIG. 1 is a sectional view showing a zoom lens system according to Example 1 of the first embodiment, and refractive power distribution of the zoom lens system ZL is shown, and movement of each lens group upon varying the focal length from the wide-angle end state (W) to the telephoto end state (T) is shown by an arrow on the lower side in FIG. 1. The zoom lens system ZL1 shown in FIG. 1 is composed of, in order from an object side, a first lens group G1 having negative refractive power, and a second lens group G2 having positive refractive power. The zoom lens system ZL1 varies a distance between the first lens group G1 and the second lens group G2 upon varying lens positions from the wide-angle end state to the telephoto end state.

In each example, a low-pass filter P1 that blocks the spatial frequency exceeding resolution limit of the solid-state imaging device such as a CCD disposed on the image plane I is disposed between the second lens group G2 and the image plane I (in Examples 2 and 4, between the third lens group G3 and the image plane I).

In each Example, an aspherical surface is expressed by the following expression (a):

$$S(y)=(y^2/r)/[1+[1-\kappa(y^2/r^2)]^{1/2}]+A3\times|y|^3+A4\times y^4+A6\times y^6+A8\times y^8+A10\times y^{10} \quad (a)$$

where "y" denotes a vertical height from the optical axis, S(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), κ denotes a conical coefficient, and An denotes an aspherical coefficient of n-th order. In each Example, "E-n" denotes "$\times 10^{-n}$", and in each Example, a second order aspherical coefficient A2 is 0. Each aspherical surface is expressed in (Lens Data) by attaching "*" to the left side of the surface number.

Example 1

FIG. 1 is a sectional view showing a zoom lens system ZL1 according to Example 1 of the first embodiment. The zoom lens system ZL1 shown in FIG. 1 is composed of, in order from an object side, a first lens group G1 having negative refractive power, and a second lens group G2 having positive refractive power.

The first lens group G1 having negative refractive power as a whole is composed of three lenses that are, in order from the object side, a negative meniscus lens L11 having a convex surface facing the object side, a double concave negative lens L12, and a positive meniscus lens L13 having a convex surface facing the object side. The second lens group G2 having positive refractive power as a whole is composed of five lenses that are, in order from the object side, a positive meniscus lens L21 having a convex surface facing the object side, an aperture stop S, a cemented lens constructed by a double convex positive lens L22 cemented with a double concave negative lens L23, and a cemented lens constructed by a double convex positive lens L24 cemented with a negative meniscus lens L25 having a convex surface facing the image side.

Various values associated with Example 1 are listed in Table 1. In (Specifications), W denotes a wide-angle end state, M denotes an intermediate focal length state, T denotes a telephoto end state, f denotes a focal length, FNO denotes an f-number, 2ω denotes an angle of view, and Bf denotes a back focal length. In (Lens Data), "i" denotes a surface number, "r" denotes a radius of curvature of a lens surface, "vd" denotes an Abbe number, and "nd" denotes a refractive index. A surface number is a lens surface number along a light proceeding direction counted in order from the object side, a surface distance denotes a distance from an optical surface to the next optical surface along the optical axis, and a refractive index and an Abbe number are values with respect to d-line (wavelength λ=587.6 nm). In respective tables for various values, "mm" is generally used for the unit of length such as the focal length f, the radius of curvature and the distance to the next lens surface. However, since similar optical performance can be obtained by an optical system proportionally enlarged or reduced its dimension, the unit is not necessarily to be limited to "mm", and any other suitable unit can be used. Moreover, r=0.0000 indicates a plane surface, and refractive index of the air nd=1.00000 is omitted. The explanation of reference symbols in various tables is the same in the following Examples.

In Example 1, each of the first, second, and fifteenth surfaces is formed with an aspherical surface. In (Aspherical Surface Data), conical coefficient κ and each aspherical coefficient A4 through A10 are shown.

In Example 1, a distance d1 along the optical axis between the first lens group G1 and the second lens group G2, a distance d2 along the optical axis between the second lens group G2 and the low-pass filter 21, and a total lens length tl vary upon zooming. In (Variable Distance Data), variable distances with respect to each focal length of the wide-angle end state, the intermediate focal length state, and the telephoto end stat are shown.

TABLE 1

(Specifications)

| | W | M | T |
|---|---|---|---|
| f = | 10.25 | 17.30 | 29.30 |
| Bf = | 5.4 | 5.4 | 5.4 |
| FNO = | 3.60 | 4.50 | 5.86 |
| 2ω = | 82.7° | 53.0° | 32.4° |

(Lens Data)

| i | r | d | νd | nd |
|---|---|---|---|---|
| *1 | 25.5785 | 1.3000 | 40.1 | 1.85135 |
| *2 | 8.0567 | 5.7929 | | |
| 3 | −91.4570 | 1.0000 | 63.4 | 1.61800 |
| 4 | 39.4179 | 1.1850 | | |
| 5 | 19.9537 | 2.4000 | 23.8 | 1.84666 |
| 6 | 62.1323 | (d1) | | |
| 7 | 13.4068 | 1.5940 | 55.5 | 1.69680 |
| 8 | 57.0304 | 1.0000 | | |
| 9 | 0.0000 | 1.0000 | Aperture Stop S | |
| 10 | 12.7614 | 2.0000 | 65.5 | 1.60300 |
| 11 | −76.8213 | 1.0000 | 31.3 | 1.90366 |
| 12 | 20.9431 | 3.7407 | | |
| 13 | 26.3626 | 3.0000 | 82.6 | 1.49782 |
| 14 | −14.2354 | 1.0000 | 40.4 | 1.80610 |
| *15 | −51.9777 | (d2) | | |
| 16 | 0.0000 | 3.5000 | 64.1 | 1.51680 |
| 17 | 0.0000 | (Bf) | | |

(Aspherical Surface Data)

Surface Number: 1

κ = 0.2118
A3 = 0.00000E+00
A4 = −1.29310E−05
A6 = 7.99520E−08
A8 = −6.27380E−11
A10 = −6.50010E−13

Surface Number: 2

κ = 0.3044
A3 = 0.00000E+00
A4 = 5.73110E−05
A6 = 3.71930E−07
A8 = 1.83250E−09
A10 = 3.44660E−11

Surface Number: 15

κ = −153.5916
A3 = 0.00000E+00
A4 = 4.17600E−05
A6 = 4.39600E−06
A8 = −1.85930E−08
A10 = −2.23890E−10

(Variable Distances Data)

| | W | M | T |
|---|---|---|---|
| f = | 10.25 | 17.30 | 29.30 |
| d1 = | 21.31135 | 8.63141 | 1.08108 |
| d2 = | 10.96792 | 18.43769 | 31.15218 |
| tl = | 66.76193 | 61.55175 | 66.71592 |

(Values for Conditional Expressions)

(1) dt/f2 = 0.059
(2) X2/ft = 0.689
(3) dt/ft = 0.037
(4) f2/ft = 0.628
(5) nd = 1.904

Figure 2B:
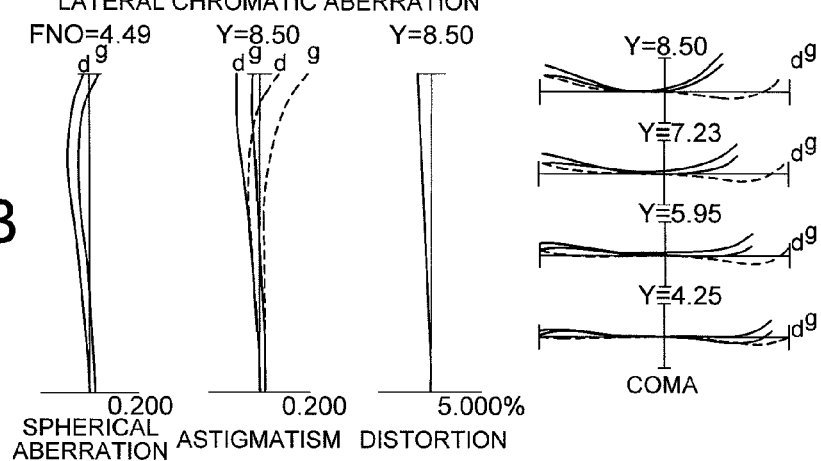
Figure 2C:
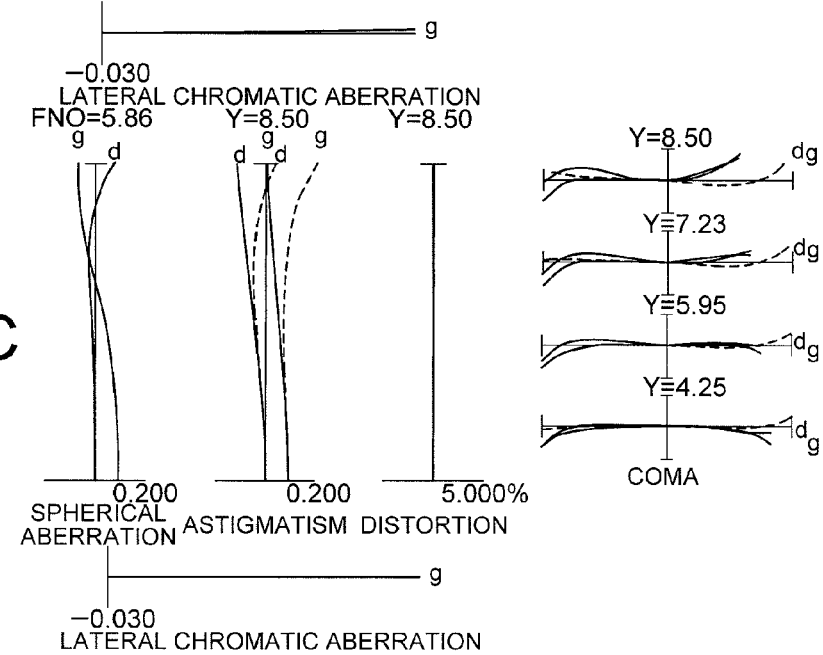

FIGS. 2A, 2B and 2C are graphs showing various aberrations of the zoom lens system according to Example 1 of the first embodiment, Example 5 of the second embodiment and Example 10 of the third embodiment, in which FIG. 2A shows various aberrations in a wide-angle end state, FIG. 2B shows various aberrations in an intermediate focal length state, and FIG. 2C shows various aberrations in a telephoto end state.

In respective graphs, FNO denotes an f-number, Y denotes an image height, d denotes an aberration curve at d-line (wavelength λ=587.6 nm), g denotes an aberration curve at g-line (wavelength λ=435.6 nm). In graphs showing spherical aberration, an f-number with respect to the maximum aperture is shown. In graphs showing astigmatism and distortion, the maximum value of the image height is shown. In graphs showing coma, value with respect to each image height is shown. In graphs showing astigmatism, a solid line indicates a sagittal image plane, and a broken line indicates a meridional image plane. Incidentally, the same notation is used in the following Examples, so that duplicated explanations are omitted.

As is apparent from the respective graphs, the zoom lens system according to Example 1 shows superb optical performance as a result of good corrections to various aberrations in each focal length state from the wide-angle end state to the telephoto end state.

Example 2

Figure 3:
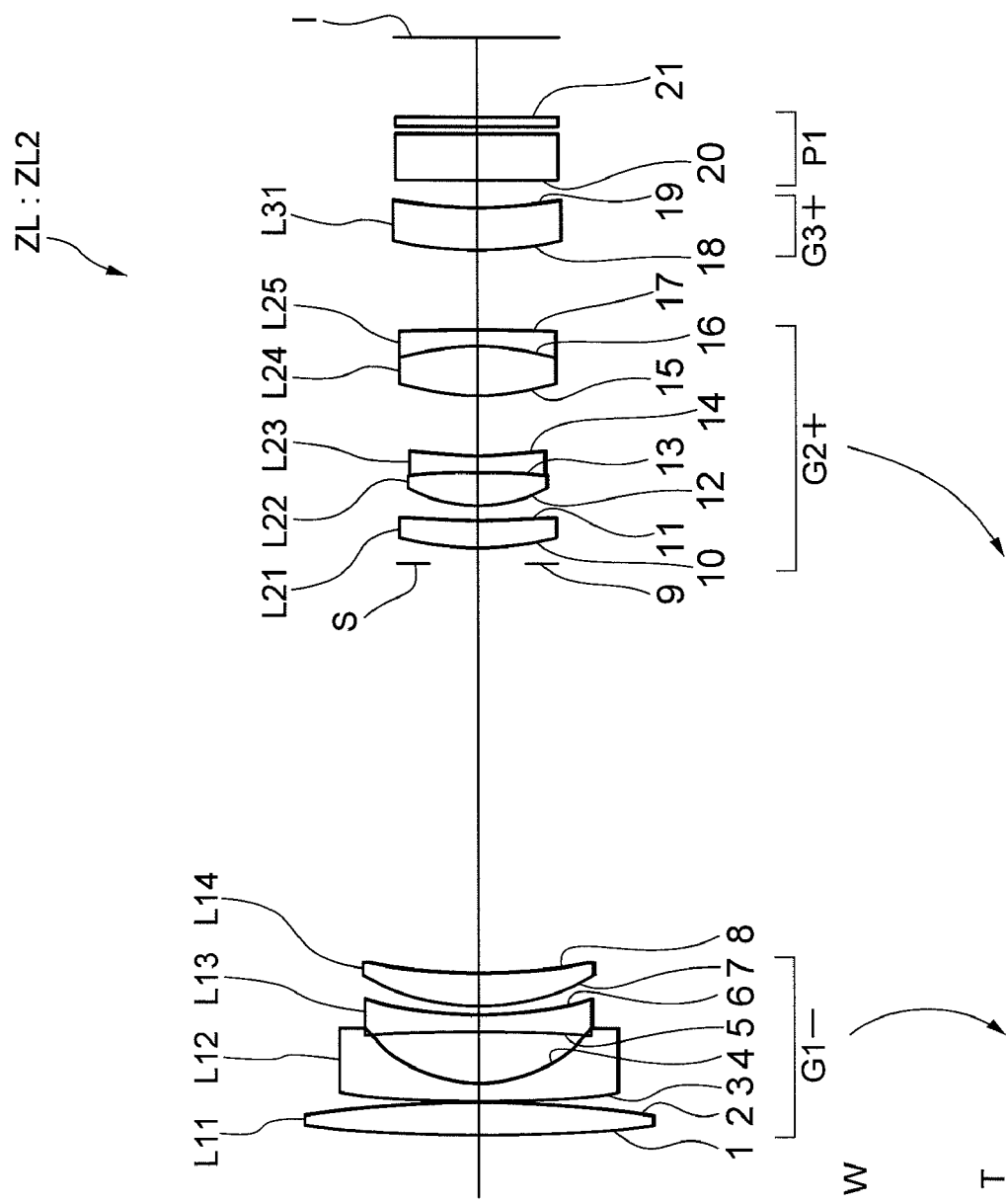
FIG. 3 is a sectional view showing a zoom lens system according to Example 2 of the first embodiment.

FIG. 3 is a sectional view showing a zoom lens system ZL2 according to Example 2 of the first embodiment. The zoom lens system ZL2 shown in FIG. 3 is composed of, in order from an object side, a first lens group G1 having negative refractive power, a second lens group G2 having positive refractive power, and a third lens group G3 having positive refractive power.

The first lens group G1 having negative refractive power as a whole is composed of four lenses that are, in order from the object side, a double convex positive lens L11, a negative meniscus lens L12 having a convex surface facing the object side, a double concave negative lens L13, and a positive meniscus lens L14 having a convex surface facing the object side.

The second lens group G2 having positive refractive power as a whole is composed of five lenses that are, in order from the object side, an aperture stop S, a positive meniscus lens L21 having a convex surface facing the object side, a cemented lens constructed by a double convex positive lens L22 cemented with a double concave negative lens L23, and a cemented lens constructed by a double convex positive lens L24 cemented with a negative meniscus lens L25 having a convex surface facing the image side.

The third lens group G3 having positive refractive power as a whole is composed of a lens that is a positive meniscus lens L31 having a concave surface facing the image side.

Various values associated with the zoom lens system ZL2 according to Example 2 are listed in Table 2. In Example 2, each of the tenth and seventeenth surfaces is formed with an aspherical surface. In (Aspherical Surface Data), conical coefficient κ and each aspherical coefficient A4 through A10 are shown.

In Example 2, a distance d1 along the optical axis between the first lens group G1 and the aperture stop S, a distance d2 along the optical axis between the second lens group G2 and the third lens group G3, and a total lens length tl vary upon zooming. In (Variable Distance Data), variable distances with respect to each focal length of the wide-angle end state, the intermediate focal length state, and the telephoto end state are shown.

TABLE 2

(Specifications)

|  | W | M | T |
|---|---|---|---|
| f = | 8.00 | 16.00 | 24.00 |
| Bf = | 5.0 | 5.0 | 5.0 |
| FNO = | 3.30 | 4.25 | 5.21 |
| 2ω = | 64.3° | 33.3° | 22.3° |

(Lens Data)

| i | r | d | vd | nd |
|---|---|---|---|---|
| 1 | 115.9747 | 2.0000 | 60.2 | 1.64000 |
| 2 | −68.9820 | 0.1000 | | |
| 3 | 100.0798 | 1.0000 | 43.0 | 1.83500 |
| 4 | 8.8788 | 3.2000 | | |
| 5 | −99.6193 | 1.0000 | 64.2 | 1.51680 |
| 6 | 26.1734 | 0.6000 | | |
| 7 | 14.2994 | 2.0000 | 23.8 | 1.84666 |
| 8 | 36.0022 | (d1) | | |
| 9 | 0.0000 | 1.0000 | Aperture Stop S | |
| *10 | 19.5560 | 1.5940 | 55.5 | 1.69680 |
| 11 | 35.4609 | 1.0000 | | |
| 12 | 10.0466 | 2.0000 | 65.5 | 1.60300 |
| 13 | −55.2194 | 1.0000 | 31.3 | 1.90366 |
| 14 | 24.6419 | 3.7407 | | |
| 15 | 17.1346 | 3.0000 | 82.6 | 1.49782 |
| 16 | −18.8985 | 1.0000 | 40.4 | 1.80610 |
| *17 | −49.4502 | (d2) | | |
| 18 | 24.8074 | 2.6000 | 70.5 | 1.48749 |
| 19 | 31.8764 | 2.1868 | | |
| 20 | 0.0000 | 3.2600 | 64.2 | 1.51680 |
| 21 | 0.0000 | (Bf) | | |

(Aspherical Surface Data)

Surface Number: 10

κ = −0.0005
A3 = 0.00000E+00
A4 = 3.32620E−05
A6 = −1.39860E−06
A8 = 6.68820E−08
A10 = 1.13770E−10

Surface Number: 17

κ = −153.5916
A3 = 0.00000E+00
A4 = 4.17600E−05
A6 = 4.39600E−06
A8 = −1.85930E−08
A10 = −2.23890E−10

(Variable Distances Data)

|  | W | M | T |
|---|---|---|---|
| f = | 8.00 | 16.00 | 24.00 |
| d1 = | 25.18977 | 6.77854 | 0.64146 |
| d2 = | 4.90615 | 12.96628 | 21.02640 |
| tl = | 67.37749 | 57.02638 | 58.94943 |

(Values for Conditional Expressions)

(1) dt/f2 = 0.037
(2) X2/ft = 0.672
(3) dt/ft = 0.027
(4) f2/ft = 0.718
(5) nd = 1.904

Figure 4A:
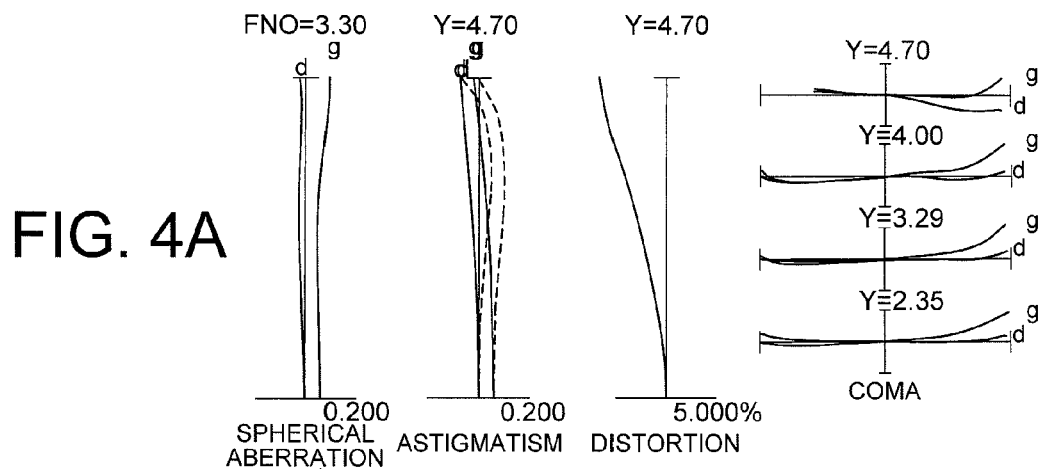
Figure 4B:
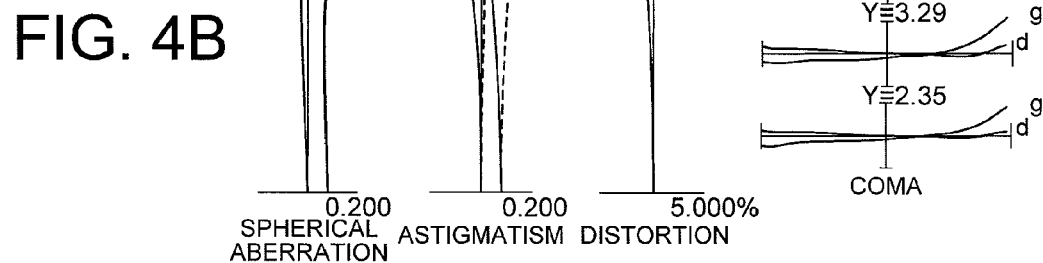
Figure 4C:
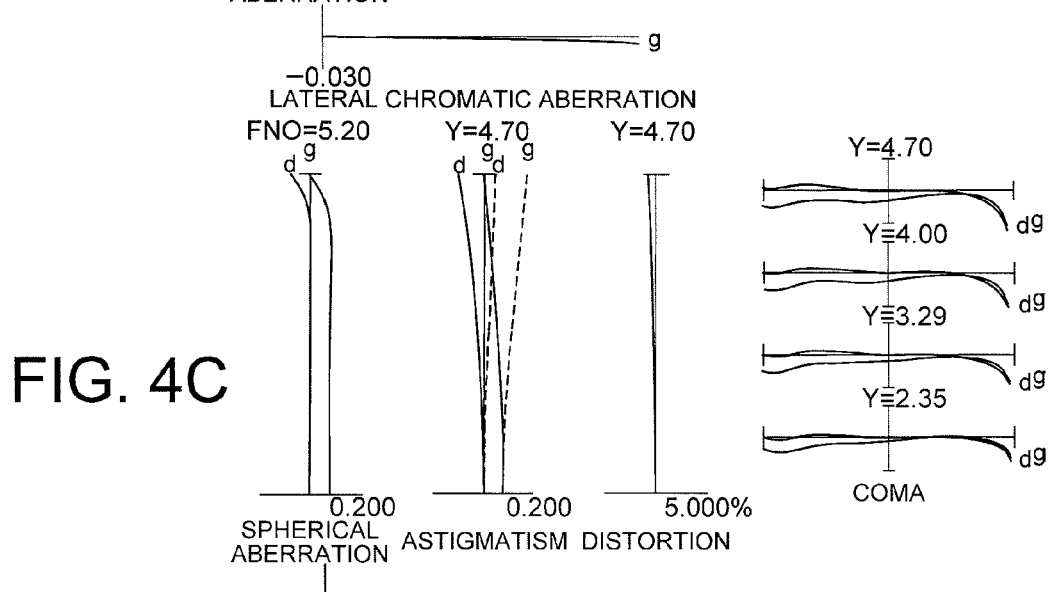

FIGS. 4A, 4B and 4C are graphs showing various aberrations of the zoom lens system according to Example 2 of the first embodiment, in which FIG. 4A shows various aberrations in the wide-angle end state, FIG. 4B shows various aberrations in the intermediate focal length state, and FIG. 4C shows various aberrations in the telephoto end state.

As is apparent from the respective graphs, the zoom lens system according to Example 2 shows superb optical performance as a result of good corrections to various aberrations in each focal length state from the wide-angle end state to the telephoto end state.

Example 3

Figure 5:
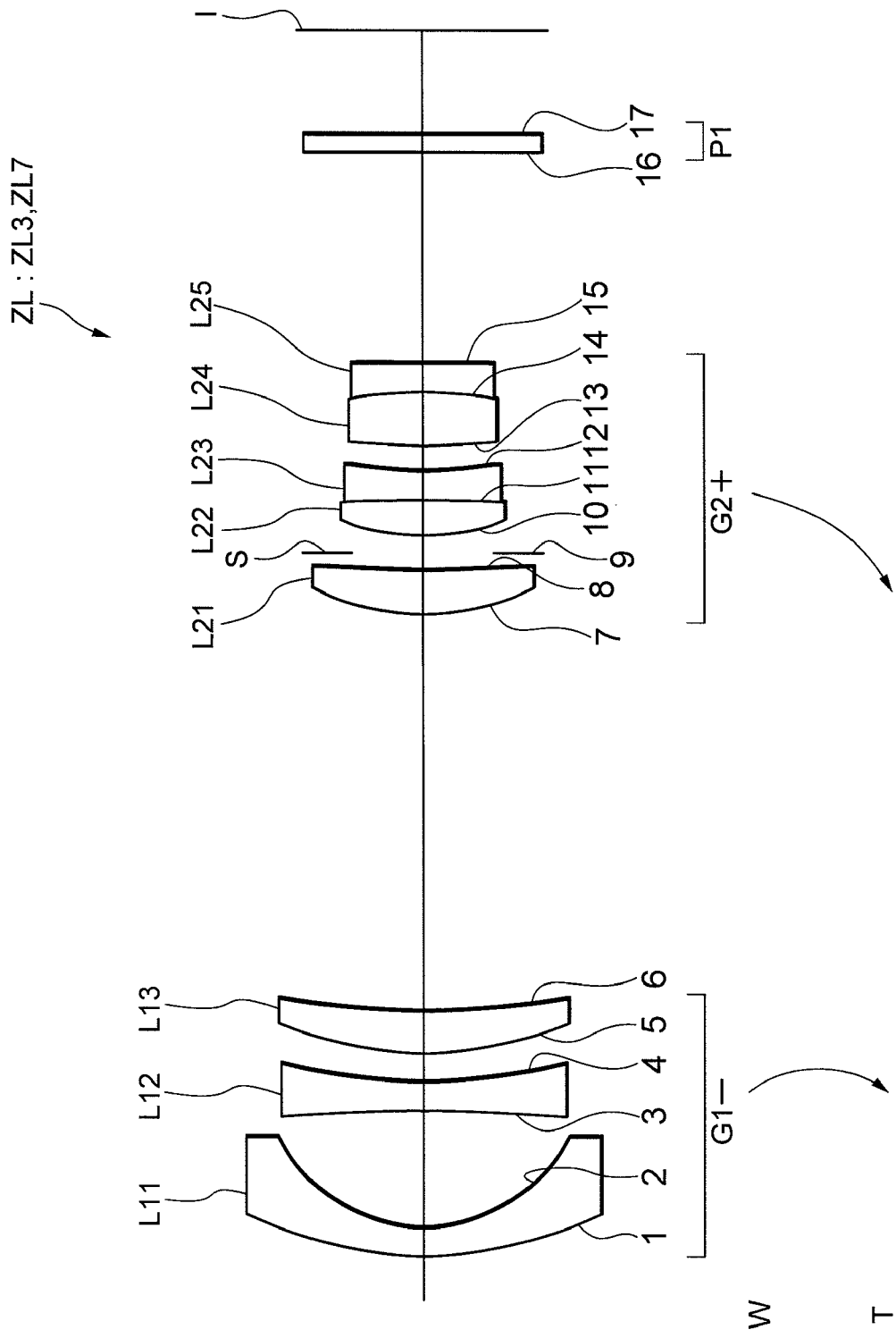
FIG. 5 is a sectional view showing a zoom lens system according to Example 3 of the first embodiment, and Example 7 of the second embodiment.

FIG. 5 is a sectional view showing a zoom lens system ZL3 according to Example 3 of the first embodiment. The zoom lens system ZL3 shown in FIG. 5 is composed of, in order from an object side, a first lens group G1 having negative refractive power, and a second lens group G2 having positive refractive power.

The first lens group G1 having negative refractive power as a whole is composed of three lenses that are, in order from the object side, a negative meniscus lens L11 having a convex surface facing the object side, a double concave negative lens L12, and a positive meniscus lens L13 having a convex surface facing the object side.

The second lens group G2 having positive refractive power as a whole is composed of five lenses that are, in order from the object side, a positive meniscus lens L21 having a convex surface facing the object side, an aperture stop S, a cemented lens constructed by a double convex positive lens L22 cemented with a double concave negative lens L23, and a cemented lens constructed by a double convex positive lens L24 cemented with a negative meniscus lens L25 having a convex surface facing the image side.

Various values associated with Example 3 are listed in Table 3. In Example 3, each of the first, second, and fifteenth surfaces is formed with an aspherical surface. In (Aspherical Surface Data), conical coefficient κ and each aspherical coefficient A4 through A10 are shown.

In Example 3, a distance d1 along the optical axis between the first lens group G1 and the second lens group G2, a distance d2 along the optical axis between the second lens group G2 and the low-pass filter P1, and a total lens length tl vary upon zooming. In (Variable Distance Data), variable distances with respect to each focal length of the wide-angle end state, the intermediate focal length state, and the telephoto end state are shown.

TABLE 3

(Specifications)

|  | W | M | T |
|---|---|---|---|
| f = | 5.10 | 8.75 | 15.00 |
| Bf = | 2.9 | 2.9 | 2.9 |
| FNO = | 3.60 | 4.53 | 6.04 |
| 2ω = | 62.5° | 37.9° | 22.6° |

(Lens Data)

| i | r | d | vd | nd |
|---|---|---|---|---|
| *1 | 10.0961 | 0.8000 | 40.1 | 1.85135 |
| *2 | 4.0283 | 3.2496 | | |
| 3 | −45.7285 | 0.8000 | 63.4 | 1.61800 |
| 4 | 16.3306 | 0.7800 | | |
| 5 | 9.9066 | 1.2000 | 23.8 | 1.84666 |
| 6 | 23.4229 | (d1) | | |
| 7 | 6.3806 | 1.2000 | 52.3 | 1.75500 |
| 8 | 28.6099 | 0.5000 | | |
| 9 | 0.0000 | 0.5000 | Aperture Stop S | |
| 10 | 6.6664 | 1.0000 | 65.5 | 1.60300 |
| 11 | −39.1993 | 0.8000 | 28.3 | 2.00330 |
| 12 | 11.0815 | 0.7078 | | |
| 13 | 18.6839 | 1.5000 | 82.6 | 1.49782 |

TABLE 3-continued

| | | | | |
|---|---|---|---|---|
| 14 | −10.6077 | 0.8000 | 40.4 | 1.80610 |
| *15 | −47.7071 | (d2) | | |
| 16 | 0.0000 | 0.5000 | 64.1 | 1.51680 |
| 17 | 0.0000 | (Bf) | | |

(Aspherical Surface Data)

Surface Number: 1

κ = 0.2118
A3 = 0.00000E+00
A4 = −1.03450E−04
A6 = 2.55850E−06
A8 = −8.03050E−09
A10 = −3.32810E−10

Surface Number: 2

κ = 0.3127
A3 = 0.00000E+00
A4 = 3.79380E−04
A6 = 3.05030E−05
A8 = −7.07950E−07
A10 = 5.03510E−08

Surface Number: 15

κ = −306.8406
A3 = 0.00000E+00
A4 = 1.58760E−03
A6 = 4.22070E−05
A8 = 1.77320E−05
A10 = −1.78120E−06

(Variable Distances Data)

| | W | M | T |
|---|---|---|---|
| F = | 5.12 | 8.65 | 14.65 |
| d1 = | 11.07012 | 4.68429 | 0.96652 |
| d2 = | 5.83567 | 9.62250 | 16.10679 |
| tl = | 34.14316 | 31.54416 | 34.31067 |

(Values for Conditional Expressions)

(1) dt/f2 = 0.107
(2) X2/ft = 0.685
(3) dt/ft = 0.064
(4) f2/ft = 0.600
(5) nd = 2.003

Figure 6A:
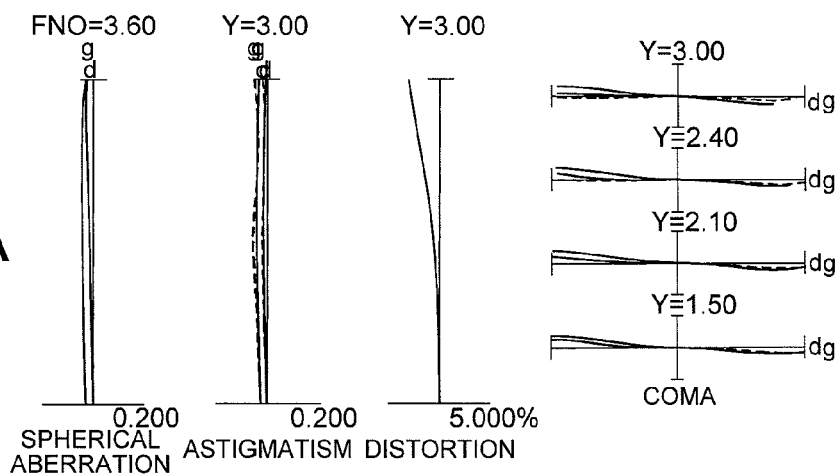
Figure 6B:
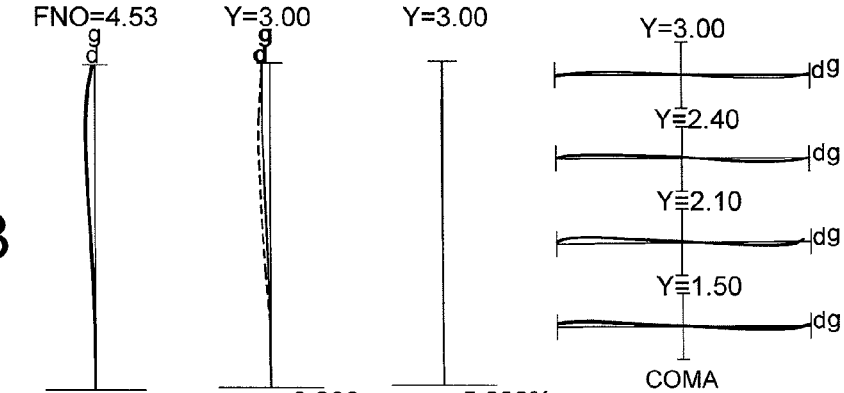
Figure 6C:
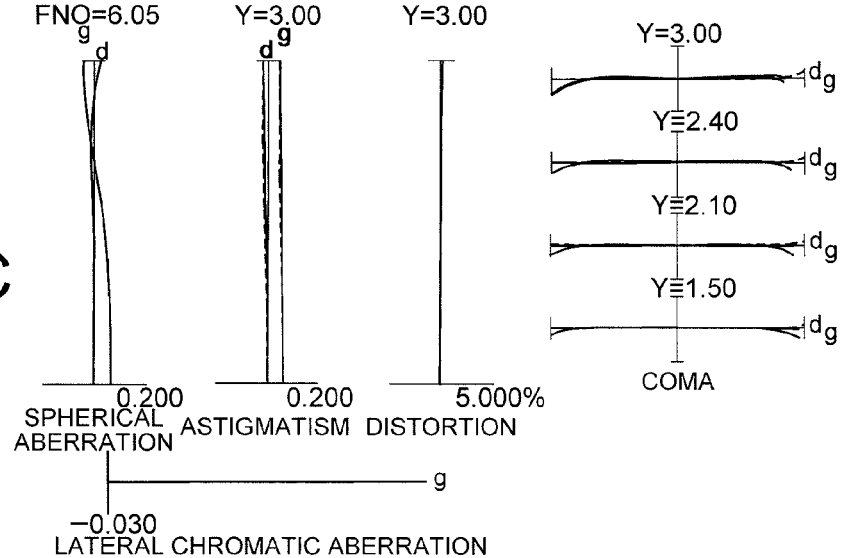

FIGS. 6A, 6B and 6C are graphs showing various aberrations of the zoom lens system according to Example 3 of the first embodiment, in which FIG. 6A shows various aberrations in the wide-angle end state, FIG. 6B shows various aberrations in the intermediate focal length state, and FIG. 6C shows various aberrations in the telephoto end state.

As is apparent from the respective graphs, the zoom lens system according to Example 3 shows superb optical performance as a result of good corrections to various aberrations in each focal length state from the wide-angle end state to the telephoto end state.

Example 4

FIG. 7 is a sectional view showing a zoom lens system ZL4 according to Example 4 of the first embodiment. The zoom lens system ZL4 shown in FIG. 7 is composed of, in order from an object side, a first lens group G1 having negative refractive power, a second lens group G2 having positive refractive power, and a third lens group G3 having positive refractive power.

The first lens group G1 having negative refractive power as a whole is composed of three lenses that are, in order from the object side, a negative meniscus aspherical lens L11 having a convex surface facing the object side, a double concave negative lens L12, and a positive meniscus lens L13 having a convex surface facing the object side.

The second lens group G2 having positive refractive power as a whole is composed of five lenses that are, in order from the object side, a cemented lens constructed by a double convex positive lens L21 cemented with a negative meniscus lens L22 having a convex surface facing an image side, an aperture stop S, a cemented lens constructed by a double convex positive lens L23 cemented with a negative meniscus lens L24 having a convex surface facing the image side, and a negative meniscus lens L25 having a concave surface facing the image side.

The third lens group G3 having positive refractive power as a whole is composed of a lens that is a positive meniscus lens L31 having a convex surface facing the image side.

Various values associated with Example 4 are listed in Table 4. In Example 4, each of the second, ninth, and fifteenth surfaces is formed with an aspherical surface. In (Aspherical Surface Data), conical coefficient κ and each aspherical coefficient A4 through A10 are shown.

In Example 4, a distance d1 along the optical axis between the first lens group G1 and the second lens group G2, a distance d2 along the optical axis between the second lens group G2 and the third lens group G3, and a total lens length tl vary upon zooming. In (Variable Distance Data), variable distances with respect to each focal length of the wide-angle end state, the intermediate focal length state, and the telephoto end stat are shown.

TABLE 4

(Specifications)

| | W | M | T |
|---|---|---|---|
| f = | 5.10 | 8.65 | 14.65 |
| Bf = | 4.0 | 4.0 | 4.0 |
| FNO = | 3.74 | 4.24 | 5.92 |
| 2ω = | 71.5° | 44.1° | 26.7° |

(Lens Data)

| i | r | d | νd | nd |
|---|---|---|---|---|
| 1 | 11.0022 | 0.8000 | 40.1 | 1.85135 |
| *2 | 4.0283 | 3.4000 | | |
| 3 | −45.7285 | 0.8000 | 63.4 | 1.61800 |
| 4 | 20.6681 | 0.5000 | | |
| 5 | 9.9260 | 1.2000 | 23.8 | 1.84666 |
| 6 | 22.9745 | (d1) | | |
| 7 | 6.5277 | 1.5000 | 82.6 | 1.49782 |
| 8 | −19.6947 | 0.8000 | 40.4 | 1.80610 |
| *9 | −20.5648 | 1.5470 | | |
| 10 | 0.0000 | 0.5000 | Aperture Stop S | |
| 11 | 16.3915 | 2.5792 | 65.5 | 1.60300 |
| 12 | −5.4283 | 0.5892 | 23.8 | 1.84666 |
| 13 | −9.9873 | 0.6159 | | |
| 14 | 2365.6880 | 0.3437 | 55.5 | 1.69680 |
| *15 | 8.5478 | (d2) | | |
| 16 | −37.3779 | 0.6300 | 70.5 | 1.48749 |
| 17 | −31.0641 | 1.0000 | | |
| 18 | 0.0000 | 0.5000 | 64.1 | 1.51680 |
| 19 | 0.0000 | (Bf) | | |

(Aspherical Surface Data)

Surface Number: 2

κ = 0.4514
A3 = 0.00000E+00
A4 = 4.40290E−04
A6 = 3.18910E−05
A8 = −9.06920E−07
A10 = 7.13450E−08

TABLE 4-continued

Surface Number: 9

κ = −0.8519
A3 = 0.00000E+00
A4 = 3.37050E−04
A6 = −4.92520E−06
A8 = 5.63380E−06
A10 = −6.27920E−07

Surface Number: 15

κ = 1.2569
A3 = 0.00000E+00
A4 = 1.23430E−03
A6 = −8.93170E−05
A8 = 4.94330E−05
A10 = −5.65020E−06

(Variable Distances Data)

|      | W        | M        | T        |
|------|----------|----------|----------|
| f =  | 5.10     | 8.65     | 14.65    |
| d1 = | 10.90199 | 4.67628  | 1.01321  |
| d2 = | 2.75644  | 6.47321  | 12.75508 |
| tl = | 34.96343 | 32.45449 | 35.07329 |

(Values for Conditional Expressions)

(1) dt/f2 = 0.113
(2) X2/ft = 0.683
(3) dt/ft = 0.069
(4) f2/ft = 0.614
(5) nd = 1.847

Figure 8A:
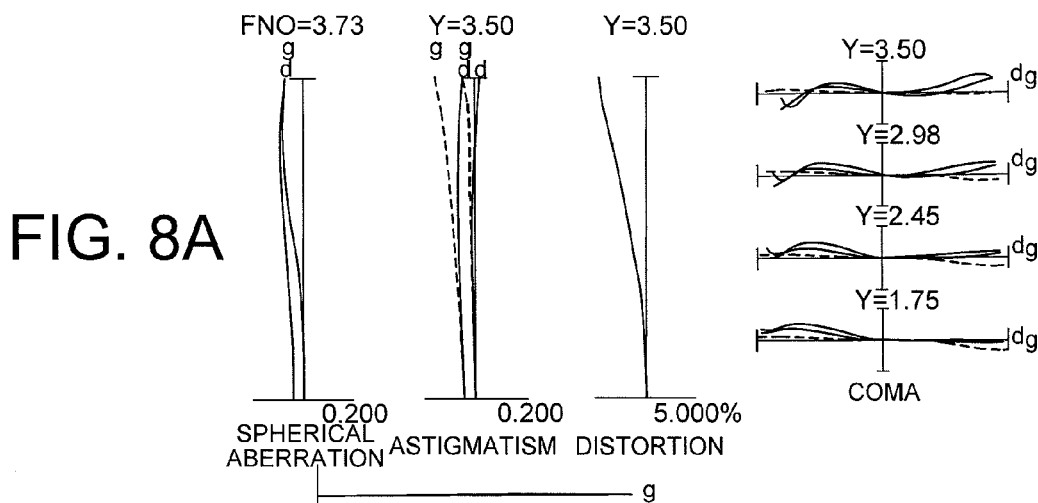
Figure 8B:
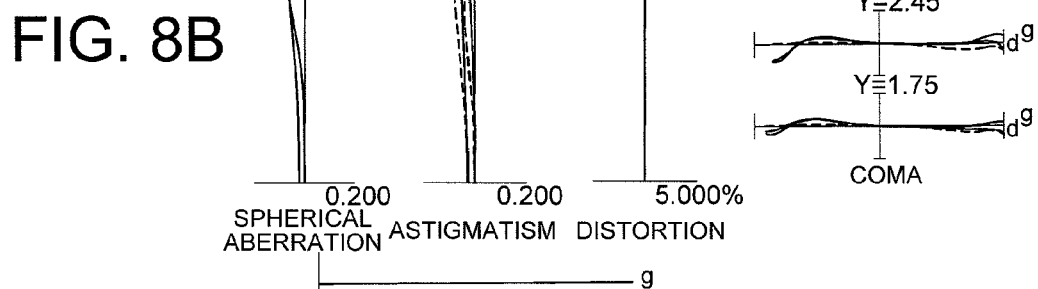
Figure 8C:
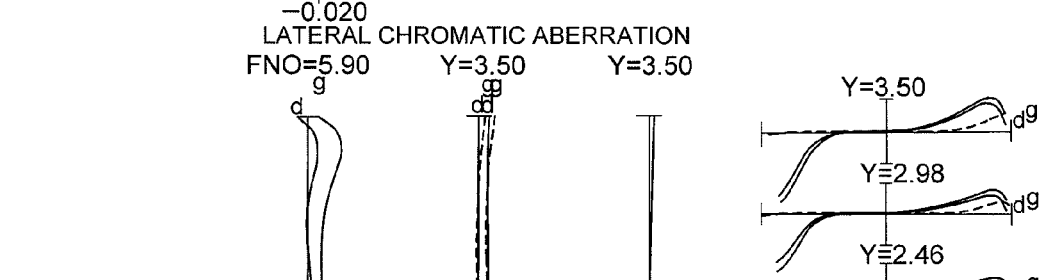

FIGS. 8A, 8B and 8C are graphs showing various aberrations of the zoom lens system according to Example 4 of the first embodiment, in which FIG. 8A shows various aberrations in the wide-angle end state, FIG. 8B shows various aberrations in the intermediate focal length state, and FIG. 8C shows various aberrations in the telephoto end state.

As is apparent from the respective graphs, the zoom lens system according to Example 4 shows superb optical performance as a result of good corrections to various aberrations in each focal length state from the wide-angle end state to the telephoto end state.

Second Embodiment

A second embodiment according to the present invention is explained below with reference to accompanying drawings. Incidentally, in the specification, unless otherwise stated a wide-angle end state or a telephoto end state shows a state upon focusing on infinity. As shown in FIG. 1, a zoom lens system ZL is composed of, in order from an object side, a first lens group G1 having negative refractive power and a second lens group G2 having positive refractive power. Upon varying a state of lens positions from a wide-angle end state to a telephoto end state, a distance between the first lens group G1 and the second lens group G2 varies.

The first lens group G1 consists of one or two negative lens components, and one or two positive lens components. With this configuration, it becomes possible to downsize the first lens group G1. Moreover, since off-axis rays can be varied toward the optical axis, it becomes possible to excellently correct aberrations with suppressing generation of high order aberrations.

The second lens group G2 includes at least two cemented lenses and is composed of all positive lens components. In a conventional negative-leading zoom lens system having a simple construction, in order to correct aberrations in the second lens group, positive lens components and negative lens components are disposed with a good balance to cancel various aberrations. Accordingly, negative power having strong curvature tends to be required, so that high order spherical aberration tends to be generated and the exit pupil tends to become close. However, in a zoom lens system ZL according to the present embodiment, with constructing the second lens group G2 by all positive lens components, since refractive power of each lens element can be small, generation of aberrations can be made small with suppressing a bad influence to optical performance caused by a manufacturing error. Moreover, that cemented lenses are all positive lens components means that although including negative lenses in the cemented lenses, each combined focal length is positive, so that, in each lens component, spherical aberration and coma can be excellently corrected and the amount of remained aberration after cemented can also be suppressed. Moreover, with decreasing the number of lenses in the second lens group G2, it becomes possible to downsize the zoom lens system ZL according to the present embodiment.

When the second lens group G2 is constructed by a positive-negative-positive configuration, power of each lens component becomes strong, so that the exit pupil gets near to the image side resulting in the cause of shading. Accordingly, the second lens group G2 preferably includes three positive lens components. Since curvature becomes weak in comparison with a case composing a positive-negative-positive configuration, the amount of remained aberrations becomes small, so that manufacturing error can be suppressed.

The second lens group G2 preferably includes at least one cemented lens constructed by a positive lens disposed to the object side cemented with a negative lens disposed to the image side, and the most image side lens surface of the cemented lens is preferably a concave surface facing the image side. With this configuration, spherical aberration can excellently be corrected. Moreover, since an angle of view becomes wider, a high zoom ratio can be secured. Incidentally, when the most image side lens surface of the cemented lens is not a concave surface facing the image side, high order aberration increases, so that it is undesirable. Moreover, Petzval sum becomes difficult to be corrected, and curvature of field becomes worse in the wide-angle end state. Furthermore, spherical aberration increases, so that it is undesirable.

The second lens group G2 preferably includes two cemented lenses disposed consecutively, and, among the two cemented lenses, a cemented lens disposed to the object side preferably includes a positive lens to the object side and a negative lens to the image side, and a cemented lens disposed to the image side preferably includes a negative lens to the object side and a positive lens to the image side. With this configuration, coma and high order aberrations can be excellently corrected.

When the exit pupil is necessary to be disposed further away, the second lens group G2 preferably includes two cemented lens disposed consecutively, and each of the two cemented lens preferably includes a positive lens to the object side and a negative lens to the image side. With this configuration, the exit pupil can be got away with keeping the whole system downsized without much deteriorating aberrations. In this case, an aspherical surface is preferably formed on the most image side lens surface of the image side cemented lens.

The second lens group G2 preferably includes at least two double convex positive lenses.

Moreover, the second lens group G2 preferably includes a plurality of cemented lenses, and a positive lens composing the cemented lens disposed to the object side among the cemented lenses is preferably a double convex positive lens. When the positive lens disposed to the object side is made to be a double convex positive lens in this manner, spherical aberration can be excellently corrected. Moreover, since positive power becomes strong, Petzval sum becomes further large, so that curvature of field can be excellently corrected. Accordingly, it is desirable.

In such a zoom lens system ZL, the following conditional expression (6) is preferably satisfied:

$$0.02 < Y/\Sigma f < 0.26 \qquad (6)$$

where $\Sigma f$ denotes a combined focal length of an optical system from the most object side lens surface of the cemented lens disposed to the object side among the at least two cemented lenses in the second lens group G2 to the most image side lens surface of the cemented lens disposed to the image side among the at least two cemented lenses in the second lens group G2, and Y denotes the maximum image height on the image plane.

Conditional expression (6) defines the combined focal length of the cemented lenses disposed in the second lens group G2 with respect to the image height. Since the image height is denoted by f tan θ, when the ratio $Y/\Sigma f$ is equal to or exceeds the upper limit of conditional expression (6), the combined focal length of the cemented lens becomes excessively large, so that although the back focal length can be sufficiently secured, the second lens group G2 as a whole becomes large, so that it becomes difficult to realize a downsized zoom lens system ZL. Moreover, since the second lens group G2 is composed of all positive lens components, spherical aberration is difficult to be corrected, and variation in coma with respect to the angle of view becomes large. In order to improve this, curvature of field and distortion become difficult to be corrected, so that it is undesirable. In order to secure the effect of the present embodiment, it is preferable to set the upper limit of conditional expression (6) to 0.24. In order to further secure the effect of the present embodiment, it is most preferable to set the upper limit of conditional expression (6) to 0.20. On the other hand, when the ratio $Y/\Sigma f$ is equal to or falls below the lower limit of conditional expression (6), the angle of view becomes small, so that the image height on the image plane cannot be secured. Otherwise, a sufficient zoom ratio cannot be secured. Moreover, since power of the negative component included in the cemented lens becomes strong, it becomes difficult to correct various aberrations such as spherical aberration and upper coma. Otherwise, the total lens length becomes too small, so that the exit pupil moves toward the image side. Accordingly, chipping of light on the image plane such as a so-called shading occurs, so that it is undesirable. In order to secure the effect of the present embodiment, it is preferable to set the lower limit of conditional expression (6) to 0.05. In order to further secure the effect of the present embodiment, it is most preferable to set the lower limit of conditional expression (6) to 0.08.

In a zoom lens system ZL according to the present embodiment, the following conditional expression (7) is preferably satisfied:

$$0.03 < FNOW/TL \leq 0.07 (1/mm) \qquad (7)$$

where FNOW denotes an f-number of the zoom lens system ZL in the wide-angle end state, and TL denotes the maximum total lens length among the total lens length that varies upon zooming from the wide-angle end state to the telephoto end state.

Conditional expression (7) defines the f-number in the wide-angle end state and the total lens length. With satisfying conditional expression (7), the dimension of the whole optical system with respect to the angle of view can be guessed. When the ratio FNOW/TL exceeds the upper limit of conditional expression (7), power of each lens group becomes strong, so that it becomes difficult to correct various aberrations such as spherical aberration. Otherwise, a sufficient angle of view cannot be secured, so that the zoom ratio cannot be secured. Moreover, the total lens length becomes too small, so that the exit pupil moves toward the image side. Accordingly, chipping of light on the image plane such as a so-called shading occurs, so that it is undesirable. In order to secure the effect of the present embodiment, it if preferable to set the upper limit of conditional expression (7) to 0.065. In order to further secure the effect of the present embodiment, it if most preferable to set the upper limit of conditional expression (7) to 0.06. On the other hand, when the ratio FNOW/TL is equal to or falls below the lower limit of conditional expression (7), the whole lens system becomes large. When this is forcibly improved, curvature of field and distortion become difficult to be sufficiently corrected, so that it is undesirable. In order to secure the effect of the present embodiment, it is preferable to set the lower limit of conditional expression (7) to 0.032. In order to further secure the effect of the present embodiment, it is most preferable to set the lower limit of conditional expression (7) to 0.033.

In a zoom lens system ZL according to the present embodiment, the following conditional expression (8) is preferably satisfied:

$$0.04 < (fw \cdot ft)^{1/2}/\Sigma f < 0.70 \qquad (8)$$

where $\Sigma f$ denotes a combined focal length of an optical system from the most object side lens surface of the cemented lens disposed to the object side among at least two cemented lenses in the second lens group G2 to the most image side lens surface of the cemented lens disposed to the image side among at least two cemented lenses in the second lens group G2, fw denotes a focal length of the zoom lens system in the wide-angle end state, and ft denotes a focal length of the zoom lens system in the telephoto end state.

Conditional expression (8) defines the combined focal length of the optical system from the most object side lens surface of the cemented lens disposed to the object side among at least two cemented lenses in the second lens group G2 to the most image side lens surface of the cemented lens disposed to the image side among at least two cemented lenses in the second lens group G2, and an intermediate focal length of the zoom lens system ZL. When the ratio $(fw \cdot ft)^{1/2}/\Sigma f$ is equal to or exceeds the upper limit of conditional expression (8), the radius of curvature becomes too small, so that variation in coma upon zooming increases. Accordingly, it becomes difficult to correct off-axis aberrations, so that it is undesirable. In order to secure the effect of the present embodiment, it is preferable to set the upper limit of conditional expression (8) to 0.6. In order to further secure the effect of the present embodiment, it is most preferable to set the upper limit of conditional expression (8) to 0.4.

On the other hand, when the ratio $(fw \cdot ft)^{1/2}/\Sigma f$ is equal to or falls below the lower limit of conditional expression (8), the combined focal length of the cemented lens becomes excessively large, so that the moving amount of the second lens group G2 becomes large, and the distance between the first lens group G1 and the second lens group G2 in the telephoto end state cannot be secured. Otherwise, burden to the other lenses in the second lens group G2 becomes large, and spherical aberration and coma become difficult to be corrected, so that it is undesirable. In order to secure the effect of the present embodiment, it is preferable to set the lower limit of conditional expression (8) to 0.06. In order to further secure the effect of the present embodiment, it is most preferable to set the lower limit of conditional expression (8) to 0.08.

In a zoom lens system ZL according to the present embodiment, the second lens group G2 includes at least one cemented lens constructed by a positive lens disposed to the object side cemented with a negative lens disposed to the image side, and the most image side lens surface of the cemented lens is preferably a concave surface facing the image side. With the concave surface, it becomes possible to excellently correct spherical aberration. Moreover, the angle of view becomes wider, so that a high zoom ratio can be secured.

Moreover, the following conditional expression (5) is preferably satisfied:

$$1.77 < nd \quad (5)$$

where nd denotes a refractive index at d-line of at least one of the negative lens composing the cemented lens.

Conditional expression (5) defines a refractive index at d-line ($\lambda$=587.6 nm) of the negative lens in the second lens group G2. However, conditional expression (5) has already explained above, so that duplicated explanations are omitted.

In a zoom lens system ZL according to the present embodiment, at least a portion of the second lens group is moved in a direction including a component perpendicular to the optical axis. With this configuration, it becomes possible to obtain excellent optical performance with fewer decentering coma upon vibration reduction.

Figure 24:
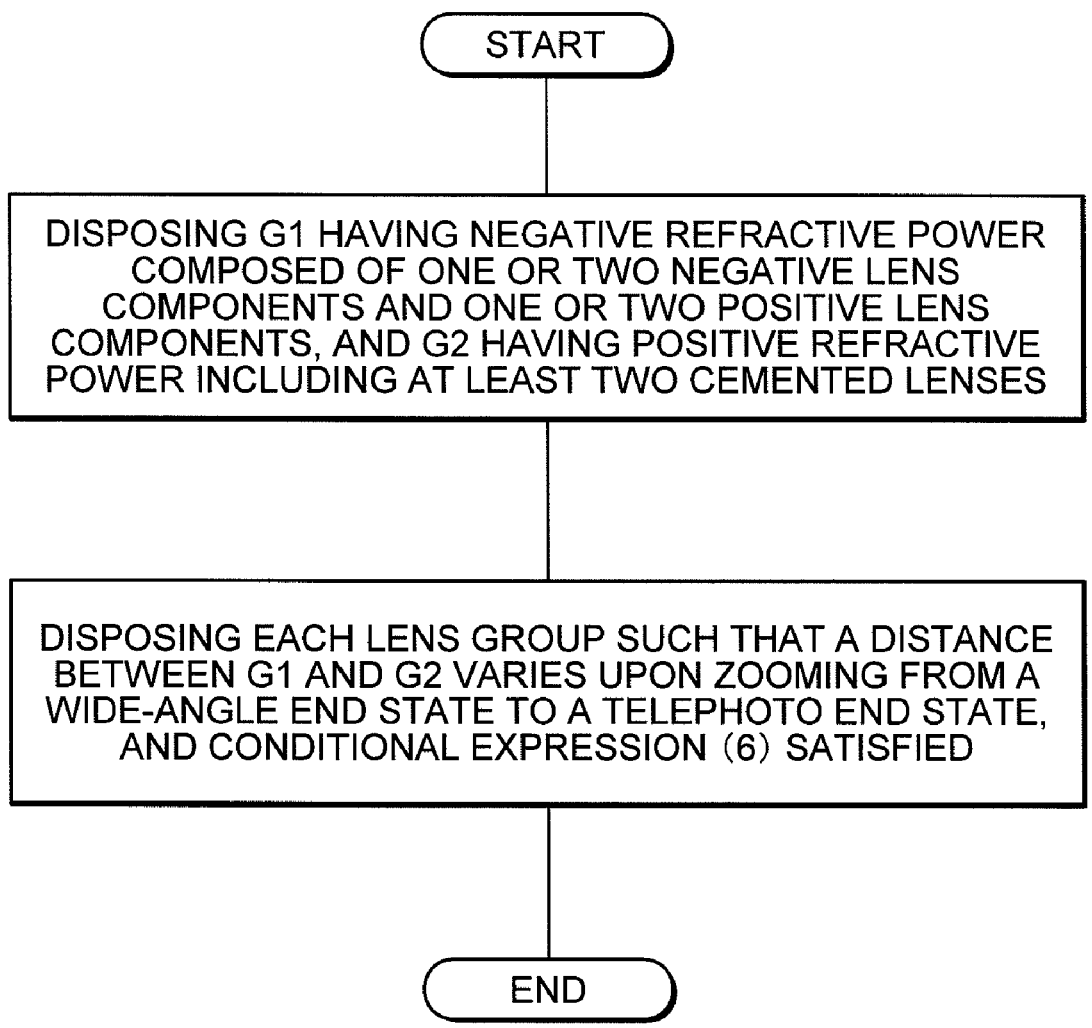
FIG. 24 is a flowchart schematically explaining a method for manufacturing the lens system according to the second embodiment.

An outline of a method for manufacturing a zoom lens system including, in order from an object side, a first lens group G1 and a second lens group G2 is explained below with reference to FIG. 24.

At first, the first lens group G1 having negative refractive power as a whole composed of one or two negative lens component and one or two positive lens component, and the second lens group G2 having positive refractive power as a whole including at least two cemented lenses composed of positive lens components are disposed into a lens barrel having a cylindrical shape.

Then, each lens group is disposed such that a distance between the first lens group G1 and the second lens group G2 varies upon zooming from a wide-angle end state to a telephoto end state, and the following conditional expression (6) is satisfied:

$$0.02 < Y/\Sigma f < 0.26 \quad (6)$$

where Y denotes the maximum image height on the image plane, and $\Sigma f$ denotes a combined focal length of an optical system from the most object side lens surface of the cemented lens disposed to the object side among the at least two cemented lenses in the second lens group G2 to the most image side lens surface of the cemented lens disposed to the image side among the at least two cemented lenses in the second lens group G2.

Each example according to the second embodiment of the present invention is explained below with reference to accompanying drawings. FIG. 1 is a sectional view showing a zoom lens system according to an example of the second embodiment, and refractive power distribution of the zoom lens system ZL is shown, and movement of each lens group upon varying the focal length from the wide-angle end state (W) to the telephoto end state (T) is shown by an arrow on the lower side in FIG. 1. The zoom lens system ZL1 shown in FIG. 1 is composed of, in order from an object side, a first lens group G1 having negative refractive power, and a second lens group G2 having positive refractive power. The zoom lens system ZL1 varies a distance between the first lens group G1 and the second lens group G2 upon varying lens positions from the wide-angle end state to the telephoto end state.

In each example, a low-pass filter P1 that blocks the spatial frequency exceeding resolution limit of the solid-state imaging device such as a CCD disposed on the image plane I is disposed between the second lens group G2 and the image plane I (in Examples 8, between the third lens group G3 and the image plane I).

Example 5

FIG. 1 is a sectional view showing a zoom lens system ZL5 according to Example 5 of the second embodiment. The zoom lens system ZL5 shown in FIG. 1 is composed of, in order from an object side, a first lens group G1 having negative refractive power, and a second lens group G2 having positive refractive power.

The first lens group G1 having negative refractive power as a whole is composed of three lenses that are, in order from the object side, a negative meniscus lens L11 having a convex surface facing the object side, a double concave negative lens L12, and a positive meniscus lens L13 having a convex surface facing the object side.

The second lens group G2 having positive refractive power as a whole is composed of five lenses that are, in order from the object side, a positive meniscus lens L21 having a convex surface facing the object side, an aperture stop S, a cemented lens constructed by a double convex positive lens L22 cemented with a double concave negative lens L23, and a cemented lens constructed by a double convex positive lens L24 cemented with a negative meniscus lens L25 having a concave surface facing the object side.

Various values associated with Example 5 are listed in Table 5. In Example 5, each of the first, second, and fifteenth surfaces is formed with an aspherical surface. In (Aspherical Surface Data), conical coefficient κ and each aspherical coefficient A4 through A10 are shown.

In Example 5, a distance d1 along the optical axis between the first lens group G1 and the second lens group G2, a distance d2 along the optical axis between the second lens group G2 and the low-pass filter P1, and a total lens length tl vary upon zooming. In (Variable Distance Data), variable distances with respect to each focal length of the wide-angle end state, the intermediate focal length state, and the telephoto end state are shown.

In (Values for Conditional Expressions), a value for each conditional expression is shown. Here, $\Sigma f$ denotes a combined focal length of an optical system from the most object side lens surface of the cemented lens disposed to the object side among the at least two cemented lenses in the second lens group G2 to the most image side lens surface of the cemented lens disposed to the image side among the at least two cemented lenses in the second lens group G2, Y denotes the maximum image height on the image plane, FNOW denotes an f-number in the wide-angle end state, TL denotes the maximum total lens length among the total lens length that varies upon zooming from the wide-angle end state to the telephoto end state, fw denotes a focal length of the zoom lens system in the wide-angle end state, ft denotes a focal length of the zoom lens system in the telephoto end state, and nd denotes a refractive index at d-line of the negative lens disposed to the most image side of the cemented lens disposed to the object side in the second lens group G2. The explanation of reference symbols is the same in the following Examples.

TABLE 5

(Specifications)

|  | W | M | T |
|---|---|---|---|
| f = | 10.25 | 17.30 | 29.30 |
| Bf = | 5.4 | 5.4 | 5.4 |
| FNO = | 3.60 | 4.50 | 5.86 |
| 2ω = | 82.7° | 53.0° | 32.4° |

(Lens Data)

| i | r | d | νd | nd |
|---|---|---|---|---|
| *1 | 25.5785 | 1.3000 | 40.1 | 1.85135 |
| *2 | 8.0567 | 5.7929 | | |
| 3 | −91.4570 | 1.0000 | 63.4 | 1.61800 |
| 4 | 39.4179 | 1.1850 | | |
| 5 | 19.9537 | 2.4000 | 23.8 | 1.84666 |
| 6 | 62.1323 | (d1) | | |
| 7 | 13.4068 | 1.5940 | 55.5 | 1.69680 |
| 8 | 57.0304 | 1.0000 | | |
| 9 | 0.0000 | 1.0000 | Aperture Stop S | |
| 10 | 12.7614 | 2.0000 | 65.5 | 1.60300 |
| 11 | −76.8213 | 1.0000 | 31.3 | 1.90366 |
| 12 | 20.9431 | 3.7407 | | |
| 13 | 26.3626 | 3.0000 | 82.6 | 1.49782 |
| 14 | −14.2354 | 1.0000 | 40.4 | 1.80610 |
| *15 | −51.9777 | (d2) | | |
| 16 | 0.0000 | 3.5000 | 64.1 | 1.51680 |
| 17 | 0.0000 | (Bf) | | |

(Aspherical Surface Data)

Surface Number: 1

κ = 0.2118
A3 = 0.00000E+00
A4 = −1.29310E−05
A6 = 7.99520E−08
A8 = −6.27380E−11
A10 = −6.50010E−13

Surface Number: 2

κ = 0.3044
A3 = 0.00000E+00
A4 = 5.73110E−05
A6 = 3.71930E−07
A8 = 1.83250E−09
A10 = 3.44660E−11

Surface Number: 15

κ = −153.5916
A3 = 0.00000E+00
A4 = 4.17600E−05
A6 = 4.39600E−06
A8 = −1.85930E−08
A10 = −2.23890E−10

(Variable Distances Data)

|  | W | M | T |
|---|---|---|---|
| f = | 10.25 | 17.30 | 29.30 |
| d1 = | 21.31135 | 8.63141 | 1.08108 |
| d2 = | 10.96792 | 18.43769 | 31.15218 |
| tl = | 66.76193 | 61.55175 | 66.71592 |

(Values for Conditional Expressions)

(5) nd = 1.904
(6) Y/Σf = 0.133
(7) FNOW/TL = 0.054
(8) (fw · ft)$^{1/2}$/Σf = 0.272

FIGS. 2A, 2B and 2C are graphs showing various aberrations of the zoom lens system according to Example 5 of the second embodiment, in which FIG. 2A shows various aberrations in a wide-angle end state, FIG. 2B shows various aberrations in an intermediate focal length state, and FIG. 2C shows various aberrations in a telephoto end state.

As is apparent from the respective graphs, the zoom lens system according to Example 5 shows superb optical performance as a result of good corrections to various aberrations in each focal length state from the wide-angle end state to the telephoto end state.

Example 6

Figure 9:
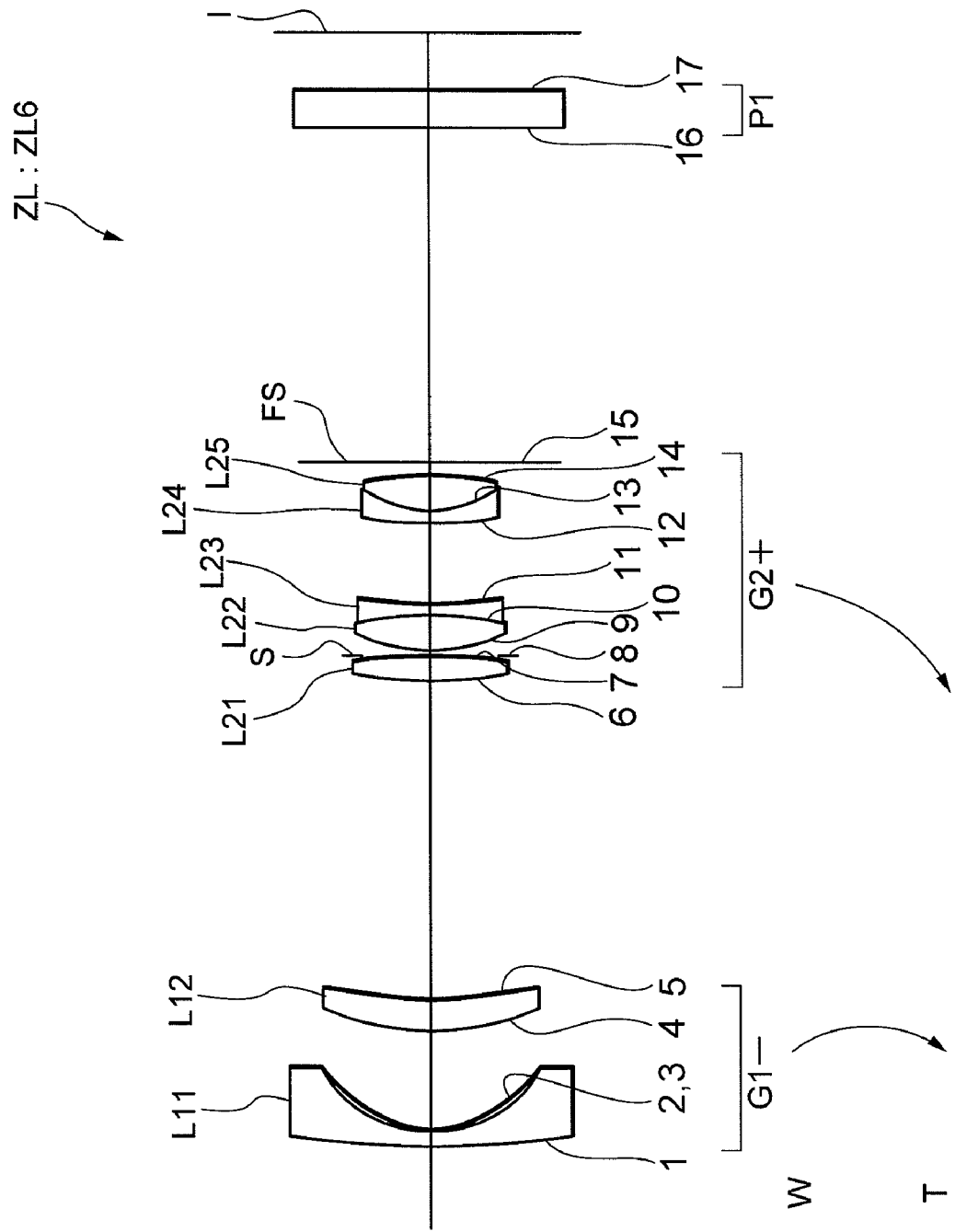
FIG. 9 is a sectional view showing a zoom lens system according to Example 6 of the second embodiment.

FIG. 9 is a sectional view showing a zoom lens system ZL6 according to Example 6 of the second embodiment. The zoom lens system ZL6 shown in FIG. 9 is composed of, in order from an object side, a first lens group G1 having negative refractive power, and a second lens group G2 having positive refractive power.

The first lens group G1 having negative refractive power as a whole is composed of two lenses that are, in order from the object side, a negative meniscus compound-type aspherical lens L11, constructed by a glass material and a resin material, having a convex surface facing the object side and an aspherical surface formed on the image side surface, and a positive meniscus lens L12 having a convex surface facing the object side.

The second lens group G2 having positive refractive power as a whole is composed of five lenses that are, in order from the object side, a double convex positive lens L21, an aperture stop S, a cemented lens constructed by a double convex positive lens L22 cemented with a double concave negative lens L23, and a cemented lens constructed by a negative meniscus lens L24 having a convex surface facing the object side cemented with a double convex positive lens L25. In Example 6, a flare stopper FS is disposed between the second lens group G2 and the image plane I, and moved together with the second lens group G2 upon zooming.

Various values associated with Example 6 are listed in Table 6. In Example 6, the third surface is formed with an aspherical surface. In (Aspherical Surface Data), conical coefficient κ and each aspherical coefficient A4 through A10 are shown.

In Example 6, a distance d1 along the optical axis between the first lens group G1 and the second lens group G2, a distance d2 along the optical axis between the second lens group G2 and the flare stopper FS, a distance d3 between the flare stopper Fs and the low-pass filter P1, and a total lens length tl vary upon zooming. In (Variable Distances Data), variable distances with respect to the wide-angle end state, the intermediate focal length state, and the telephoto end state are shown.

TABLE 6

(Specifications)

|  | W | M | T |
|---|---|---|---|
| f = | 10.57 | 18.00 | 30.00 |
| Bf = | 5.0 | 5.0 | 5.0 |
| FNO = | 2.76 | 3.83 | 5.44 |
| 2ω = | 80.4° | 51.2° | 31.8° |

(Lens Data)

| i | r | d | νd | nd |
|---|---|---|---|---|
| 1 | 93.4396 | 1.2000 | 49.6 | 1.77250 |
| 2 | 10.1878 | 0.1200 | 38.1 | 1.55389 |
| *3 | 7.7047 | 8.3448 | | |
| 4 | 21.4779 | 2.6543 | 23.1 | 1.86074 |

TABLE 6-continued

| | | | | |
|---|---|---|---|---|
| 5 | 38.8092 | (d1) | | |
| 6 | 32.3261 | 2.0000 | 81.6 | 1.49700 |
| 7 | −43.4769 | 0.0618 | | |
| 8 | 0.0000 | 0.5000 | Aperture Stop S | |
| 9 | 14.5431 | 3.0000 | 64.1 | 1.51680 |
| 10 | −24.4746 | 1.0000 | 49.6 | 1.77250 |
| 11 | 42.2708 | 6.8153 | | |
| 12 | 32.1776 | 1.0000 | 37.2 | 1.83400 |
| 13 | 9.1722 | 3.0000 | 64.1 | 1.51680 |
| 14 | −22.8219 | (d2) | | |
| 15 | 0.0000 | (d3) | Flare Stopper FS | |
| 16 | 0.0000 | 3.0000 | 64.1 | 1.51680 |
| 17 | 0.0000 | (Bf) | | |

(Aspherical Surface Data)
Surface Number: 3

$\kappa = 0.0375$
$A3 = 0.22189E-04$
$A4 = 1.40590E-05$
$A6 = -2.76700E-07$
$A8 = 1.87880E-09$
$A10 = -2.56910E-11$ (Variable Distances Data)

| | W | M | T |
|---|---|---|---|
| f = | 10.57 | 18.00 | 30.00 |
| d1 = | 26.84096 | 10.55391 | 1.28586 |
| d2 = | 1.07045 | 6.16931 | 14.40435 |
| d3 = | 15.81175 | 19.98355 | 26.72130 |
| tl = | 81.41941 | 74.40302 | 80.10777 |

(Values for Conditional Expressions)

(5) nd = 1.773
(6) Y/Σf = 0.180
(7) FNOW/TL = 0.034
(8) (fw · ft)½/Σf = 0.376

Figure 10A:
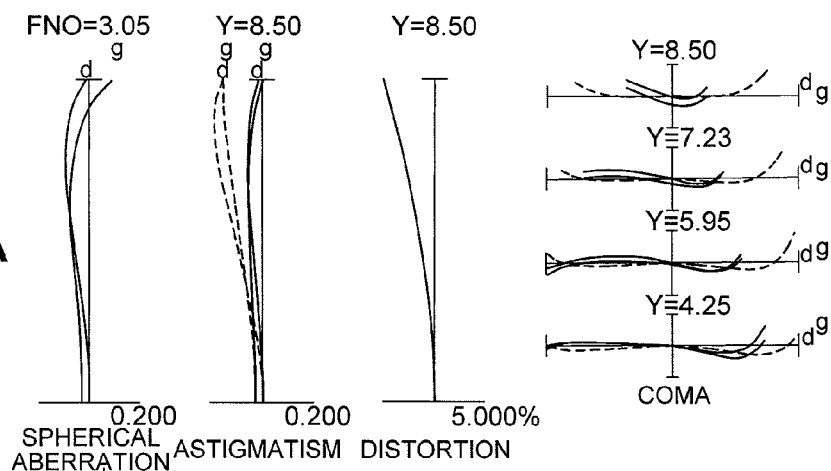
Figure 10B:
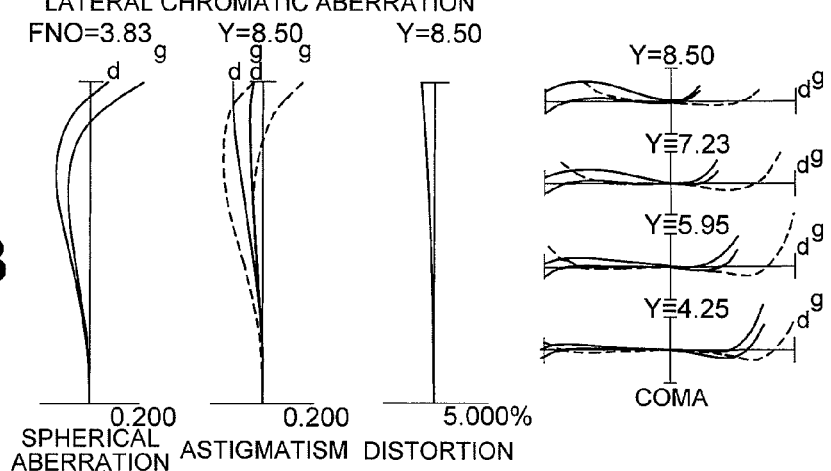
Figure 10C:
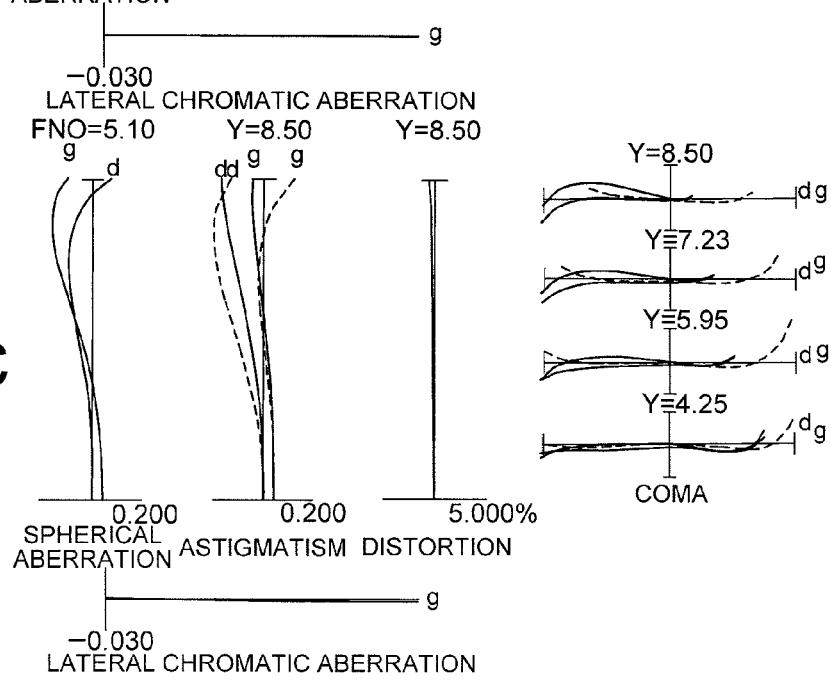

FIGS. 10A, 10B and 10O are graphs showing various aberrations of the zoom lens system according to Example 6 of the second embodiment, in which FIG. 10A shows various aberrations in the wide-angle end state, FIG. 10B shows various aberrations in the intermediate focal length state, and FIG. 10O shows various aberrations in the telephoto end state.

As is apparent from the respective graphs, the zoom lens system according to Example 6 shows superb optical performance as a result of good corrections to various aberrations in each focal length state from the wide-angle end state to the telephoto end state.

Example 7

FIG. 5 is a sectional view showing a zoom lens system ZL7 according to Example 7 of the second embodiment. The zoom lens system ZL7 shown in FIG. 5 is composed of, in order from an object side, a first lens group G1 having negative refractive power, and a second lens group G2 having positive refractive power.

The first lens group G1 having negative refractive power as a whole is composed of three lenses that are, in order from the object side, a negative meniscus lens L11 having a convex surface facing the object side, a double concave negative lens L12, and a positive meniscus lens L13 having a convex surface facing the object side.

The second lens group G2 having positive refractive power as a whole is composed of five lenses that are, in order from the object side, a positive meniscus lens L21 having a convex surface facing the object side, an aperture stop S, a cemented lens constructed by a double convex positive lens L22 cemented with a double concave negative lens L23, and a cemented lens constructed by a double convex positive lens L24 cemented with a negative meniscus lens L25 having a convex surface facing the image side.

Various values associated with Example 7 are listed in Table 7. In Example 7, each of the first, second, and fifteenth surfaces is formed with an aspherical surface. In (Aspherical Surface Data), conical coefficient κ and each aspherical coefficient A3 through A10 are shown.

In Example 7, a distance d1 along the optical axis between the first lens group G1 and the second lens group G2, a distance d2 along the optical axis between the second lens group G2 and the low-pass filter P1, and a total lens length tl vary upon zooming. In (Variable Distance Data), variable distances with respect to each focal length of the wide-angle end state, the intermediate focal length state, and the telephoto end state are shown.

TABLE 7

(Specifications)

| | W | M | T |
|---|---|---|---|
| f = | 5.10 | 8.75 | 15.00 |
| Bf = | 2.9 | 2.9 | 2.9 |
| FNO = | 3.60 | 4.53 | 6.04 |
| 2ω = | 62.5° | 37.9° | 22.6° |

(Lens Data)

| i | r | d | νd | nd |
|---|---|---|---|---|
| *1 | 10.0961 | 0.8000 | 40.1 | 1.85135 |
| *2 | 4.0283 | 3.2496 | | |
| 3 | −45.7285 | 0.8000 | 63.4 | 1.61800 |
| 4 | 16.3306 | 0.7800 | | |
| 5 | 9.9066 | 1.2000 | 23.8 | 1.84666 |
| 6 | 23.4229 | (d1) | | |
| 7 | 6.3806 | 1.2000 | 52.3 | 1.75500 |
| 8 | 28.6099 | 0.5000 | | |
| 9 | 0.0000 | 0.5000 | Aperture Stop S | |
| 10 | 6.6664 | 1.0000 | 65.5 | 1.60300 |
| 11 | −39.1993 | 0.8000 | 28.3 | 2.00330 |
| 12 | 11.0815 | 0.7078 | | |
| 13 | 18.6839 | 1.5000 | 82.6 | 1.49782 |
| 14 | −10.6077 | 0.8000 | 40.4 | 1.80610 |
| *15 | −47.7071 | (d2) | | |
| 16 | 0.0000 | 0.5000 | 64.1 | 1.51680 |
| 17 | 0.0000 | (Bf) | | |

(Aspherical Surface Data)

Surface Number: 1

$\kappa = 0.2118$
$A3 = 0.00000E+00$
$A4 = -1.03450E-04$
$A6 = 2.55850E-06$
$A8 = -8.03050E-09$
$A10 = -3.32810E-10$ Surface Number: 2

$\kappa = 0.3127$
$A3 = 0.00000E+00$
$A4 = 3.79380E-04$
$A6 = 3.05030E-05$
$A8 = -7.07950E-07$
$A10 = 5.03510E-08$ Surface Number: 15

$\kappa = -306.8406$
$A3 = 0.00000E+00$
$A4 = 1.58760E-03$
$A6 = 4.22070E-05$

TABLE 7-continued

A8 = 1.77320E−05
A10 = −1.78120E−06

(Variable Distances Data)

|  | W | M | T |
|---|---|---|---|
| f = | 5.12 | 8.65 | 14.65 |
| d1 = | 11.07012 | 4.68429 | 0.96652 |
| d2 = | 5.83567 | 9.62250 | 16.10679 |
| tl = | 34.14316 | 31.54416 | 34.31067 |

(Values for Conditional Expressions)

(5) nd = 2.003
(6) Y/Σf = 0.035
(7) FNOW/TL = 0.105
(8) $(fw \cdot ft)^{1/2}/\Sigma f = 0.103$ FIGS. 6A, 6B and 6C are graphs showing various aberrations of the zoom lens system according to Example 7 of the second, in which FIG. 6A shows various aberrations in the wide-angle end state, FIG. 6B shows various aberrations in the intermediate focal length state, and FIG. 6C shows various aberrations in the telephoto end state.

As is apparent from the respective graphs, the zoom lens system according to Example 7 shows superb optical performance as a result of good corrections to various aberrations in each focal length state from the wide-angle end state to the telephoto end state.

Example 8

FIG. 11 is a sectional view showing a zoom lens system according to Example 8 of the second embodiment. The zoom lens system ZL8 shown in FIG. 11 is composed of, in order from an object side, a first lens group G1 having negative refractive power, a second lens group G2 having positive refractive power, and a third lens group G3 having positive refractive power.

The first lens group G1 having negative refractive power as a whole is composed of four lenses that are, in order from the object side, a double convex positive lens L11, a negative meniscus lens L12 having a convex surface facing the object side, a double concave negative lens L13, and a positive meniscus lens L14 having a convex surface facing the object side.

The second lens group G2 having positive refractive power as a whole is composed of five lenses that are, in order from the object side, an aperture stop S, a positive meniscus lens L21 having a convex surface facing the object side, a cemented lens constructed by a double convex positive lens L22 cemented with a double concave negative lens L23, and a cemented lens constructed by a double convex positive lens L24 cemented with a negative meniscus lens L25 having a convex surface facing the image side.

The third lens group G3 having positive refractive power as a whole is composed of a lens that is a double convex positive lens L31.

Various values associated with the zoom lens system ZL8 according to Example 8 are listed in Table 8. In Example 8, the seventeenth surface is formed with an aspherical surface. In (Aspherical Surface Data), conical coefficient κ and each aspherical coefficient A3 through A10 are shown.

In Example 8, a distance d1 along the optical axis between the first lens group G1 and the second lens group G2, a distance d2 along the optical axis between the second lens group G2 and the third lens group G3, and a total lens length tl vary upon zooming. In (Variable Distance Data), variable distances with respect to each focal length of the wide-angle end state, the intermediate focal length state, and the telephoto end state are shown.

TABLE 8

(Specifications)

|  | W | M | T |
|---|---|---|---|
| f = | 9.80 | 16.40 | 27.60 |
| Bf = | 4.0 | 4.0 | 4.0 |
| FNO = | 3.63 | 4.51 | 6.02 |
| 2ω = | 53.3° | 32.4° | 19.4° |

(Lens Data)

| i | r | d | νd | nd |
|---|---|---|---|---|
| 1 | 115.9747 | 2.0000 | 60.2 | 1.64000 |
| 2 | −68.9820 | 0.1000 |  |  |
| 3 | 100.0798 | 1.0000 | 43.0 | 1.83500 |
| 4 | 8.8788 | 3.2000 |  |  |
| 5 | −99.6193 | 1.0000 | 64.2 | 1.51680 |
| 6 | 26.1734 | 0.6000 |  |  |
| 7 | 14.2994 | 2.0000 | 23.8 | 1.84666 |
| 8 | 36.0022 | (d1) |  |  |
| 9 | 0.0000 | 0.5000 | Aperture Stop S |  |
| 10 | 13.4448 | 1.5940 | 55.5 | 1.69680 |
| 11 | 59.9470 | 1.0000 |  |  |
| 12 | 12.9107 | 2.0000 | 65.5 | 1.60300 |
| 13 | −106.2080 | 1.0000 | 31.3 | 1.90366 |
| 14 | 21.0886 | 3.7407 |  |  |
| 15 | 21.1966 | 3.0000 | 82.6 | 1.49782 |
| 16 | −14.8929 | 1.0000 | 40.4 | 1.80610 |
| *17 | −51.6483 | (d2) |  |  |
| 18 | 3781.7780 | 2.6000 | 70.5 | 1.48749 |
| 19 | −55.1517 | 2.1874 |  |  |
| 20 | 0.0000 | 3.2600 | 64.2 | 1.51680 |
| 21 | 0.0000 | (Bf) |  |  |

(Aspherical Surface Data)
Surface Number: 17

κ = −154.3886
A3 = 0.00000E+00
A4 = 4.45810E−05
A6 = 5.19000E−06
A8 = 1.22970E−08
A10 = −2.68330E−09

(Variable Distances Data)

|  | W | M | T |
|---|---|---|---|
| f = | 9.80 | 16.40 | 27.60 |
| d1 = | 20.25218 | 8.32372 | 1.13626 |
| d2 = | 6.13977 | 12.62652 | 23.63435 |
| tl = | 62.17410 | 56.73240 | 60.55276 |

(Values for Conditional Expressions)

Figure 12A:
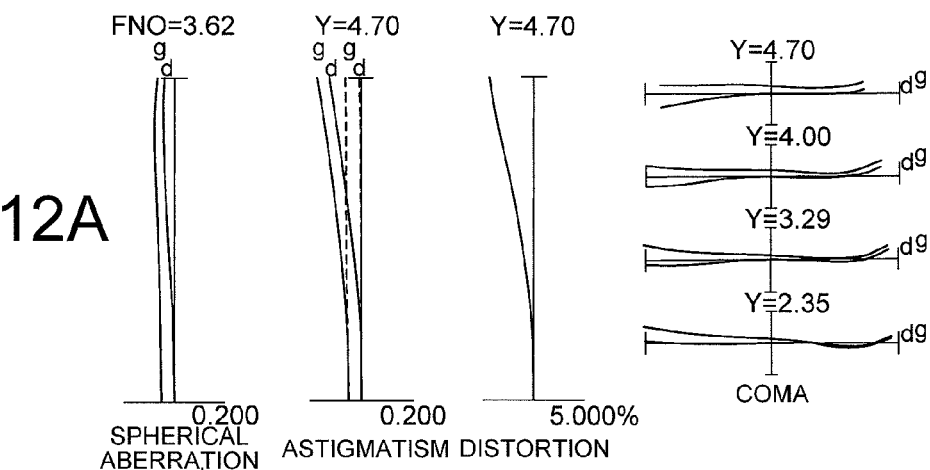
Figure 12B:
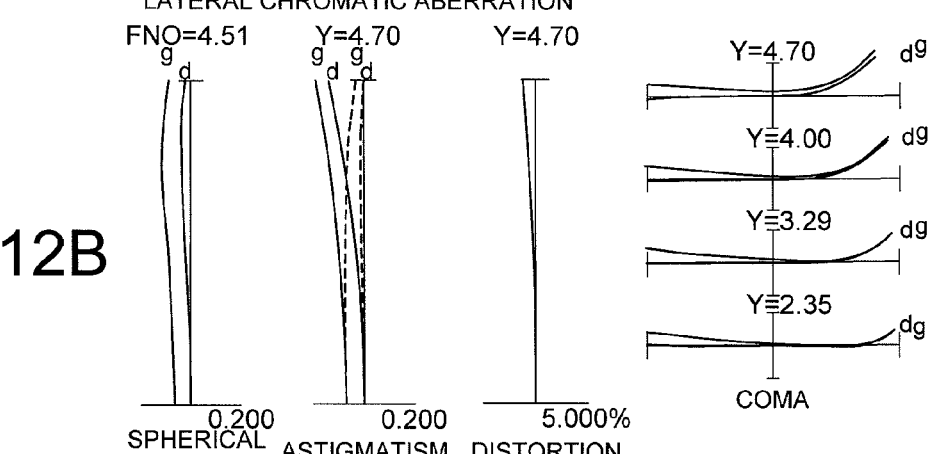
Figure 12C:
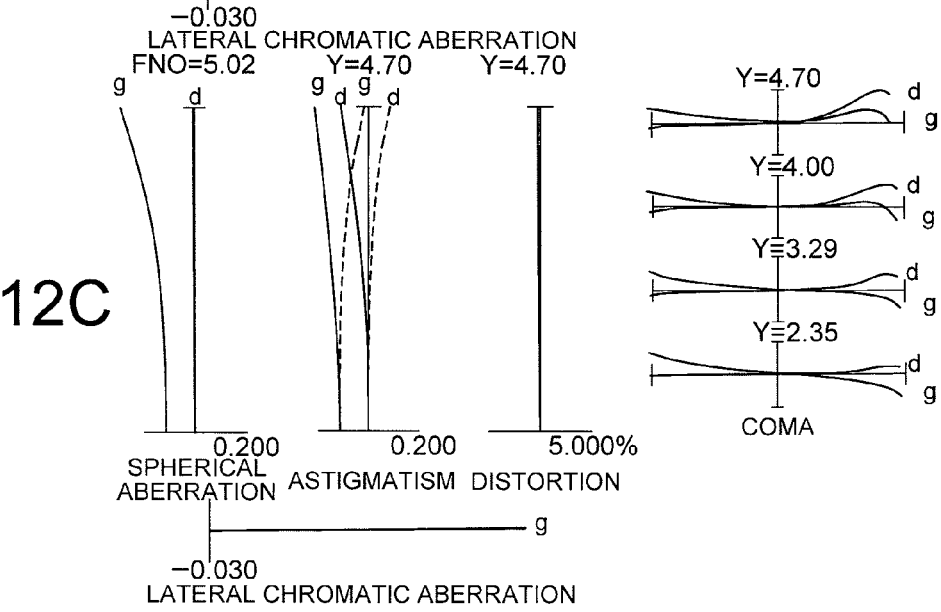

(5) nd = 1.904
(6) Y/Σf = 0.010
(7) FNOW/TL = 0.058
(8) $(fw \cdot ft)^{1/2}/\Sigma f = 0.353$ FIGS. 12A, 12B and 12C are graphs showing various aberrations of the zoom lens system according to Example 8 of the second embodiment, in which FIG. 12A shows various aberrations in the wide-angle end state, FIG. 12B shows various aberrations in the intermediate focal length state, and FIG. 12C shows various aberrations in the telephoto end state.

As is apparent from the respective graphs, the zoom lens system according to Example 8 shows superb optical performance as a result of good corrections to various aberrations in each focal length state from the wide-angle end state to the telephoto end state.

Example 9

Figure 13:
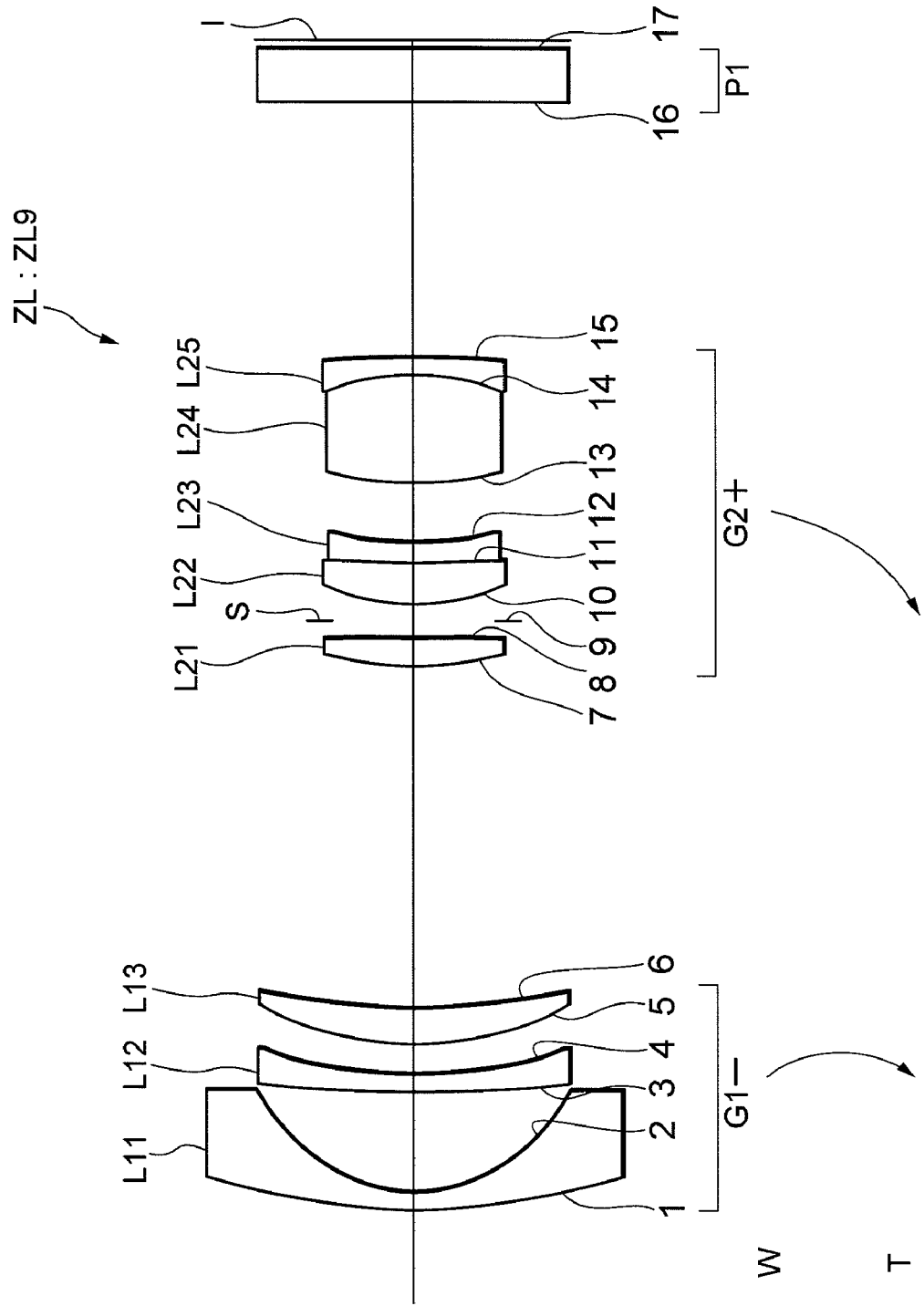
FIG. 13 is a sectional view showing a zoom lens system according to Example 9 of the second embodiment.

FIG. 13 is a sectional view showing a zoom lens system ZL9 according to Example 9 of the second embodiment. The zoom lens system ZL9 shown in FIG. 13 is composed of, in order from an object side, a first lens group G1 having negative refractive power, and a second lens group G2 having positive refractive power.

The first lens group G1 having negative refractive power as a whole is composed of three lenses that are, in order from the object side, a negative meniscus lens L11 having a convex surface facing the object side, a negative meniscus lens L12 having a convex surface facing the object side, and a positive meniscus lens L13 having a convex surface facing the object side.

The second lens group G2 having positive refractive power as a whole is composed of five lenses that are, in order from the object side, a double convex positive lens L21, an aperture stop S, a cemented lens constructed by a positive meniscus lens L22 having a convex surface facing the object side cemented with a negative meniscus lens L23 having a concave surface facing the image side, and a cemented lens constructed by a double convex positive lens L24 cemented with a negative meniscus lens L25 having a convex surface facing the image side.

Various values associated with Example 9 are listed in Table 9. In Example 9, each of the second and fifteenth surfaces is formed with an aspherical surface. In (Aspherical Surface Data), conical coefficient κ and each aspherical coefficient A3 through A10 are shown.

In Example 9, a distance d1 along the optical axis between the first lens group G1 and the second lens group G2, a distance d2 along the optical axis between the second lens group G2 and the low-pass filter P1, and a total lens length tl vary upon zooming. In (Variable Distance Data), variable distances with respect to each focal length of the wide-angle end state, the intermediate focal length state, and the telephoto end state are shown.

TABLE 9

(Specifications)

|  | W | M | T |
|---|---|---|---|
| f = | 10.25 | 17.30 | 27.00 |
| Bf = | 0.5 | 0.5 | 0.5 |
| FNO = | 3.18 | 4.07 | 5.31 |
| 2ω = | 82.7° | 52.9° | 35.0° |

(Lens Data)

| i | r | d | νd | nd |
|---|---|---|---|---|
| 1 | 39.4187 | 1.0000 | 49.2 | 1.76802 |
| *2 | 8.2510 | 5.9900 |  |  |
| 3 | 100.0000 | 1.0000 | 65.4 | 1.60300 |
| 4 | 26.7669 | 1.7494 |  |  |
| 5 | 18.6438 | 2.0628 | 23.8 | 1.84666 |
| 6 | 38.9733 | (d1) |  |  |
| 7 | 20.5516 | 1.6053 | 81.6 | 1.49700 |
| 8 | −405.9990 | 1.0000 |  |  |
| 9 | 0.0000 | 1.0000 | Aperture Stop S |  |
| 10 | 11.8321 | 2.5000 | 52.3 | 1.75500 |
| 11 | 195.6077 | 1.0545 | 28.3 | 2.00330 |
| 12 | 18.5805 | 3.5589 |  |  |

TABLE 9-continued

| 13 | 22.8835 | 6.2633 | 81.6 | 1.49700 |
|---|---|---|---|---|
| 14 | −13.2799 | 1.0000 | 40.8 | 1.88300 |
| *15 | −41.6179 | (d2) |  |  |
| 16 | 0.0000 | 3.0700 | 64.2 | 1.51680 |
| 17 | 0.0000 | (Bf) |  |  |

(Aspherical Surface Data)

Surface Number: 2

κ = 0.3474
A3 = 0.00000E+00
A4 = 3.47310E−05
A6 = 5.73590E−07
A8 = −4.09680E−09
A10 = 3.59140E−11

Surface Number: 15

κ = −136.5884
A3 = 0.00000E+00
A4 = −9.19680E−05
A6 = 8.93280E−06
A8 = −1.74550E−07
A10 = 1.94360E−09

(Variable Distances Data)

|  | W | M | T |
|---|---|---|---|
| f = | 10.25 | 17.30 | 27.00 |
| d1 = | 20.00031 | 7.49502 | 0.96317 |
| d2 = | 14.83670 | 22.50971 | 33.06690 |
| tl = | 68.19112 | 63.35885 | 67.38419 |

(Values for Conditional Expressions)

(5) nd = 2.003
(6) Y/Σf = 0.255
(7) FNoW/TL = 0.047
(8) (fw · ft)$^{1/2}$/Σf = 0.499

Figure 14A:
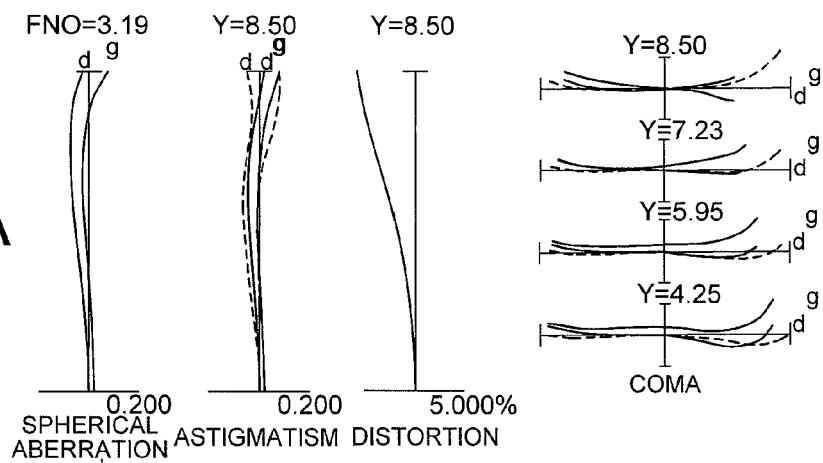
Figure 14B:
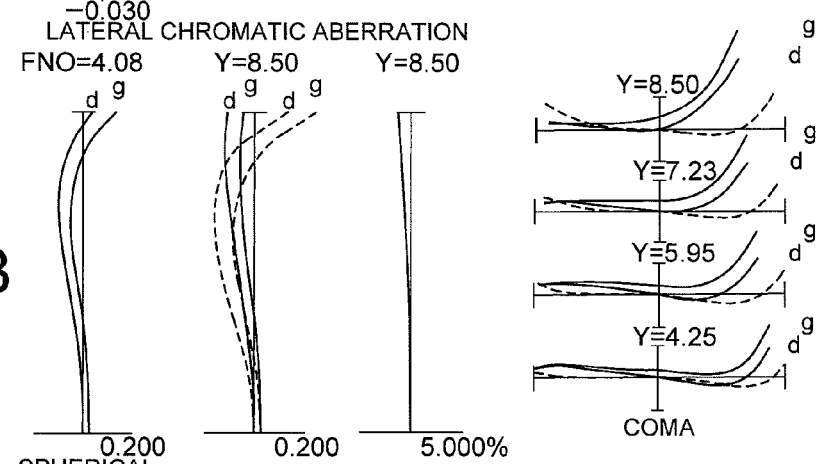
Figure 14C:
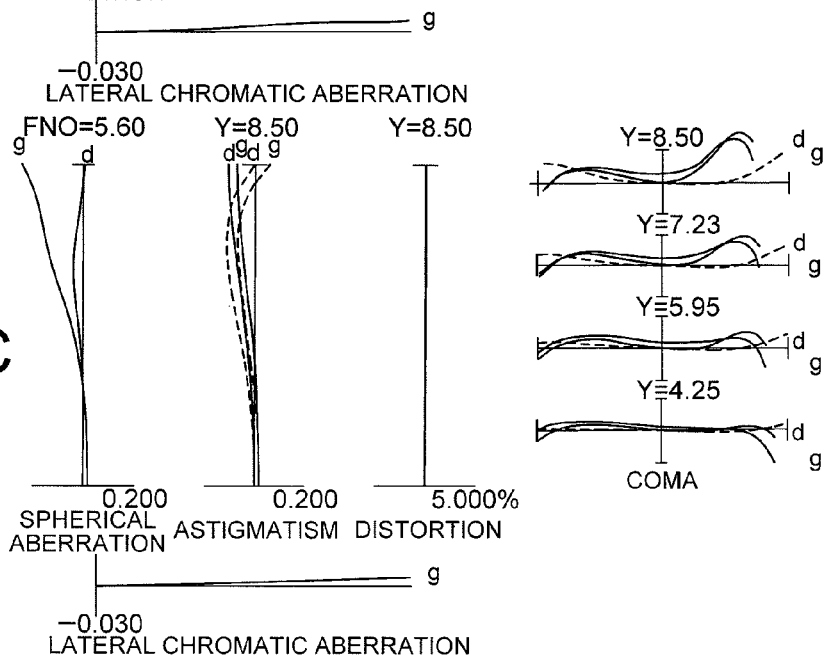

FIGS. 14A, 14B and 14C are graphs showing various aberrations of the zoom lens system according to Example 9 of the second embodiment, in which FIG. 14A shows various aberrations in the wide-angle end state, FIG. 14B shows various aberrations in the intermediate focal length state, and FIG. 14C shows various aberrations in the telephoto end state.

As is apparent from the respective graphs, the zoom lens system according to Example 9 shows superb optical performance as a result of good corrections to various aberrations in each focal length state from the wide-angle end state to the telephoto end state.

Third Embodiment

A third embodiment according to the present invention is explained below with reference to accompanying drawings. Incidentally, in the specification, unless otherwise stated a wide-angle end state or a telephoto end state shows a state upon focusing on infinity. As shown in FIG. 1, a zoom lens system ZL is composed of, in order from an object side, a first lens group G1 having negative refractive power and a second lens group G2 having positive refractive power. Upon varying a state of lens positions from a wide-angle end state to a telephoto end state, a distance between the first lens group G1 and the second lens group G2 varies.

In a zoom lens system ZL according to the present embodiment, the second lens group G2 includes at least two cemented lenses, and each of the two cemented lenses is constructed by a positive lens disposed to the object side and a negative lens disposed to the image side.

In a zoom lens system ZL according to the present embodiment, the following conditional expression (9) is preferably satisfied:

$$0.16 < ndn - ndp < 0.40 \quad (9)$$

where ndp denotes an average value of refractive indices of positive lenses in the cemented lenses included in the second lens group G2, and ndn denotes an average value of refractive indices of negative lenses in the cemented lenses included in the second lens group G2.

Conditional expression (9) defines a ratio of the average value of refractive indices of positive lenses in the cemented lenses included in the second lens group G2 to that of negative lenses included in the second lens group G2. When the value ndn−ndp is equal to or exceeds the upper limit of conditional expression (9), difference in refractive indices between the positive lenses and the negative lenses becomes large, so that Petzval sum becomes too large and the image plane shifts to the negative side. Accordingly, it is undesirable. In order to secure the effect of the present embodiment, it is preferable to set the upper limit of conditional expression (9) to 0.38. In order to further secure the effect of the present embodiment, it is most preferable to set the upper limit of conditional expression (9) to 0.35.

On the other hand, when the value ndn−ndp is equal to or falls below the lower limit of conditional expression (9), difference in refractive indices between the positive lenses and the negative lenses becomes small, so that Petzval sum becomes too small and it becomes difficult to correct astigmatism and curvature of field. In particular, as getting away from the optical axis, off-axis aberrations do not improve such that the sagittal image plane is curved, so that it becomes impossible to realize a wider angle of view. Accordingly, it is undesirable. In order to secure the effect of the present embodiment, it is preferable to set the lower limit of conditional expression (9) to 0.2. In order to further secure the effect of the present embodiment, it is most preferable to set the lower limit of conditional expression (9) to 0.22.

In a zoom lens system ZL according to the present embodiment, the following conditional expression (10) is preferably satisfied:

$$19.0 < vdp - vdn < 55.0 \quad (10)$$

where vdp denotes an average value of Abbe numbers of positive lenses in the cemented lenses included in the second lens group G2, and vdn denotes an average value of Abbe numbers of negative lenses in the cemented lenses included in the second lens group G2.

Conditional expression (10) defines a ratio of the average value of Abbe numbers of positive lenses in the cemented lenses included in the second lens group G2 to that of negative lenses in the cemented lenses included in the second lens group G2. When the value vdp−vdn is equal to or exceeds the upper limit of conditional expression (10), difference in Abbe numbers between positive lenses and negative lenses becomes large, so that chromatic aberration becomes overcorrected, chromatic aberration at g-line becomes excessively overcorrected. Accordingly, color blurring is generated in the wide-angle end state, so that it is undesirable. In order to secure the effect of the present embodiment, it is preferable to set the upper limit of conditional expression (10) to 50.0. In order to further secure the effect of the present embodiment, it is most preferable to set the upper limit of conditional expression (10) to 45.0.

On the other hand, when the value vdp−vdn is equal to or falls below the lower limit of conditional expression (10), difference in Abbe numbers between positive lenses and negative lenses becomes too small, longitudinal chromatic aberration and lateral chromatic aberration become undercorrected, so that it becomes difficult to balance lateral chromatic aberration over entire range from the wide-angle end state to the telephoto end state. Accordingly, it is undesirable. In order to secure the effect of the present embodiment, it is preferable to set the lower limit of conditional expression (10) to 20.0. It is most preferable to set the lower limit of conditional expression (10) to 25.0, so that Petzval sum increases and the effect of the present embodiment can fully be secured.

In a zoom lens system ZL according to the present embodiment, it is preferable that the second lens group G2 includes two cemented lenses that are disposed consecutively, and the most image side lens surface of the consecutively disposed cemented lenses is preferably a convex surface facing the image side. With this configuration, it becomes possible to dispose the exit pupil toward the object side with excellently correcting coma. Incidentally, when the most image side lens surface is an aspherical surface, the convex surface is to be considered as a reference sphere.

Moreover, among the cemented lenses in the second lens group, the most image side lens surface of the cemented lens disposed to the image side is preferably formed as an aspherical surface. With this configuration, it becomes possible to excellently correct spherical aberration and upper coma.

Moreover, the cemented lenses included in the second lens group G2 are preferably disposed consecutively. With this configuration, it becomes possible to correct chromatic aberration and coma despite of the small number of lens elements, so that downsizing of the zoom lens system ZL can be realized.

In a zoom lens system ZL according to the present embodiment, the second lens group G2 preferably includes, in order from the object side, a positive single lens, a cemented lens constructed by a positive lens and a negative lens, and a cemented lens constructed by a positive lens and a negative lens. With disposing a positive single lens to the object side of cemented lenses disposed consecutively in the second lens group G2, it becomes possible to secure excellent spherical aberration state with a given f-number. Moreover, with composing the second lens group G2 with three positive lens components, it becomes possible to accomplish downsizing of the zoom lens system ZL and to suppress manufacturing error with excellently correcting aberrations.

In a zoom lens system ZL according to the present embodiment, at least a portion of the second lens group G2 is moved in a direction including a component perpendicular to the optical axis. With this configuration, it becomes possible to obtain excellent optical performance with fewer decentering coma upon vibration reduction.

In a zoom lens system ZL according to the present embodiment, at least one cemented lens in the second lens group is moved in a direction including a component perpendicular to the optical axis. With this configuration, it becomes possible to obtain excellent optical performance with fewer decentering coma upon vibration reduction.

In a zoom lens system ZL according to the present embodiment, the first lens group G1 preferably includes, in order from the object side, one or two negative single lenses and a positive single lens. With this configuration, the first lens group G1 can be downsized. Moreover, off-axis rays can be shifted toward the optical axis, so that high order spherical aberration can be suppressed, and aberrations can be excellently corrected.

Each example according to the third embodiment of the present invention is explained below with reference to accompanying drawings. FIG. 1 is a sectional view showing a zoom lens system ZL according to an example of the third embodiment, and refractive power distribution of the zoom lens system ZL is shown, and movement of each lens group upon varying the focal length from the wide-angle end state (W) to the telephoto end state (T) is shown by an arrow on the lower side in FIG. 1. The zoom lens system ZL10 shown in FIG. 1 is composed of, in order from an object side, a first lens group G1 having negative refractive power, and a second lens group G2 having positive refractive power. The zoom lens system ZL1 varies a distance between the first lens group G1 and the second lens group G2 upon varying lens positions from the wide-angle end state to the telephoto end state.

In each example, a low-pass filter P1 that blocks the spatial frequency exceeding resolution limit of the solid-state imaging device such as a CCD disposed on the image plane I is disposed between the second lens group G2 and the image plane I.

Example 10

FIG. 1 is a sectional view showing a zoom lens system according to Example 10 of the third embodiment. The zoom lens system ZL10 shown in FIG. 1 is composed of, in order from an object side, a first lens group G1 having negative refractive power, and a second lens group G2 having positive refractive power.

The first lens group G1 having negative refractive power as a whole is composed of three lenses that are, in order from the object side, a negative meniscus lens L11 having a convex surface facing the object side, a double concave negative lens L12, and a positive meniscus lens L13 having a convex surface facing the object side.

The second lens group G2 having positive refractive power as a whole is composed of five lenses that are, in order from the object side, a positive meniscus lens L21 having a convex surface facing the object side, an aperture stop S, a cemented lens constructed by a double convex positive lens L22 cemented with a double concave negative lens L23, and a cemented lens constructed by a double convex positive lens L24 cemented with a negative meniscus lens L25 having a convex surface facing the image side.

Various values associated with Example 10 are listed in Table 10. In Example 10, each of the first, second, and fifteenth surfaces is formed with an aspherical surface. In (Aspherical Surface Data), conical coefficient κ and each aspherical coefficient A4 through A10 are shown.

In Example 10, a distance d1 along the optical axis between the first lens group G1 and the second lens group G2, a distance d2 along the optical axis between the second lens group G2 and the low-pass filter P1, and a total lens length tl vary upon zooming. In (Variable Distance Data), variable distances with respect to each focal length of the wide-angle end state, the intermediate focal length state, and the telephoto end state are shown.

In (Values for Conditional Expressions), a value for each conditional expression according to Example 10 is shown. In Table 10, ndp denotes an average value of refractive indices of positive lenses in the cemented lenses included in the second lens group G2, ndn denotes an average value of refractive indices of negative lenses in the cemented lenses included in the second lens group G2, vdp denotes an average value of Abbe numbers of positive lenses in the cemented lenses included in the second lens group G2, and vdn denotes an average value of Abbe numbers of negative lenses in the cemented lenses included in the second lens group G2.

The explanation of reference symbols is the same in the following Examples.

TABLE 10

(Specifications)

| | W | M | T |
|---|---|---|---|
| f = | 10.25 | 17.30 | 29.30 |
| Bf = | 5.0 | 5.0 | 5.0 |
| FNO = | 3.60 | 4.50 | 5.86 |
| 2ω = | 82.7° | 53.0° | 32.4° |

(Lens Data)

| i | r | d | νd | nd |
|---|---|---|---|---|
| *1 | 25.5785 | 1.3000 | 40.1 | 1.85135 |
| *2 | 8.0567 | 5.7929 | | |
| 3 | −91.4570 | 1.0000 | 63.4 | 1.61800 |
| 4 | 39.4179 | 1.1850 | | |
| 5 | 19.9537 | 2.4000 | 23.8 | 1.84666 |
| 6 | 62.1323 | (d1) | | |
| 7 | 13.4068 | 1.5940 | 55.5 | 1.69680 |
| 8 | 57.0304 | 1.0000 | | |
| 9 | 0.0000 | 1.0000 | Aperture Stop S | |
| 10 | 12.7614 | 2.0000 | 65.5 | 1.60300 |
| 11 | −76.8213 | 1.0000 | 31.3 | 1.90366 |
| 12 | 20.9431 | 3.7407 | | |
| 13 | 26.3626 | 3.0000 | 82.6 | 1.49782 |
| 14 | −14.2354 | 1.0000 | 40.4 | 1.80610 |
| *15 | −51.9777 | (d2) | | |
| 16 | 0.0000 | 3.5000 | 64.1 | 1.51680 |
| 17 | 0.0000 | (Bf) | | |

(Aspherical Surface Data)

Surface Number: 1

κ = 0.2118
A3 = 0.00000E+00
A4 = −1.29310E−05
A6 = 7.99520E−08
A8 = −6.27380E−11
A10 = −6.50010E−13

Surface Number: 2

κ = 0.3044
A3 = 0.00000E+00
A4 = 5.73110E−05
A6 = 3.71930E−07
A8 = 1.83250E−09
A10 = 3.44660E−11

Surface Number: 15

κ = −153.5916
A3 = 0.00000E+00
A4 = 4.17600E−05
A6 = 4.39600E−06
A8 = −1.85930E−08
A10 = −2.23890E−10

(Variable Distances Data)

| | W | M | T |
|---|---|---|---|
| f = | 10.25 | 17.30 | 29.30 |
| d1 = | 21.31135 | 8.63141 | 1.08108 |
| d2 = | 10.96792 | 18.43769 | 31.15218 |
| tl = | 66.76193 | 61.55175 | 66.71592 |

(Values for Conditional Expressions)

(9) ndn − ndp = 0.304
(10) vdp − vdn = 38.18

FIGS. 2A, 2B and 2C are graphs showing various aberrations of the zoom lens system according to Example 10 of the third embodiment, in which FIG. 2A shows various aberrations in a wide-angle end state, FIG. 2B shows various aberrations in an intermediate focal length state, and FIG. 2C shows various aberrations in a telephoto end state.

As is apparent from the respective graphs, the zoom lens system according to Example 10 shows superb optical performance as a result of good corrections to various aberrations in each focal length state from the wide-angle end state to the telephoto end state.

Example 11

FIG. 15 is a sectional view showing a zoom lens system according to Example 11 of the third embodiment. The zoom lens system ZL11 shown in FIG. 15 is composed of, in order from an object side, a first lens group G1 having negative refractive power, and a second lens group G2 having positive refractive power.

The first lens group G1 having negative refractive power as a whole is composed of three lenses that are, in order from the object side, a negative meniscus lens L11 having a convex surface facing the object side, a negative meniscus lens L12 having a convex surface facing the object side, and a positive meniscus lens L13 having a convex surface facing the object side.

The second lens group G2 having positive refractive power as a whole is composed of five lenses that are, in order from the object side, a positive meniscus lens L21 having a convex surface facing the object side, an aperture stop S, a cemented lens constructed by a double convex positive lens L22 cemented with a double concave negative lens L23, and a cemented lens constructed by a double convex positive lens L24 cemented with a negative meniscus lens L25 having a convex surface facing the image side. Incidentally, a flare stopper FS is disposed between the second lens group G2 and the image plane I, and moved together with the second lens group upon zooming from the wide-angle end state to the telephoto end state.

Various values associated with Example 11 are listed in Table 11. In Example 11, each of the second and fifteenth surfaces is formed with an aspherical surface. In (Aspherical Surface Data), conical coefficient and each aspherical coefficient A4 through A10 are shown.

In Example 11, a distance d1 along the optical axis between the first lens group G1 and the second lens group G2, a distance d2 along the optical axis between the second lens group G2 and the flare stopper FS, a distance d3 between the flare stopper FS and the low-pass filter P1 and a total lens length tl vary upon zooming. In (Variable Distance Data), variable distances with respect to each focal length of the wide-angle end state, the intermediate focal length state, and the telephoto end state are shown.

TABLE 11

(Specifications)

|  | W | M | T |
|---|---|---|---|
| f = | 10.25 | 17.30 | 29.30 |
| Bf = | 0.5 | 0.5 | 0.5 |
| FNO = | 3.21 | 4.06 | 5.58 |
| 2ω = | 82.8° | 53.0° | 32.4° |

(Lens Data)

| i | r | d | νd | nd |
|---|---|---|---|---|
| 1 | 33.1037 | 2.0000 | 40.6 | 1.86400 |
| *2 | 8.2285 | 5.5949 | | |
| 3 | 94.5412 | 1.0000 | 57.3 | 1.67000 |
| 4 | 24.7165 | 0.6593 | | |
| 5 | 16.6381 | 2.5000 | 23.8 | 1.84666 |
| 6 | 43.9787 | (d1) | | |
| 7 | 12.6258 | 1.7554 | 52.3 | 1.75500 |
| 8 | 98.1126 | 0.9900 | | |
| 9 | 0.0000 | 0.9900 | Aperture Stop S | |
| 10 | 13.0084 | 2.0000 | 81.1 | 1.49700 |
| 11 | −30.8291 | 1.0000 | 32.3 | 1.85026 |
| 12 | 19.4682 | 3.3586 | | |
| 13 | 31.8100 | 1.1794 | 81.1 | 1.49700 |
| 14 | −33.4999 | 1.6157 | 25.1 | 1.90200 |
| *15 | −55.0127 | (d2) | | |
| 16 | 0.0000 | (d3) | Flare Stopper FS | |
| 17 | 0.0000 | 3.0700 | 64.2 | 1.51680 |
| 18 | 0.0000 | (Bf) | | |

(Aspherical Surface Data)

Surface Number: 2

$\kappa = 0.5571$
$A3 = 0.00000E+00$
$A4 = 1.09500E-05$
$A6 = -1.67810E-08$
$A8 = 1.18590E-09$
$A10 = -2.10020E-11$ Surface Number: 15

$\kappa = -155.7190$
$A3 = 0.00000E+00$
$A4 = 3.91780E-05$
$A6 = 5.37390E-06$
$A8 = -2.26060E-07$
$A10 = 9.65560E-09$ (Variable Distances Data)

|  | W | M | T |
|---|---|---|---|
| f = | 10.25 | 17.30 | 29.30 |
| d1 = | 20.44984 | 8.24323 | 0.97475 |
| d2 = | 1.64146 | 3.10308 | 5.59093 |
| d3 = | 9.83676 | 15.68322 | 25.63465 |
| tl = | 64.64137 | 59.74284 | 64.91365 |

(Values for Conditional Expressions)

(9) ndn − ndp = 0.379
(10) νdp − νdn = 52.46

Figure 16A:
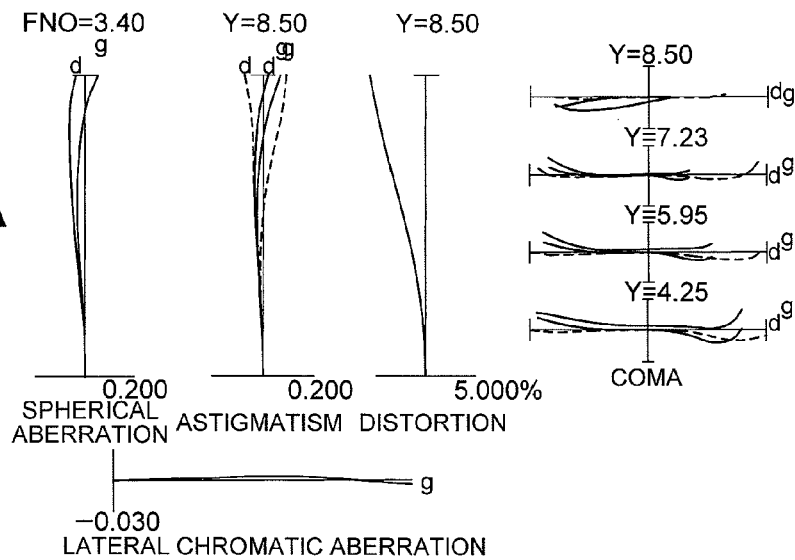
Figure 16B:
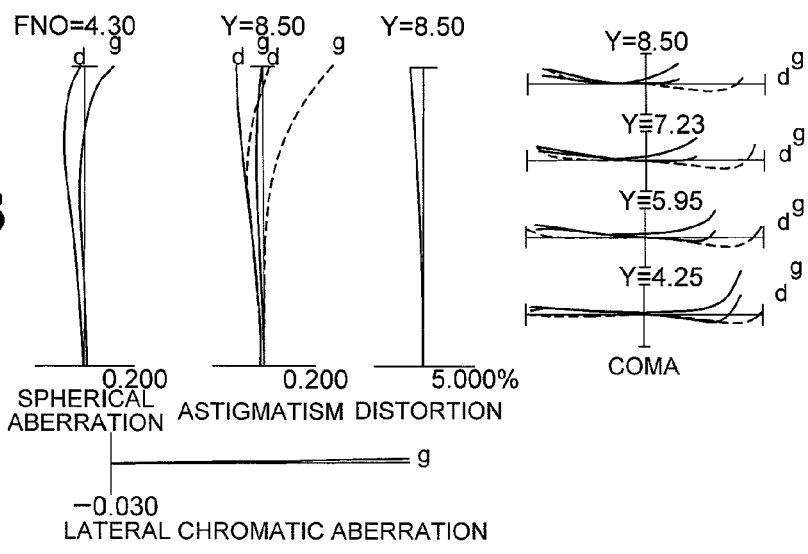
Figure 16C:
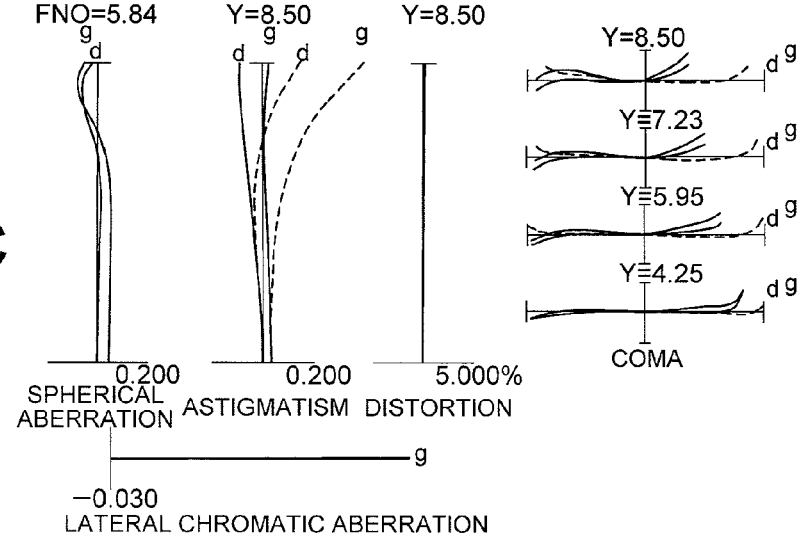

FIGS. 16A, 16B and 16C are graphs showing various aberrations of the zoom lens system according to Example 11 of the third embodiment, in which FIG. 16A shows various aberrations in the wide-angle end state, FIG. 16B shows various aberrations in the intermediate focal length state, and FIG. 16C shows various aberrations in the telephoto end state.

As is apparent from the respective graphs, the zoom lens system according to Example 11 shows superb optical performance as a result of good corrections to various aberrations in each focal length state from the wide-angle end state to the telephoto end state.

Example 12

FIG. 17 is a sectional view showing a zoom lens system according to Example 12 of the third embodiment. The zoom lens system ZL12 shown in FIG. 17 is composed of, in order from an object side, a first lens group G1 having negative refractive power, and a second lens group G2 having positive refractive power.

The first lens group G1 having negative refractive power as a whole is composed of three lenses that are, in order from the object side, a negative meniscus lens L11 having a convex surface facing the object side, a negative meniscus lens L12 having a convex surface facing the object side, and a positive meniscus lens L13 having a convex surface facing the object side.

The second lens group G2 having positive refractive power as a whole is composed of five lenses that are, in order from the object side, a double convex positive lens L21, an aperture stop S, a cemented lens constructed by a double convex positive lens L22 cemented with a double concave negative lens L23, and a cemented lens constructed by a double convex positive lens L24 cemented with a negative meniscus lens L25 having a convex surface facing the image side.

Various values associated with Example 12 are listed in Table 12. In Example 12, each of the second and fifteenth surfaces is formed with an aspherical surface. In (Aspherical Surface Data), conical coefficient κ and each aspherical coefficient A4 through A10 are shown.

In Example 12, a distance d1 along the optical axis between the first lens group G1 and the second lens group G2, a distance d2 along the optical axis between the second lens group G2 and the low-pass filter P1, and a total lens length tl vary upon zooming. In (Variable Distance Data), variable distances with respect to each focal length of the wide-angle end state, the intermediate focal length state, and the telephoto end state are shown.

TABLE 12

(Specifications)

| | W | M | T |
|---|---|---|---|
| f = | 10.25 | 17.30 | 29.30 |
| Bf = | 0.5 | 0.5 | 0.5 |
| FNO = | 3.21 | 4.06 | 5.58 |
| 2ω = | 82.8° | 53.0° | 32.4° |

(Lens Data)

| i | r | d | νd | nd |
|---|---|---|---|---|
| 1 | 36.4390 | 1.0000 | 49.2 | 1.76802 |
| *2 | 8.1180 | 5.9900 | | |
| 3 | 100.0000 | 1.0000 | 65.4 | 1.60300 |
| 4 | 26.8669 | 1.3691 | | |
| 5 | 17.5015 | 2.0628 | 23.8 | 1.84666 |
| 6 | 34.8099 | (d1) | | |
| 7 | 16.4422 | 1.6000 | 81.6 | 1.49700 |
| 8 | −155.6820 | 1.0000 | | |
| 9 | 0.0000 | 1.0000 | | Aperture Stop S |
| 10 | 13.4155 | 2.5000 | 47.8 | 1.75700 |
| 11 | −32.3998 | 2.3647 | 31.3 | 1.90366 |
| 12 | 18.3396 | 4.2568 | | |
| 13 | 28.2532 | 4.5000 | 62.9 | 1.54771 |
| 14 | −10.4654 | 1.0000 | 40.8 | 1.88300 |
| *15 | −33.0184 | (d2) | | |
| 16 | 0.0000 | 3.5400 | 64.2 | 1.51680 |
| 17 | 0.0000 | (Bf) | | |

(Aspherical Surface Data)

Surface Number: 2

κ = 0.3938
A3 = 0.00000E+00
A4 = 3.47310E−05
A6 = 5.73590E−07
A8 = −4.09680E−09
A10 = 3.59140E−11

Surface Number: 15

κ = −74.9205
A3 = 0.00000E+00
A4 = −1.52700E−04
A6 = 7.94230E−06
A8 = −1.11090E−07
A10 = 5.56590E−10

TABLE 12-continued (Variable Distances Data)

| | W | M | T |
|---|---|---|---|
| f = | 10.25 | 17.30 | 29.30 |
| d1 = | 20.94442 | 8.43913 | 0.99280 |
| d2 = | 13.73110 | 21.40412 | 34.46456 |
| tl = | 68.35887 | 63.52660 | 69.14072 |

(Values for Conditional Expressions)

(9) ndn − ndp = 0.317
(10) νdp − νdn = 19.34

Figure 18A:
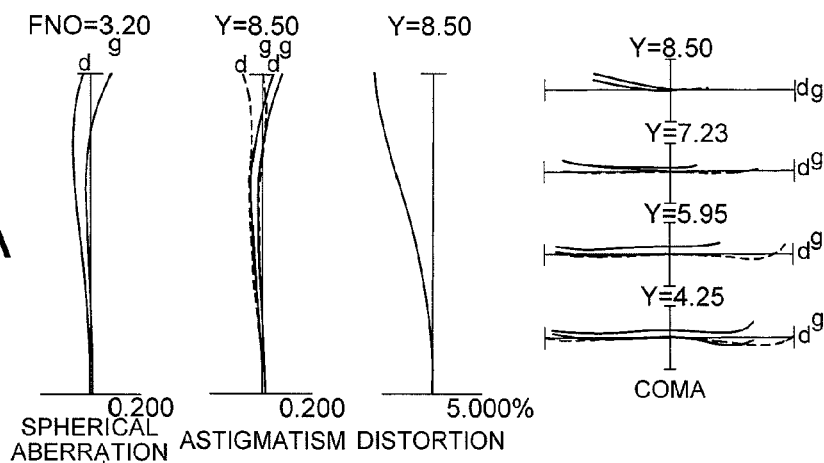
Figure 18B:
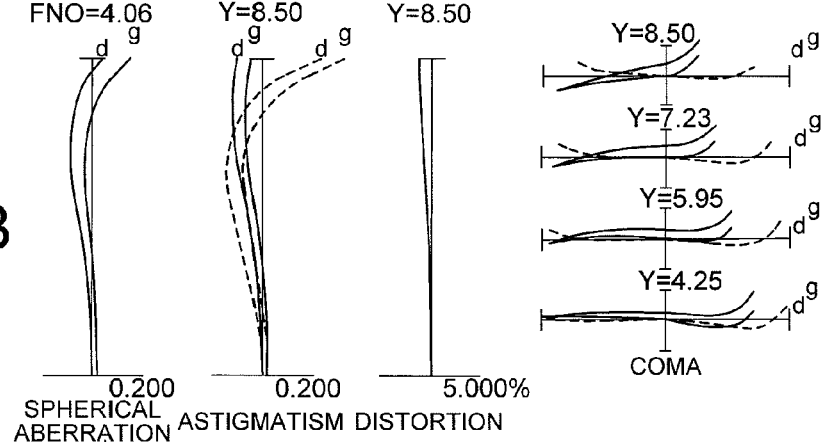
Figure 18C:
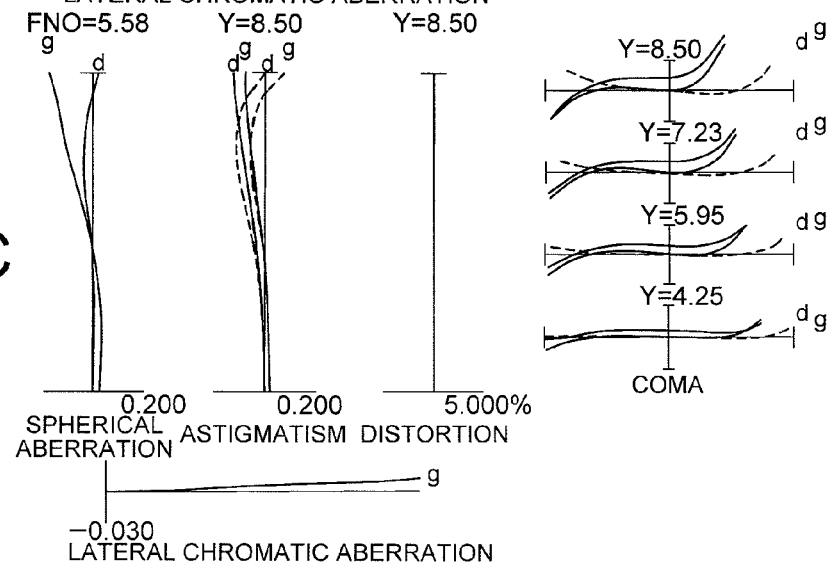

FIGS. 18A, 18B and 18C are graphs showing various aberrations of the zoom lens system according to Example 12 of the third embodiment, in which FIG. 18A shows various aberrations in the wide-angle end state, FIG. 18B shows various aberrations in the intermediate focal length state, and FIG. 18C shows various aberrations in the telephoto end state.

As is apparent from the respective graphs, the zoom lens system according to Example 12 shows superb optical performance as a result of good corrections to various aberrations in each focal length state from the wide-angle end state to the telephoto end state.

Example 13

FIG. 19 is a sectional view showing a zoom lens system ZL13 according to Example 13 of the third embodiment. The zoom lens system ZL13 shown in FIG. 19 is composed of, in order from an object side, a first lens group G1 having negative refractive power, and a second lens group G2 having positive refractive power.

The first lens group G1 having negative refractive power as a whole is composed of three lenses that are, in order from the object side, a negative meniscus lens L11 having a convex surface facing the object side, a double concave negative lens L12, and a positive meniscus lens L13 having a convex surface facing the object side.

The second lens group G2 having positive refractive power as a whole is composed of five lenses that are, in order from the object side, a positive meniscus lens L21 having a convex surface facing the object side, an aperture stop S, a cemented lens constructed by a double convex positive lens L22 cemented with a double concave negative lens L23, and a cemented lens constructed by a double convex positive lens L24 cemented with a negative meniscus lens L25 having a convex surface facing the image side.

Various values associated with Example 13 are listed in Table 13. In Example 13, each of the first, second, and fifteenth surfaces is formed with an aspherical surface. In (Aspherical Surface Data), conical coefficient κ and each aspherical coefficient A4 through A10 are shown.

In Example 13, a distance d1 along the optical axis between the first lens group G1 and the second lens group G2, a distance d2 along the optical axis between the second lens group G2 and the low-pass filter P1, and a total lens length tl vary upon zooming. In (Variable Distance Data), variable distances with respect to each focal length of the wide-angle end state, the intermediate focal length state, and the telephoto end state are shown.

TABLE 13

(Specifications)

|  | W | M | T |
|---|---|---|---|
| f = | 10.25 | 17.30 | 29.30 |
| Bf = | 1.0 | 1.0 | 1.0 |
| FNO = | 3.60 | 4.50 | 5.86 |
| 2ω = | 82.7° | 53.0° | 32.4° |

(Lens Data)

| i | r | d | νd | nd |
|---|---|---|---|---|
| *1 | 24.6813 | 1.3000 | 40.1 | 1.85135 |
| *2 | 8.0567 | 6.5840 | | |
| 3 | −91.4570 | 1.0000 | 63.4 | 1.61800 |
| 4 | 37.2511 | 0.7063 | | |
| 5 | 19.6764 | 2.4000 | 23.8 | 1.84666 |
| 6 | 62.6805 | (d1) | | |
| 7 | 14.9540 | 1.8693 | 55.5 | 1.69680 |
| 8 | 51.8797 | 1.0000 | | |
| 9 | 0.0000 | 1.0000 | Aperture Stop S | |
| 10 | 11.7295 | 2.0000 | 65.5 | 1.60300 |
| 11 | −101.3300 | 1.0000 | 29.2 | 1.72151 |
| 12 | 17.8764 | 3.6934 | | |
| 13 | 26.3022 | 2.8000 | 82.6 | 1.49782 |
| 14 | −17.1059 | 1.0000 | 40.5 | 1.73077 |
| *15 | −177.1250 | (d2) | | |
| 16 | 0.0000 | 3.0700 | 64.1 | 1.51680 |
| 17 | 0.0000 | (Bf) | | |

(Aspherical Surface Data)

Surface Number: 1

κ = 0.2118
A3 = 0.00000E+00
A4 = −1.29310E−05
A6 = 7.99520E−08
A8 = −6.27380E−11
A10 = −6.50010E−13

Surface Number: 2

κ = 0.3495
A3 = 0.00000E+00
A4 = 4.59010E−05
A6 = 3.49720E−07
A8 = 2.30250E−09
A10 = 2.83830E−11

Surface Number: 15

κ = 980.3911
A3 = 0.00000E+00
A4 = 2.30220E−04
A6 = 1.58970E−06
A8 = 6.26260E−08
A10 = −7.37980E−10

(Variable Distances Data)

|  | W | M | T |
|---|---|---|---|
| f = | 10.25 | 17.30 | 29.30 |
| d1 = | 21.21320 | 8.60389 | 1.09563 |
| d2 = | 15.40843 | 22.84444 | 35.50147 |
| tl = | 67.04472 | 61.87142 | 67.02018 |

(Values for Conditional Expressions)

(9) ndn − ndp = 0.176
(10) νdp − νdn = 39.15

Figure 20A:
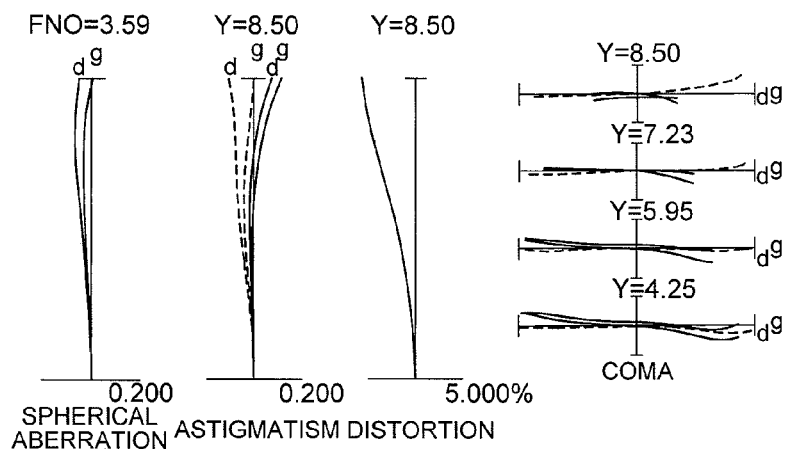
Figure 20B:
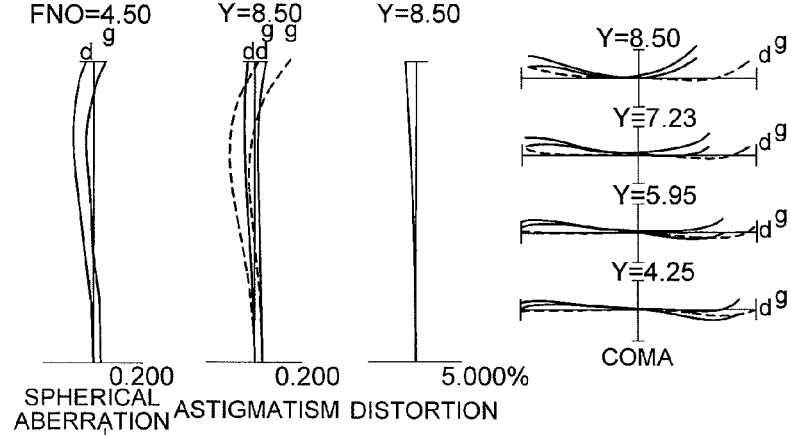
Figure 20C:
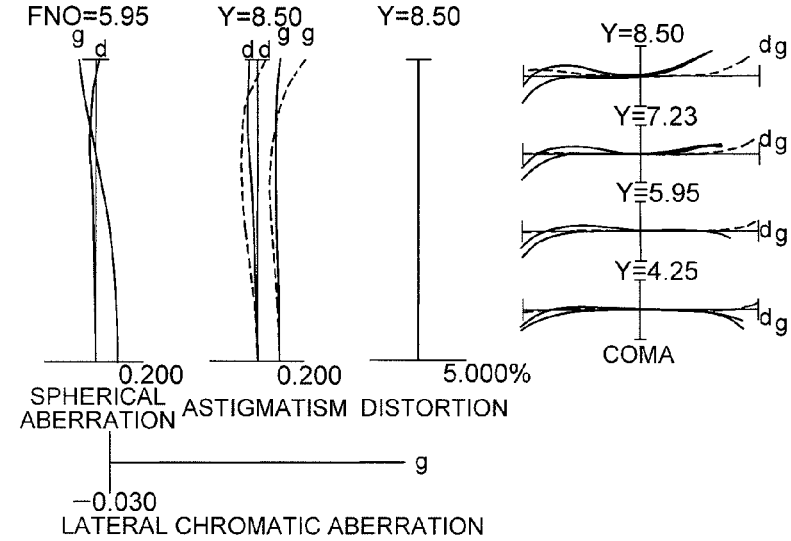

FIGS. 20A, 20B and 20C are graphs showing various aberrations of the zoom lens system according to Example 13 of the third embodiment, in which FIG. 20A shows various aberrations in the wide-angle end state, FIG. 20B shows various aberrations in the intermediate focal length state, and FIG. 20C shows various aberrations in the telephoto end state.

As is apparent from the respective graphs, the zoom lens system according to Example 13 shows superb optical performance as a result of good corrections to various aberrations in each focal length state from the wide-angle end state to the telephoto end state.

Figure 21A:
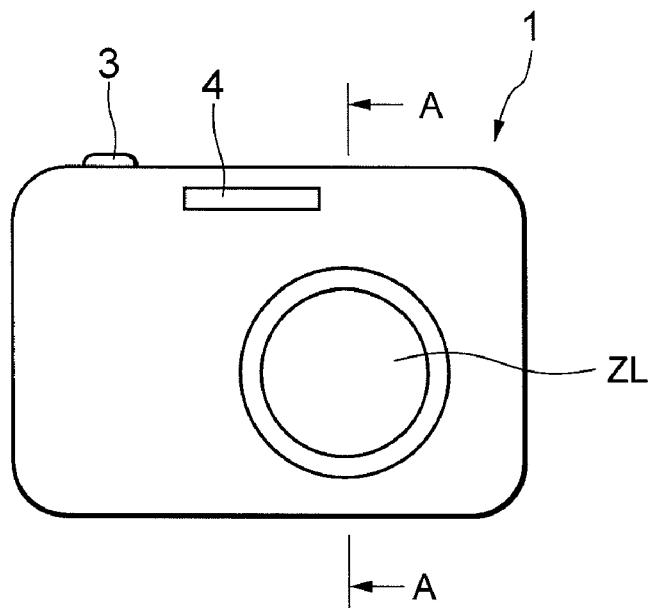
Figure 21B:
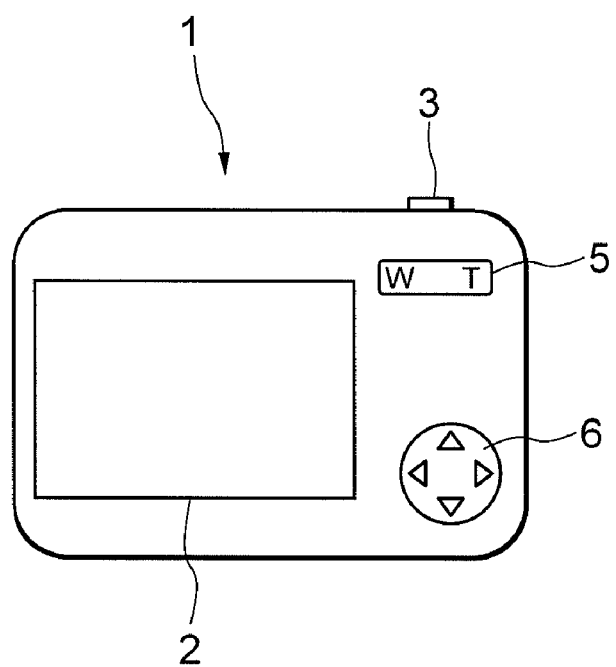
Figure 22:
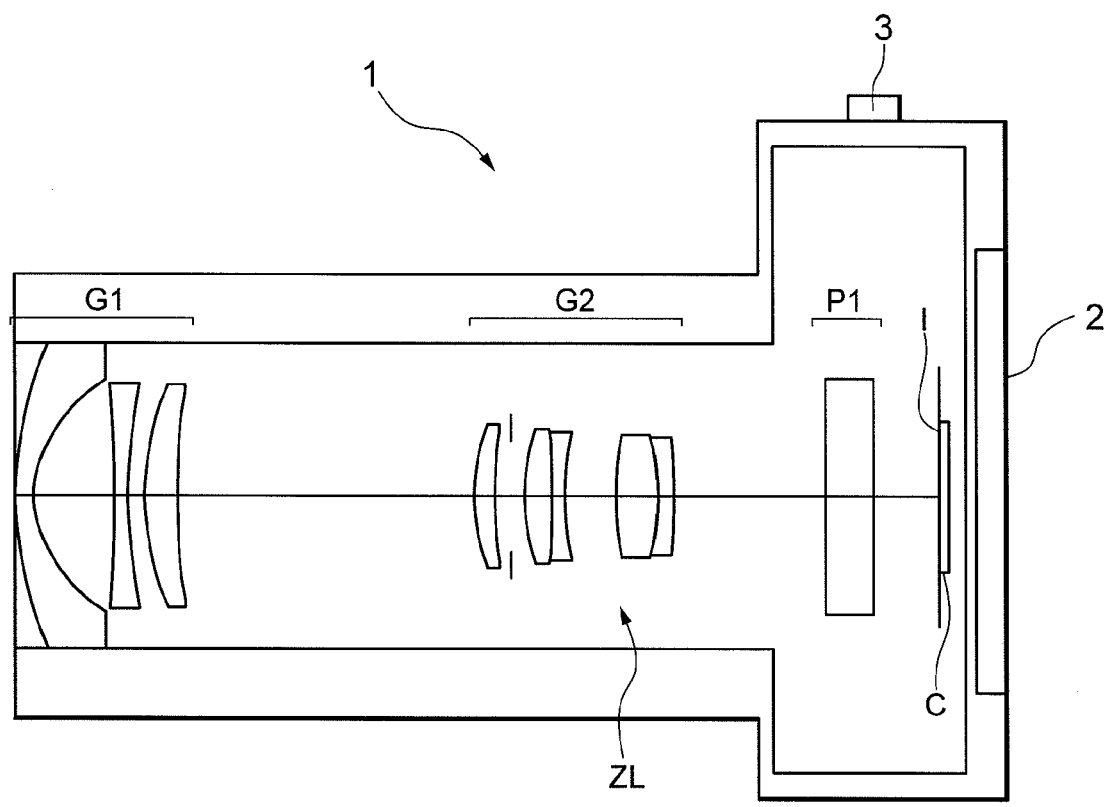
FIG. 22 is a sectional view along A-A line in FIG. 21A.

In FIGS. 21 and 22, construction of an electronic still camera 1 (hereinafter simply called as a camera) as an optical apparatus equipped with the above-described zoom lens system ZL. In the camera 1, when a power switch button (not shown) is pressed, a shutter (not shown) of an image-taking lens (the zoom lens system ZL) is opened, light from an object (not shown) is converged by the zoom lens system ZL, and an image is formed on an imaging device C (such as a CCD, or CMOS) disposed on the image plane I. The object image formed on the imaging device C is displayed on a liquid crystal monitor 2 disposed backside of the camera 1. After fixing the image composition of the object image with observing the liquid crystal monitor 2, a photographer depresses a release button 3 to take a picture of the object image by the imaging device C, and stores in a memory (not shown).

In the camera 1, the following members are disposed such as an auxiliary light emitter 4 that emits auxiliary light when the object is dark, a W-T button 5 that makes the zoom lens system carry out zooming between a wide-angle end state (W) and a telephoto end state (T), and a function button 6 that is used for setting various conditions of the camera 1. Although a compact-type camera in which the camera 1 and the zoom lens system ZL are formed in a body is shown in FIG. 21 as an example, an optical apparatus may be a single-lens reflex camera that a lens barrel including the zoom lens system ZL is removably attached to a camera body.

Incidentally, the following description may suitably be applied within limits that do not deteriorate optical performance.

In the above described explanations and Examples, although lens systems having a two-lens-group configuration has been shown, the above described lens configuration can be applied to other lens configurations such as a three-lens-group configuration and a four-lens-group configuration. Specifically, a lens configuration in which a positive lens, or lens group or a negative lens or lens group is added to the most object side, and a lens configuration in which a positive lens or lens group or a negative lens or lens group is added to the most image side may be listed.

A single lens group or a plurality of lens groups, or a portion of a lens group may be moved along the optical axis as a focusing lens group for carrying out focusing from an infinity object to a close range object. In this case, the focusing lens group can be used for auto focus, and suitable for being driven by a motor such as an ultrasonic motor. It is particularly preferable that the first lens group G1 or at least a portion of the most image side lens group in the second lens group G2 is used as the focusing lens group. Moreover, the whole of the zoom lens system ZL or the imaging surface may be moved.

Moreover, in the present embodiment, a lens group or a portion of a lens group may be moved as a vibration reduction lens group in a direction perpendicular to the optical axis thereby correcting an image blur caused by a camera shake. In particular, at least a portion of the second lens group is preferably made as a vibration reduction lens group. In this manner, a zoom lens system ZL according to the present embodiment can be worked as a vibration reduction zoom lens system.

Moreover, any lens surface may be formed as a spherical surface, a plane surface or an aspherical surface. When a lens surface is a spherical surface or a plane surface, processing and assembly of the lens become easy, so that deterioration of optical performance caused by errors upon processing and assembling can be prevented. Even if the lens surface is shifted, deterioration in optical performance is small, so that it is desirable. When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

Although an aperture stop is preferably disposed in the second lens group G2 or in the vicinity of the second lens group G2, the function may be substituted by a lens frame without disposing a member as an aperture stop.

Moreover, the lens surface of the lenses configuring the lens system may be coated with an anti-reflection film having a high transmittance in a broad wave range. With this contrivance, it is feasible to attain the high contrast and the high optical performance by reducing a flare and ghost.

In a zoom lens system ZL according to the present embodiment, the zoom ratio is from 2.0 to 5.0, and preferably from 2.5 to 4.0.

In the present embodiment, the first lens group G1 preferably includes one positive lens component and one or two negative lens components. The first lens group G1 is preferably disposed, in order from the object side, negative-positive or negative-negative-positive with an air space in between.

Moreover, in the above explanations, although the second lens group G2 preferably includes three positive lens components, the second lens group G2 in the present embodiment may include two positive lens components and one negative lens component. In this case, the second lens group G2 is preferably disposed, in order from the object side, positive-negative-positive with an air space in between.

Moreover, in a zoom lens system ZL according to the present embodiment, the distance (back focal length) along the optical axis between the image side lens surface of the lens component disposed to the most image side and the image plane is preferably 10 mm to 30 mm in the smallest state.

Moreover, in a zoom lens system ZL according to the present embodiment, the image height is preferably from 5.0 mm to 12.5 mm, and further preferably from 5.0 mm to 9.5 mm.

The present embodiment only shows a specific example for the purpose of better understanding of the present application. Accordingly, it is needless to say that the present application in its broader aspect is not limited to the specific details and representative devices.

What is claimed is:

1. A zoom lens system comprising, in order from an object side:
   a first lens group having negative refractive power; and
   a second lens group having positive refractive power;
   the second lens group including at least two cemented lenses each of which includes a positive lens disposed to the object side and a negative lens disposed to an image side,
   a distance between the first lens group and the second lens group varying upon zooming from a wide-angle end state to a telephoto end state, and
   the following conditional expression being satisfied:

$$0.020 < dt/f2 < 0.130$$

where dt denotes a distance along an optical axis between the first lens group and the second lens group in the telephoto end state, and f2 denotes a focal length of the second lens group.

2. The zoom lens system according to claim 1, wherein the following conditional expression is satisfied:

$$0.200 < X2/ft < 0.730$$

where ft denotes a focal length of the zoom lens system in the telephoto end state, and X2 denotes a moving amount of the second lens group toward the object side along the optical axis upon zooming from the wide-angle end state to the telephoto end state.

3. The zoom lens system according to claim 1, wherein the following conditional expression is satisfied:

$$0.010 < dt/ft < 0.090$$

where ft denotes a focal length of the zoom lens system in the telephoto end state.

4. The zoom lens system according to claim 1, wherein the following conditional expression is satisfied:

$$0.530 < f2/ft < 0.750$$

where ft denotes a focal length of the zoom lens system in the telephoto end state.

5. The zoom lens system according to claim 1, wherein the at least two cemented lenses in the second lens group are disposed consecutively.

6. The zoom lens system according to claim 1, wherein the image side lens surface of the negative lens disposed to the most image side of the cemented lens disposed to the object side among the cemented lenses disposed in the second lens group is preferably a concave surface facing the image side.

7. The zoom lens system according to claim 1, wherein the following conditional expression is satisfied:

$$1.77 < nd$$

where nd denotes a refractive index at d-line of the negative lens disposed to the most image side of the cemented lens disposed to the object side among the cemented lenses in the second lens group.

8. The zoom lens system according to claim 1, wherein the second lens group includes two cemented lenses disposed consecutively and the most image side lens surface of the cemented lenses disposed consecutively is a convex surface facing the image side.

9. The zoom lens system according to claim 1, wherein an aspherical surface is formed on the most image side lens surface of the cemented lens disposed to the image side among the cemented lenses in the second lens group.

10. The zoom lens system according to claim 1, wherein the second lens group includes at least two double convex positive lenses.

11. The zoom lens system according to claim 1, wherein the positive lens composing the cemented lens disposed to the object side in the second lens group is a double convex positive lens.

12. The zoom lens system according to claim 1, wherein cemented lenses included in the second lens group are all positive lens components.

13. The zoom lens system according to claim 1, wherein the second lens group includes three lens components.

14. The zoom lens system according to claim 1, wherein the second lens group includes, in order from the object side, a positive single lens, a cemented lens including a positive lens and a negative lens, and a cemented lens including a positive lens and a negative lens.

15. The zoom lens system according to claim 1, wherein the first lens group includes, in order from the object side, one or two negative single lenses and a positive single lens.

16. The zoom lens system according to claim 1, wherein at least a portion of the second lens group is moved in a direction including a component perpendicular to the optical axis.

17. The zoom lens system according to claim 1, wherein at least one of the cemented lenses in the second lens group is moved in a direction including a component perpendicular to the optical axis.

18. An optical apparatus equipped with the zoom lens system according to claim 1.

19. A zoom lens system comprising, in order from an object side:
   a first lens group having negative refractive power; and
   a second lens group having positive refractive power;
   the first lens group consisting of one or two negative lens components, and one or two positive lens components,
   the second lens group including at least two cemented lenses and being composed of positive lens components,
   a distance between the first lens group and the second lens group varying upon zooming from a wide-angle end state to a telephoto end state, and
   the following conditional expression being satisfied:

$$0.02 < Y/\Sigma f < 0.26$$

where Y denotes the maximum image height on the image plane, and Σf denotes a combined focal length of an optical system from the most object side lens surface of the cemented lens disposed to the object side among the at least two cemented lenses in the second lens group G2 to the most image side lens surface of the cemented lens disposed to the image side among the at least two cemented lenses in the second lens group G2.

20. The zoom lens system according to claim 19, wherein the following conditional expression is satisfied:

$$0.03 < FNOW/TL \leq 0.07 (1/\text{mm})$$

where FNOW denotes an f-number of the zoom lens system ZL in the wide-angle end state, and TL denotes the maximum total lens length among the total lens length that varies upon zooming from the wide-angle end state to the telephoto end state.

21. The zoom lens system according to claim 19, wherein the following conditional expression is satisfied:

$$0.04 < (fw \cdot ft)^{1/2}/\Sigma f < 0.70$$

where Σf denotes a combined focal length of an optical system from the most object side lens surface of the cemented lens disposed to the object side among at least two cemented lenses in the second lens group to the most image side lens surface of the cemented lens disposed to the image side among at least two cemented lenses in the second lens group, fw denotes a focal length of the zoom lens system in the wide-angle end state, and ft denotes a focal length of the zoom lens system in the telephoto end state.

22. The zoom lens system according to claim 19, wherein the second lens group includes two cemented lenses disposed consecutively, and, among the two cemented lenses, a cemented lens disposed to the object side includes a positive lens to the object side and a negative lens to the image side, and a cemented lens disposed to the image side includes a negative lens to the object side and a positive lens to the image side.

23. The zoom lens system according to claim 19, wherein the second lens group includes two cemented lens disposed consecutively, and each of the two cemented lens includes a positive lens to the object side and a negative lens to the image side.

24. An optical apparatus equipped with the zoom lens system according to claim 19.

25. A zoom lens system comprising, in order from an object side:
   a first lens group having negative refractive power; and
   a second lens group having positive refractive power;
   the second lens group including at least two cemented lenses each of which is constructed by a positive lens disposed to the object side and a negative lens disposed to the image side,
   a distance between the first lens group and the second lens group varying upon zooming from a wide-angle end state to a telephoto end state, and
   the following conditional expression being satisfied:

$$0.16 < ndn - ndp < 0.40$$

where ndp denotes an average value of refractive indices of positive lenses in the cemented lenses included in the second lens group, and ndn denotes an average value of refractive indices of negative lenses in the cemented lenses included in the second lens group.

26. The zoom lens system according to claim 25, wherein the following conditional expression is satisfied:

$$19.0 < \nu dp - \nu dn < 55.0$$

where νdp denotes an average value of Abbe numbers of positive lenses in the cemented lenses included in the second lens group, and νdn denotes an average value of Abbe numbers of negative lenses in the cemented lenses included in the second lens group.

27. A method for manufacturing a zoom lens system including, in order from an object side, a first lens group and a second lens group, the method comprising steps of:
   disposing the first lens group having negative refractive power as a whole, and the second lens group having positive refractive power as a whole including at least two cemented lenses each of which includes a positive lens to the object side and a negative lens to an image side; and
   disposing the first lens group and the second lens group with varying a distance between the first lens group and the second lens group upon zooming from a wide-angle end state to a telephoto end state, and with satisfying the following conditional expression:

$$0.020 < dt/f2 < 0.130$$

where dt denotes a distance along an optical axis between the first lens group and the second lens group in the telephoto end state, and f2 denotes a focal length of the second lens group.

28. The method according to claim 27, further comprising a step of:
   satisfying the following conditional expression:

$$0.200 < X2/ft < 0.730$$

where ft denotes a focal length of the zoom lens system in the telephoto end state, and X2 denotes a moving amount of the second lens group toward the object side along the optical axis upon zooming from the wide-angle end state to the telephoto end state.

29. The method according to claim 27, further comprising a step of:
   satisfying the following conditional expression:

$$0.010 < dt/ft < 0.090$$

where ft denotes a focal length of the zoom lens system in the telephoto end state.

30. A method for manufacturing a zoom lens system including, in order from an object side, a first lens group and a second lens group, the method comprising steps of:
  disposing the first lens group having negative refractive power as a whole consisting of one or two negative lens components and one or two positive lens components, and the second lens group having positive refractive power as a whole including at least two cemented lenses composed of positive lens components;
  disposing the first lens group and the second lens group with varying a distance between the first lens group and the second lens group upon zooming from a wide-angle end state to a telephoto end state, and with satisfying the following conditional expression:

$$0.02 < Y/\Sigma f < 0.26$$

where $\Sigma f$ denotes a combined focal length of an optical system from the most object side lens surface of the cemented lens disposed to the object side among the at least two cemented lenses in the second lens group to the most image side lens surface of the cemented lens disposed to the image side among the at least two cemented lenses in the second lens group, and Y denotes the maximum image height on the image plane.

31. The method according to claim 30, further comprising a step of:
  satisfying the following conditional expression:

$$0.04 < (fw \cdot ft)^{1/2}/\Sigma f < 0.70$$

where fw denotes a focal length of the zoom lens system in the wide-angle end state, and ft denotes a focal length of the zoom lens system in the telephoto end state.

* * * * *